United States Patent
Jung et al.

(10) Patent No.: US 12,513,239 B2
(45) Date of Patent: Dec. 30, 2025

(54) ELECTRONIC DEVICE FOR PROVIDING INFORMATION AND/OR FUNCTIONS THROUGH ICON, AND METHOD FOR CONTROLLING SAME

(71) Applicant: Samsung Electronics Co., Ltd., Suwon-si (KR)

(72) Inventors: Hanchul Jung, Suwon-si (KR); Yeonee Choi, Suwon-si (KR); Yerin Park, Suwon-si (KR); Jaeik Lee, Suwon-si (KR); Yeojun Yoon, Suwon-si (KR); Sungho Lee, Suwon-si (KR); Soojung Lee, Suwon-si (KR); Yongyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 18/073,057

(22) Filed: Dec. 1, 2022

(65) Prior Publication Data

US 2023/0102237 A1   Mar. 30, 2023

Related U.S. Application Data

(63) Continuation of application No. PCT/KR2021/007660, filed on Jun. 18, 2021.

(30) Foreign Application Priority Data

Jun. 19, 2020   (KR) .................. 10-2020-0074708

(51) Int. Cl.
*H04M 1/02* (2006.01)
*G06F 3/04817* (2022.01)
(Continued)

(52) U.S. Cl.
CPC .... *H04M 1/72472* (2021.01); *G06F 3/04817* (2013.01); *G06F 3/0482* (2013.01);
(Continued)

(58) Field of Classification Search
CPC ........... H04M 1/72472; H04M 1/0235; H04M 1/0268; H04M 2201/38; H04M 2201/42; G06F 9/451; G06F 3/04817; G06F 3/0482
(Continued)

(56) References Cited

U.S. PATENT DOCUMENTS

2012/0179969 A1   7/2012   Lee et al.
2012/0246586 A1   9/2012   Heo et al.
(Continued)

FOREIGN PATENT DOCUMENTS

CN   105141742 A   12/2015
CN   107846501 A   3/2018
(Continued)

OTHER PUBLICATIONS

IP.com search (Year: 2025).*
(Continued)

*Primary Examiner* — Moustapha Diaby
(74) *Attorney, Agent, or Firm* — Jefferson IP Law, LLP

(57) ABSTRACT

An electronic device is provided. The electronic device includes a flexible display, and a processor disposed, wherein the processor is configured to display, by the electronic device, a first shortcut icon for executing a first application on the flexible display where a first portion of the flexible display is exposed to an outside, detect a first input for exposing a second portion including the first portion of the flexible display to the outside, and based on the first input, display the first shortcut icon on the second portion as a first extended shortcut icon, if a size of the second portion
(Continued)

is greater than or equal to a first threshold size, wherein the first extended shortcut icon may include at least one menu for executing a designated function of the first application.

19 Claims, 51 Drawing Sheets

(51) Int. Cl.
  *G06F 3/0482* (2013.01)
  *G06F 9/451* (2018.01)
  *H04M 1/72472* (2021.01)
(52) U.S. Cl.
  CPC .......... *G06F 9/451* (2018.02); *H04M 1/0235* (2013.01); *H04M 1/0268* (2013.01); *H04M 2201/38* (2013.01); *H04M 2201/42* (2013.01)
(58) Field of Classification Search
  USPC ........................................... 455/475.4, 575.4
  See application file for complete search history.

(56) References Cited

U.S. PATENT DOCUMENTS

| | | | |
|---|---|---|---|
| 2014/0137041 A1 | 5/2014 | Jeon et al. | |
| 2014/0223343 A1 | 8/2014 | Lee et al. | |
| 2015/0346989 A1 | 12/2015 | Lee | |
| 2015/0350414 A1* | 12/2015 | Park | G06F 3/04817 455/566 |
| 2016/0092071 A1 | 3/2016 | Lawson et al. | |
| 2016/0191429 A1 | 6/2016 | Lee et al. | |
| 2017/0147189 A1 | 5/2017 | Ryu et al. | |
| 2017/0154609 A1 | 6/2017 | Yoon et al. | |
| 2018/0081398 A1* | 3/2018 | Shin | G06F 1/1641 |
| 2018/0275770 A1 | 9/2018 | Kang et al. | |
| 2018/0364827 A1 | 12/2018 | Chung | |
| 2019/0155476 A1 | 5/2019 | Kim et al. | |
| 2021/0132776 A1 | 5/2021 | Bardeli et al. | |

FOREIGN PATENT DOCUMENTS

| | | |
|---|---|---|
| EP | 3 296 838 A1 | 3/2018 |
| KR | 10-2012-0080922 | 7/2012 |
| KR | 10-2013-0052748 | 5/2013 |
| KR | 10-2015-0053650 | 5/2015 |
| KR | 10-2015-0136416 | 12/2015 |
| KR | 10-2015-0136801 | 12/2015 |
| KR | 10-2017-0083404 | 7/2017 |
| KR | 10-2018-0031373 | 3/2018 |
| KR | 10-2018-0101879 | 9/2018 |
| KR | 10-2107134 | 5/2020 |
| KR | 10-2545605 B1 | 6/2023 |

OTHER PUBLICATIONS

IP.com search history (Year: 2025).*
Extended European Search Report dated Oct. 9, 2023, issued in European Patent Application No. 21826804.3.
Chinese Office Action dated Feb. 7, 2024, issued in Chinese Patent Application No. 202180041757.3.
Chinese Office Action dated Jul. 1, 2024, issued in Chinese Patent Application No. 202180041757.
Korean Office Action dated Aug. 6, 2024, issued in Korean Patent Application No. 10-2020-0074708.
Indian Office Action dated Aug. 12, 2024, issued in Indian Patent Application No. 202317001784.
International Search Report dated Sep. 24, 2021, issued in International Application No. PCT/KR2021/007660.
Extended European Search Report dated Nov. 20, 2025, issued in European Patent Application No. 25195456.6.

* cited by examiner (a)

(b)

ELECTRONIC DEVICE FOR PROVIDING INFORMATION AND/OR FUNCTIONS THROUGH ICON, AND METHOD FOR CONTROLLING SAME

CROSS-REFERENCE TO RELATED APPLICATION(S)

This application is a continuation application, claiming priority under § 365(c), of an International application No. PCT/KR2021/007660, filed on Jun. 18, 2021, which is based on and claims the benefit of a Korean patent application number 10-2020-0074708, filed on Jun. 19, 2020, in the Korean Intellectual Property Office, the disclosure of which is incorporated by reference herein in its entirety.

BACKGROUND

1. Field

The disclosure relates to an electronic device for providing information and/or a function through an icon and a method for controlling the same. More particularly, the disclosure relates to an electronic device including a flexible display that changes the content of information and/or the physical size of content displayed on the screen, corresponding to the changed size of the display area as the size of the display area is changed.

2. Description of Related Art

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

The above information is presented as background information only to assist with an understanding of the disclosure. No determination has been made, and no assertion is made, as to whether any of the above might be applicable as prior art with regard to the disclosure.

SUMMARY

The electronic device may display various contents, such as, e.g., application icons and/or widgets, on the screen through the display.

In an electronic device including a flexible display, the size of the display area may be changed as, e.g., a structure forming the electronic device is moved to change a state of the screen between an open state and a closed state.

The electronic device including the flexible display of the related art provides a user experience (UX) to extend only the layout of the displayed content without changing content of information and/or physical size of the content displayed on the screen although the size of the display area is changed.

Aspects of the disclosure are to address at least the above-mentioned problems and/or disadvantages and to provide at least the advantages described below. Accordingly, an aspect of the disclosure is to provide an electronic device including a flexible display that changes the content of information and/or the physical size of content displayed on the screen, corresponding to the changed size of the display area as the size of the display area is changed.

Additional aspects will be set forth in part in the description which follows and, in part, will be apparent from the description, or may be learned by practice of the presented embodiments.

In accordance with an aspect of the disclosure, an electronic device is provided. The electronic device includes a flexible display and at least one processor, wherein the at least one processor is configured to display a first shortcut icon for executing a first application on the flexible display in a state in which a first portion of the flexible display of the electronic device is exposed to an outside, detect a first input to expose a second portion including the first portion of the flexible display to the outside, and display the first shortcut icon, as a first extended shortcut icon, on the second portion when a size of the second portion is a first threshold size or more, based on the first input, and wherein the first extended shortcut icon may include at least one menu for executing at least one designated function of the first application.

In accordance with another aspect of the disclosure, a method for controlling an electronic device is provided. The method includes displaying a first shortcut icon for executing a first application on a flexible display of the electronic device in a state in which a first portion of the flexible display of the electronic device is exposed to an outside, detecting a first input to expose a second portion including the first portion of the flexible display to the outside, and displaying the first shortcut icon, as a first extended shortcut icon, on the second portion when a size of the second portion is a first threshold size or more, based on the first input, and wherein the first extended shortcut icon may include at least one menu for executing at least one designated function of the first application.

According to various embodiments, a computer-readable nonvolatile recording medium may store instructions that, when executed by at least one processor of an electronic device, enable the at least one processor to display a first shortcut icon for executing a first application on a flexible display of the electronic device in a state in which a first portion of the flexible display of the electronic device is exposed to an outside, detect a first input to expose a second portion including the first portion of the flexible display to the outside, and display the first shortcut icon, as a first extended shortcut icon, on the second portion when a size of the second portion is a first threshold size or more, based on the first input, and wherein the first extended shortcut icon may include at least one menu for executing at least one designated function of the first application.

According to various embodiments, an electronic device may change the content of information and/or the physical size of content displayed on the screen, corresponding to the changed size of the display area as the size of the display area is changed. Thus, the electronic device may provide an enhanced user interface (UI) or user experience to the user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments to be described below may be applied to any electronic device capable of changing the size of the screen area displayed on the front surface. According to various embodiments, an electronic device having a rollable display in which a flexible display is rolled to the opposite side is described as an example of the electronic device in embodiments to be described below.

Figure 1A:
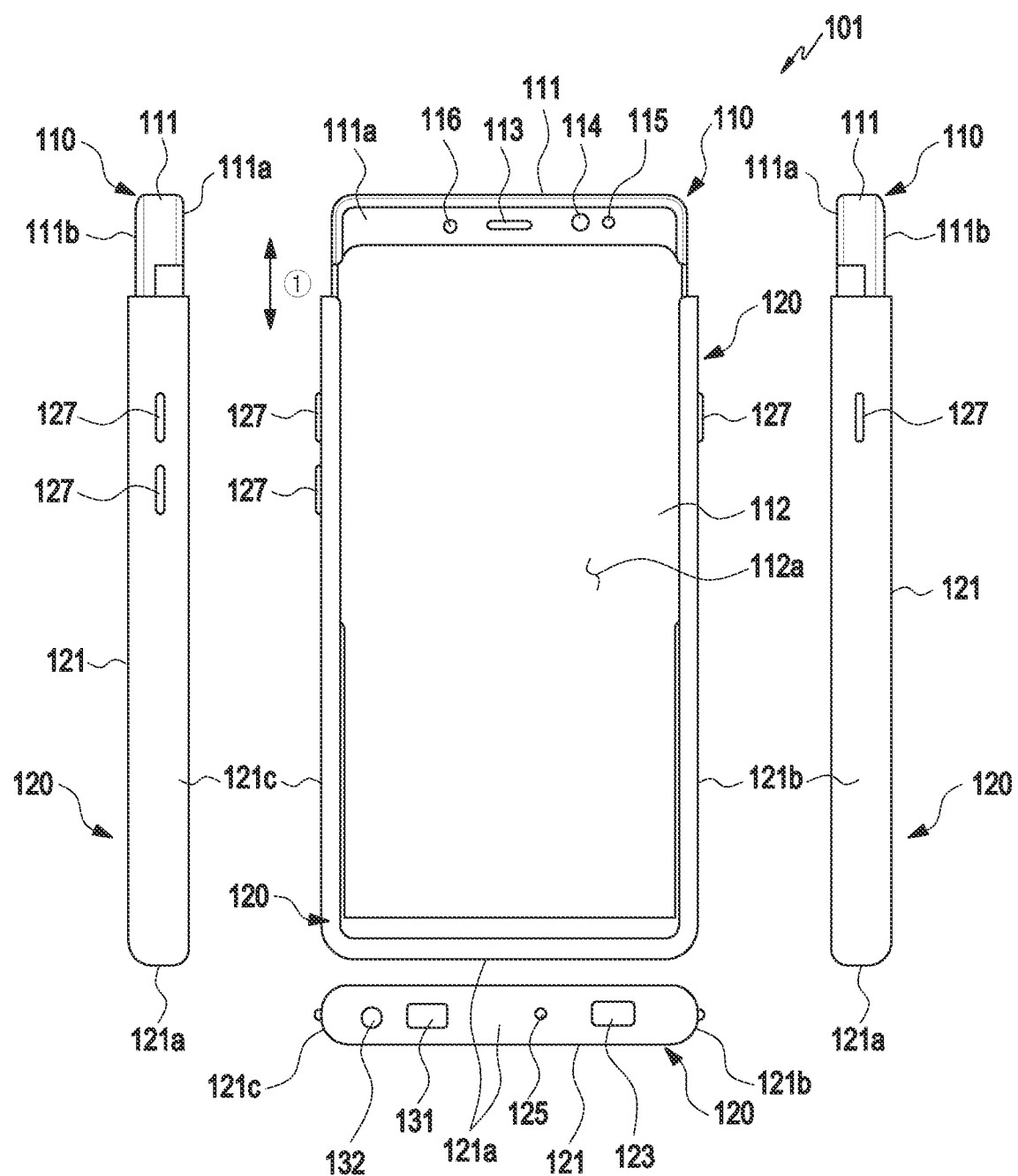
FIG. 1A is a front perspective view illustrating an electronic device in a closed state according to an embodiment of the disclosure.
Figure 1B:
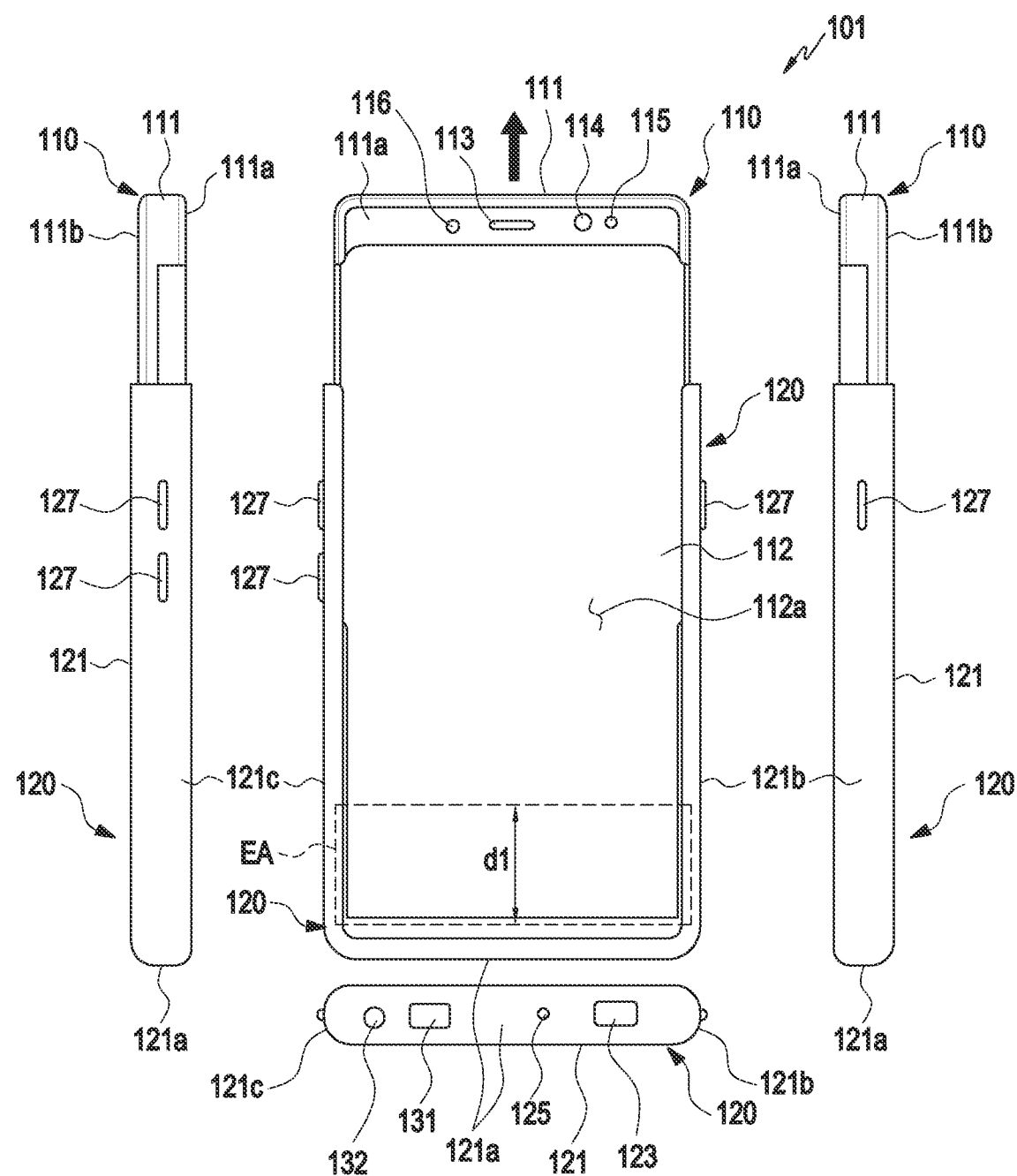
FIG. 1B is a front perspective view illustrating an electronic device of FIG. 1A in an open state according to an embodiment of the disclosure.
Figure 1C:
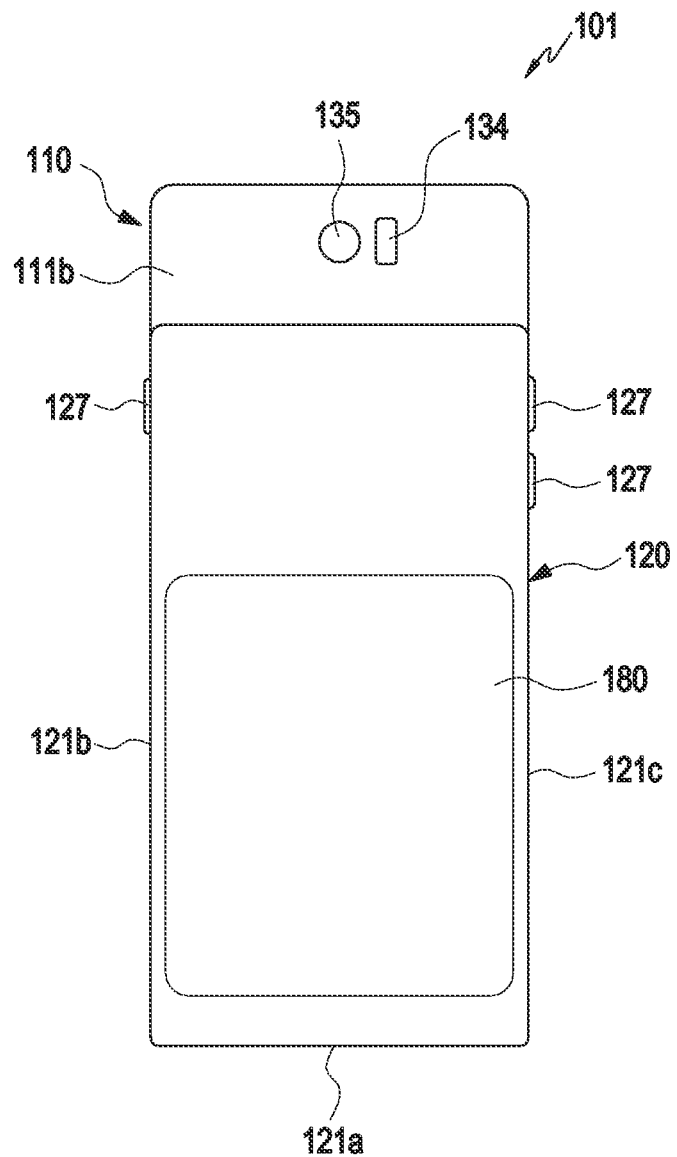
FIG. 1C is a rear perspective view illustrating an electronic device of FIG. 1A according to an embodiment of the disclosure.

FIG. 1A is a front perspective view illustrating an electronic device in a closed state according to an embodiment of the disclosure. FIG. 1B is a front perspective view illustrating an electronic device FIG. 1A in an open state according to an embodiment of the disclosure. FIG. 1C is a rear perspective view illustrating an electronic device of FIG. 1A according to an embodiment of the disclosure.

FIG. 1A illustrates a closed state of a first structure 110 with respect to a second structure 120, and FIG. 1B illustrates an open state of the first structure 110 with respect to the second structure 120.

Referring to FIGS. 1A, 1B, and 1C, an electronic device 101 may include a first structure 110 and a second structure 120, the first structure 110 is disposed to be movable in the second structure 120. According to an embodiment of the disclosure, the first structure 110 may move back and forth by a predetermined distance d1 along shown directions with respect to the second structure 120.

According to various embodiments of the disclosure, the first plate 111 of the first structure 110 may include a first surface 111a and a second surface 111b facing away from the first surface 111a. According to an embodiment of the disclosure, the second structure 120 may include a second plate 121, a first sidewall 121a extending from the second plate 121, a second sidewall 121b extending from the first sidewall 121a and the second plate 121, a third sidewall 121c extending from the first sidewall 121a and the second plate 121 and positioned parallel to the second sidewall 121b, and/or a second rear plate 180 (e.g., a rear window). According to an embodiment of the disclosure, the second plate 121, the first sidewall 121a, the second sidewall 121b, and the third sidewall 121c may form a trough 220a to have an open side to receive at least a portion of the first structure 110. For example, the second structure 120 may be coupled to surround a portion of the first structure 110. The first structure 110 may reciprocate linearly along the direction of the arrow ① with respect to the second structure 120. According to an embodiment of the disclosure, the second sidewall 121b or the third sidewall 121c may be omitted. According to an embodiment of the disclosure, the second plate 121, the first sidewall 121a, the second sidewall 121b, or the third sidewall 121c may be integrally formed with each other. As another example, the second plate 121, the first sidewall 121a, the second sidewall 121b, or the third sidewall 121c may be formed individually and be jointed together. According to an embodiment of the disclosure, the second rear plate 180 may cover at least part of the display 112. According to various embodiments, the size of the display screen displayed on the front surface may be changed by raising and lowering the second rear plate 180 in the vertical direction.

According to an embodiment of the disclosure, the first structure 110 is movable into the open state and closed state with respect to the second structure 120, in the first direction (e.g., the direction of arrow ①) parallel to the second plate 121 and the second sidewall 121b so that the first structure 110 is placed in a first distance from the first sidewall 121a in the closed state and is placed in a second distance larger than the first distance, from the first sidewall 121a in the open state.

According to an embodiment of the disclosure, the electronic device 101 may include at least one or more a display 112, audio modules 113 and 123, camera modules 115 and 135, an indicator 116 (e.g., a light emitting diode (LED) device), sensor modules 114 and 134, a key input device 127, or connector holes 131 and 132.

According to an embodiment of the disclosure, the display 112 may include a flat portion 112a extended to cross at least a portion of the first surface 111a and disposed on the first surface 111a and a bendable portion extending from the flat portion 112a to a space between the first sidewall 121a and the first structure 110 in the closed state. According to an embodiment of the disclosure, as viewed from above the first plate 111, the bendable portion may be configured to at least partially be moved by a predetermined marked area EA to the flat portion 112a to form substantially a flat surface between the flat portion 112a and the first sidewall 121a when the first structure 110 is moved from the closed state to the open state. The display 112 may be disposed to be coupled with, or adjacent to, a touch detecting circuit, a pressure sensor capable of measuring the strength (pressure) of touches, and/or a digitizer for detecting a magnetic field-type stylus pen. For example, the display 112 may include a flexible touchscreen display layer.

According to an embodiment of the disclosure, the audio modules 113, 123, and 125 may include speaker holes 113 and 123 and a microphone hole 125. The speaker holes 113 and 123 may include a receiver hole 113 or an external speaker hole 123. The microphone hole 125 may have a microphone inside to obtain external sounds. According to an embodiment of the disclosure, there may be a plurality of microphones to be able to detect the direction of a sound. According to an embodiment of the disclosure, the speaker holes 113 and 123 and the microphone hole 125 may be implemented as a single hole, or without the speaker holes 113 and 123, a speaker (e.g., a Piezo speaker) may be included. According to an embodiment of the disclosure, the receiver hole 113 may be disposed in the first structure 110. The external speaker hole 123 or the microphone hole 125 may be disposed in the second structure 120. According to an embodiment of the disclosure, the external speaker hole 123 may be disposed on the second surface 111b of the first plate 111 or on a side surface of the first structure 110. According to an embodiment of the disclosure, the microphone hole 125 may be disposed on a side surface of the first structure 110.

According to an embodiment of the disclosure, the sensor modules 114 and 134 may generate an electrical signal or data value corresponding to an internal operating state or external environmental state of the electronic device 101. The sensor modules 114 and 134 may include a first sensor module 114 (e.g., a proximity sensor) disposed on, e.g., the first surface 111a of the first plate 111 and/or a second sensor module (e.g., a fingerprint sensor) (not shown) disposed on the second surface 111b of the first plate 111 and/or a third sensor module 134 (e.g., a hear rate monitor (HRM) sensor). The electronic device 101 may include a sensor module not shown, e.g., at least one of a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, or an illuminance sensor.

According to an embodiment of the disclosure, the camera modules 115 and 135 may include a first camera device 115 disposed on the first surface 111a of the first plate 111 and a second camera device 135 disposed on the second surface 111b. The first camera device 115 or the second camera device 135 may include one or more lenses, an image sensor, and/or an image signal processor. According to an embodiment of the disclosure, the second camera device 135 may be disposed on one surface of the second structure 120.

According to an embodiment of the disclosure, the key input device 127 may be disposed on the second sidewall 121b or the third sidewall 121c of the second structure 120. The electronic device 101 may include a key input device (not shown), e.g., a home key button or a touchpad disposed around the home key button. According to an embodiment of the disclosure, at least a portion of the key input device 127 may be positioned on an area of the first structure 110.

According to an embodiment of the disclosure, the indicator 116 may be disposed on the first surface 111a of the first plate 111. The indicator 116 may provide, e.g., state information about the electronic device 101 in the form of light and may include an LED.

According to an embodiment of the disclosure, the connector holes 131 and 132 may include, e.g., a first connector hole 131 for receiving a connector (e.g., a universal serial bus (USB) connector) for transmitting or receiving power and/or data to/from an external electronic device and/or a second connector hole (e.g., an earphone jack) 132 for receiving a connector for transmitting or receiving audio signals to/from the external electronic device. According to an embodiment of the disclosure, the first connector hole 131 or the second connector hole 132 may be disposed on the first sidewall 121a of the second structure 120. According to an embodiment of the disclosure, the first connector hole 131 or the second connector hole 132 may be formed on a sidewall of the first structure 110.

Figure 2:
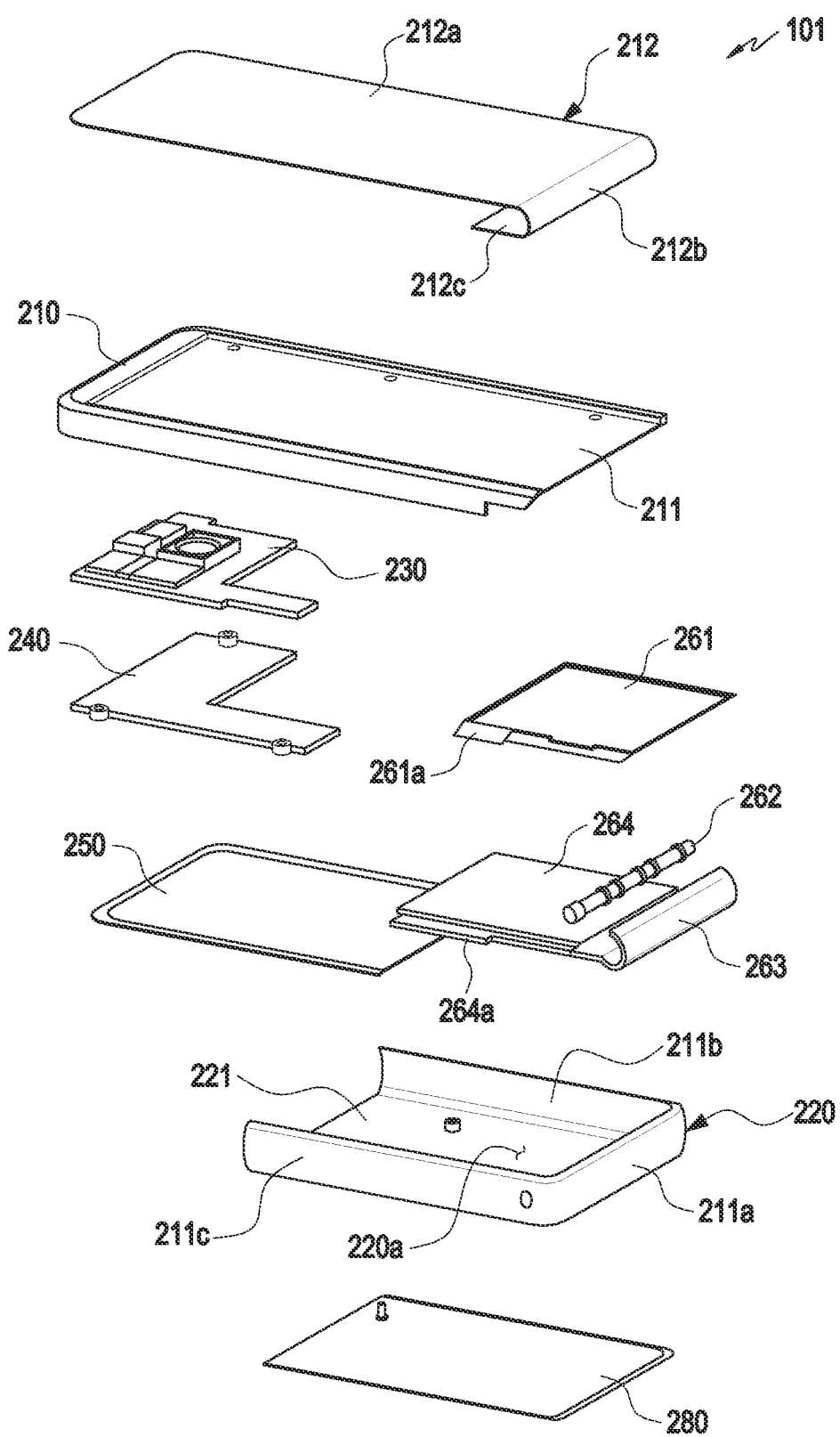
FIG. 2 is an exploded perspective view illustrating an electronic device according to an embodiment of the disclosure.

FIG. 2 is an exploded perspective view illustrating an electronic device according to an embodiment of the disclosure.

Referring to FIG. 2, an electronic device 200 may include a display 212 (e.g., the display 112 of FIG. 1A or a flexible touchscreen display layer), a first structure 210 (e.g., the first structure 110 of FIG. 1A), a first plate 211, a second structure 220 (e.g., the second structure 120 of FIG. 1A), a second plate 221, a printed circuit board 230, a first supporting member 240 (e.g., a rear case), a first rear plate 250, a first hinge plate 261, a roller 262, a second hinge plate 264, or a second rear plate 280 (e.g., a rear window). According to an embodiment of the disclosure, the electronic device 200 may exclude at least one (e.g., the first supporting member 240 or the second rear plate 250) of the components or may add other components.

The display 212 may include a first surface 212a, a second surface 212b, and a third surface 212c. According to various embodiments, the screen display area (e.g., an active area) may be varied based on the area exposed. The first surface 212a and the third surface 212c may form flat surfaces, and the second surface 212b may form a curved surface. In an embodiment of the disclosure, as the first structure 210 moves with respect to the second structure 220, the exposed area of the display 212 may vary, and the second surface 212b or the third surface 212c may sequentially or partially form a substantially coplanar surface with the first surface 212a. For example, the second surface 212b or the third surface 212c may be sequentially or selectively exposed to the outside.

The first structure 210 may include the first plate 211. The first structure 210 may be formed of, e.g., a metal and/or non-metallic material (e.g., polymer). The display 212 (e.g., the first surface 212a) may be coupled to one surface of the first plate 211, and the printed circuit board 230 may be coupled to the other surface of the first plate 211. The first plate 211 may be connected to a side of a multi-bar 263 which is connected with at least the second surface 212b of the display 212. The second structure 220 may fix the second hinge plate 264. The first structure 210 may move while being guided by the second hinge plate 264.

The first hinge plate 261 may support the multi-bar 263 when the display 212 expands. For example, if the display 212 is extended, the multi-bar 263 may be positioned on substantially the same plane as the first plate 211 while being supported by the first hinge plate 261. In an embodiment of the disclosure, in a state in which the display 212 is not extended, the multi-bar 263 may be received in the second structure 220 and positioned substantially parallel to the first plate 211 and may maintain the flat plate shape while being supported by the second hinge plate 264. The first hinge plate 261 and a first hinge plate fastener 261a may be integrally formed with each other. The first hinge plate fastener 261a may be connected to a second hinge plate fastener 264a provided in the second hinge plate 264. In an embodiment of the disclosure, the first hinge plate 261 or the second hinge plate 264 may be fixed within the second structure 220 and guide movement of the first structure 210 with respect to the second structure 220.

The roller 262 may guide or support the multi-bar 263 in a predetermined radius. The roller 262 may be connected to the second hinge plate fastener 264a or the first hinge plate 261. The roller 262 may rotate to guide the multi-bar 263 to the outside or inside of the second structure 220, e.g., when the first plate 211 (e.g., the first structure 110) moves with respect to the second structure 220.

The multi-bar 263 may be formed with multiple straight bars. The multi-bar 263 may at least partially support the second surface 212b of the display 212. The multi-bar 263 may be received in the second structure 229 in a state of being partially supported on the second hinge plate 264, and the other side may be connected to the first structure 210.

The second hinge plate 264 may support the third surface 212c of the display 212. The second hinge plate 264 may support the multi-bar 263 to maintain the flat plate shape when the display 212 extends. The second hinge plate 264 may be formed as a separate part from the second hinge plate fastener 264a. The second hinge plate 264 may be fixed to the second structure 220 and guide the slide of the first structure 210 with respect to the second structure 220, using the second hinge plate fastener 264a.

The second structure 220 may be formed to surround at least a portion of the first structure 210, the second hinge plate 264, and the multi-bar 263. According to an embodiment of the disclosure, the second structure 220 may include a second plate 221, a first sidewall 221a extending from the second plate 221, a second sidewall 221b extending from the first sidewall 221a and the second plate 221, and a third sidewall 221c extending from the first sidewall 221a and the second plate 221 and positioned parallel to the second sidewall 221b. The second structure 220 may receive a component, e.g., an antenna, in a space that does not overlap the multi-bar 263. The second structure 220 may include a second rear plate 280 to at least partially cover the third surface 212c of the display 212.

The second rear plate 280 may include a material that does not transmit light when there is no need to display 212 information on the third surface 212c of the display 212. As another example, the second rear plate 280 may be formed of a light transmissive material so that the information displayed on the third surface 212c may be viewed from the outside even when the display 212 is partially received in the second structure 220. The second rear plate 280 may be integrally formed with the second structure 220.

The first supporting member 240 may be disposed between the printed circuit board 230 and the first rear plate 250.

A processor, memory, and/or interface may be mounted on the printed circuit board 230. The processor may include one or more of, e.g., a central processing unit, an application processor, a graphic processing device, an image signal processing, a sensor hub processor, or a communication processor. The first structure 210 may be guided to move through the first hinge plate 261 when the display 212 expands or shrinks.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 200 with an external electronic device and may include a USB connector, an SD card/multimedia card (MMC) connector, or an audio connector.

Figure 3:
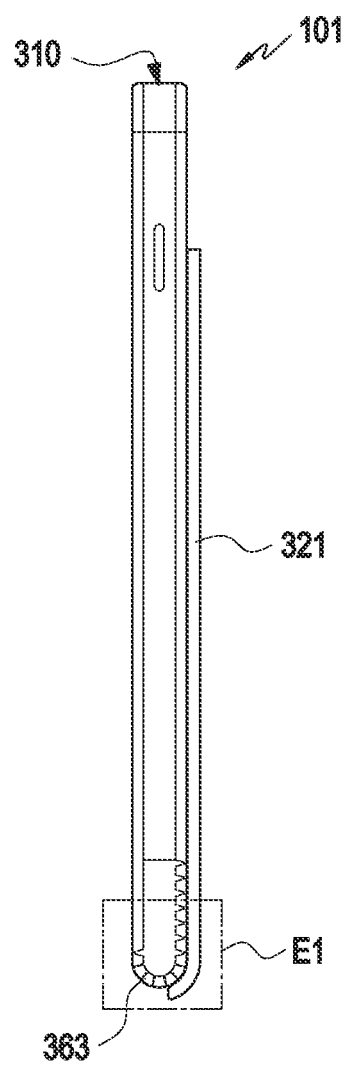
FIG. 3 is a side view illustrating an electronic device according to an embodiment of the disclosure.
Figure 4:
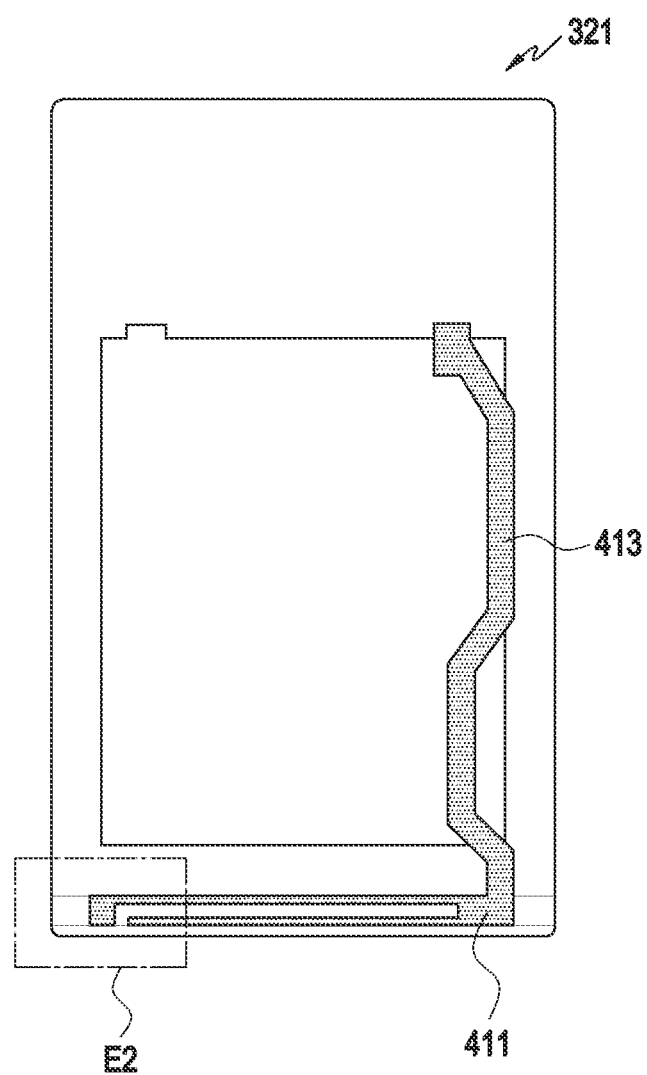
FIG. 4 is a plan view illustrating a portion of an inner surface of a second plate of an electronic device according to an embodiment of the disclosure.

FIG. 3 is a side view illustrating an electronic device according to an embodiment of the disclosure. FIG. 4 is a plan view illustrating a portion of an inner surface of a second plate of an electronic device according to an embodiment of the disclosure. In describing this embodiment of the disclosure, it should be noted that in FIGS. 3 and 4, a sidewall of the second structure (e.g., the second sidewall 121b or the third sidewall 121c of the second structure 120 in FIG. 1A) is omitted.

Referring to FIGS. 3 and 4, an electronic device 300 (e.g., the electronic device 100 or 200 of FIG. 1A or 2) may include a first structure 310 (e.g., the first structure 210 of FIG. 2), a multi-bar 363 (e.g., the multi-bar 263) connected to the first structure 310, or a second plate 321 (e.g., the second plate 221 of FIG. 2) at least partially surrounding the multi-bar 363 and the first structure 310. In an embodiment of the disclosure, one end of the second plate 321 may have a curved shape to form at least a portion of the first sidewall (e.g., the first sidewall 121a of FIG. 1A).

According to an embodiment of the disclosure, the multi-bar 363, along with the display (e.g., the display 212 or flexible touchscreen display layer of FIG. 2), may be extended or received in the space between the second plate 321 (or the first sidewall 221a of FIG. 2) and the first structure 310. For example, at least in the closed state shown in FIG. 1A, the multi-bar 363 or a partial area of the display supported on the multi-bar 363 (e.g., the bendable portion in the display 112 of FIG. 1A) may be extended into the space between the second plate 321 (or the first sidewall 221a of FIG. 2) and the first structure 310.

According to various embodiments of the disclosure, on the inner surface of the second plate 321, a conductive pattern 411 and a line 413 (e.g., a flexible printed circuit board) connecting the conductive pattern 411 to the printed circuit board 230 may be provided. In an embodiment of the disclosure, the conductive pattern 411 may function as an antenna of the electronic device 300. In an embodiment of the disclosure, the conductive pattern 411 may face at least a portion of the surface (e.g., inner surface) of the second plate 321, e.g., the trough (e.g., the trough 220a of FIG. 2) provided by the second structure 120 or 220 of FIG. 1A or 2. On the surface of the second plate 321, a capacitive element may be disposed or a dielectric protrusion (e.g., '511' in FIG. 5 or 6) or a metal protrusion may be formed.

Figure 5:
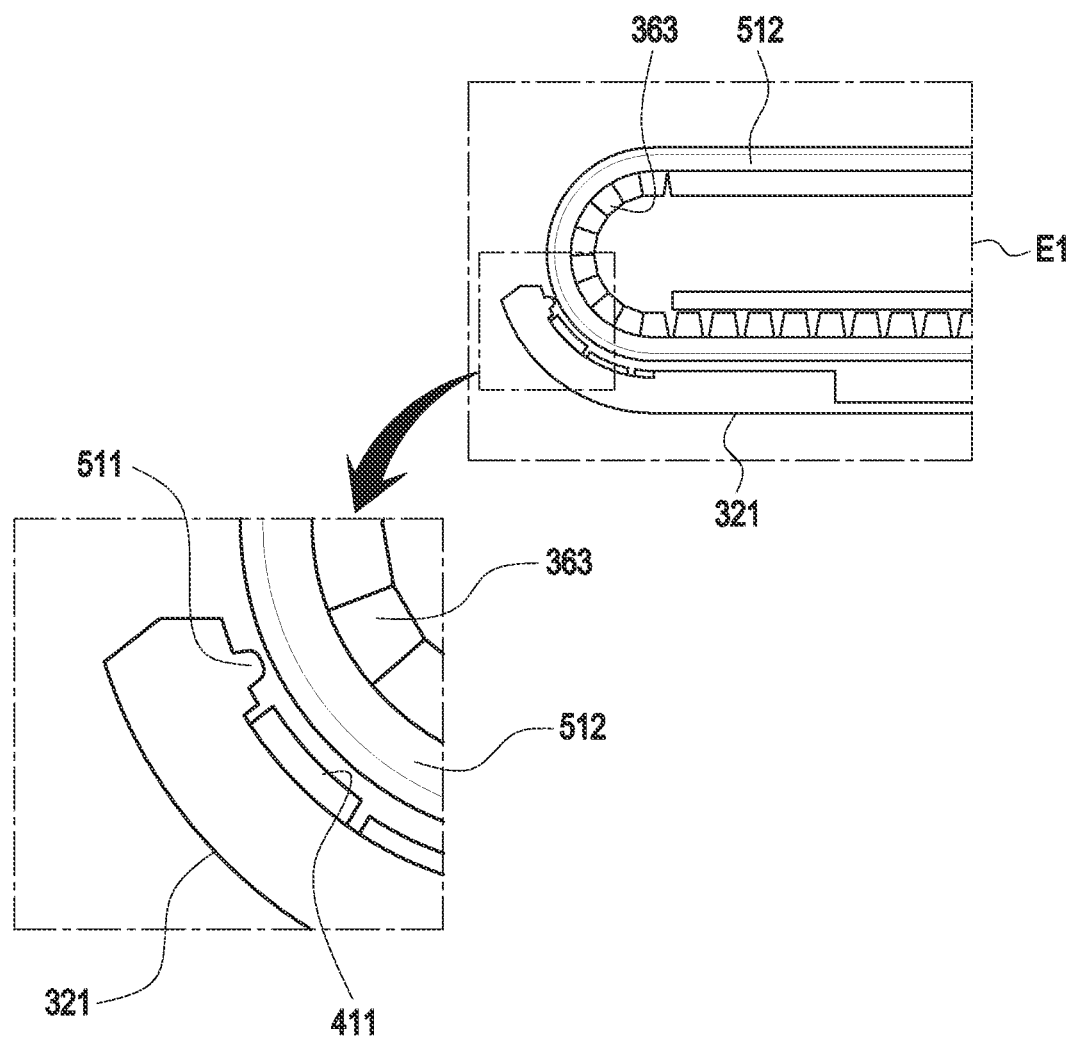
FIG. 5 is an enlarged, cross-sectional view illustrating portion 'E1' of FIG. 3 according to an embodiment of the disclosure.
Figure 6:
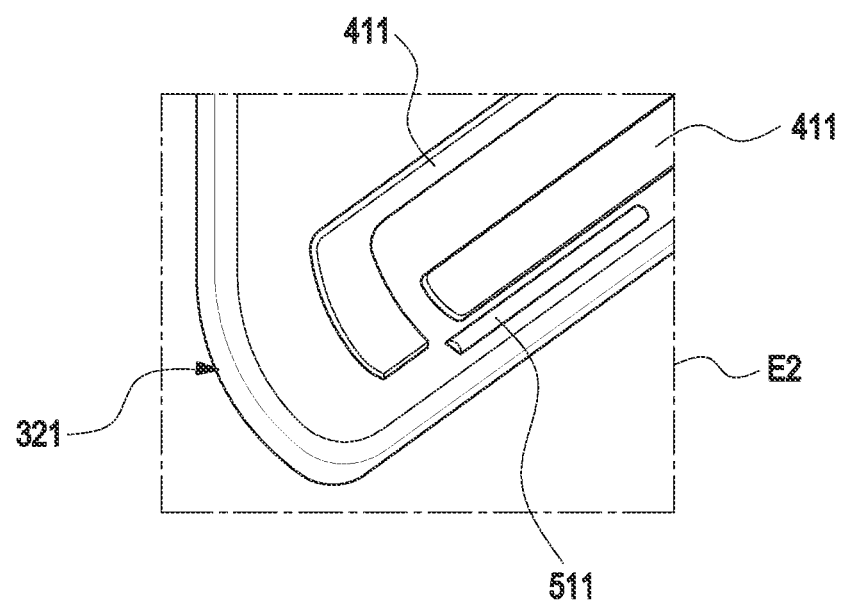
FIG. 6 is an enlarged, perspective view illustrating portion 'E2' of FIG. 4 according to an embodiment of the disclosure.

The dielectric protrusion 511 is described with further reference to FIGS. 5 and 6.

FIG. 5 is an enlarged, cross-sectional view illustrating portion 'E1' of FIG. 3 according to an embodiment of the disclosure. FIG. 6 is an enlarged, perspective view illustrating portion 'E2' of FIG. 4 according to an embodiment of the disclosure.

Referring to FIGS. 5 and 6, the dielectric protrusion 511 may be substantially formed on a surface, e.g., an inner surface, at one end of the second plate 321. In an embodiment of the disclosure, the dielectric protrusion 511 may maintain the state of facing a portion of the display 512 (e.g., the third surface 212c in the display of FIG. 2) in the second structure (e.g., the second structure 220 of FIG. 2). For example, regardless of whether the electronic device 300 (e.g., the electronic device 101 of FIG. 1A) is in a closed state or an open state, the dielectric protrusion 511 may maintain the state of facing a portion of the display 512 in the second structure. According to an embodiment of the disclosure, the electronic device 300 (or the processor of the electronic device 300) may detect a real-time change in screen size by detecting a change in the coordinates of the touch to the touch panel of the display 512 as a touch input (or hovering input) is generated by the dielectric protrusion 511 on the display 512 or flexible touchscreen display layer (e.g., the display 212 of FIG. 2). For example, a touch input or hovering input may be generated on the display 512 or flexible touchscreen display layer (e.g., the display 212 of FIG. 2) by the dielectric protrusion 511, and the position or coordinates of the touch input or hovering input may be detected.

For example, as the first structure 310 moves, the relative position of the dielectric protrusion 511 to the display 512 may be varied, and the electronic device 300 or the processor may detect the position (or position change) of the dielectric protrusion 511 using the touchscreen function of the display 512 (or using an additional detection device). The electronic device 300 or processor may calculate the area of the exposed display from the detected position or coordinates of the dielectric protrusion 511.

Figure 7:
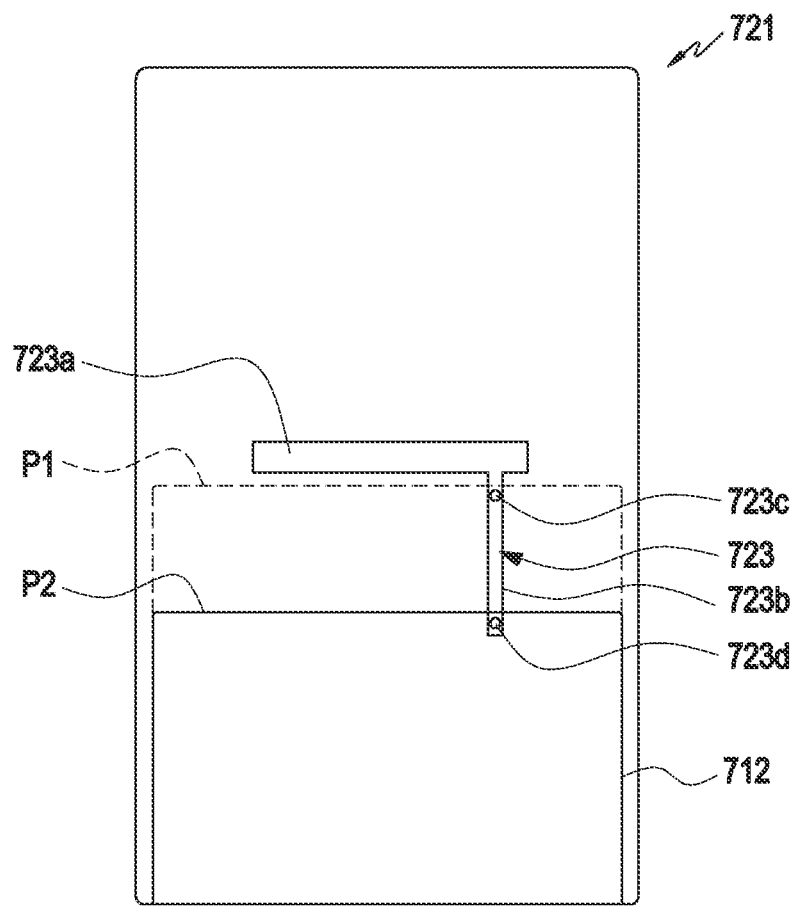
FIG. 7 is a plan view illustrating a second plate of an electronic device according to an embodiment of the disclosure.
Figure 8:
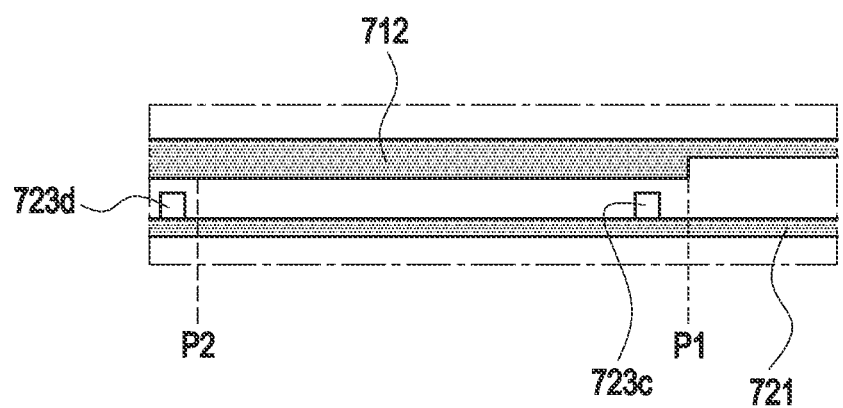
FIG. 8 is a view illustrating an example of an operation of an electronic device according to an embodiment of the disclosure.

FIG. 7 is a plan view illustrating a second plate of an electronic device according to an embodiment of the disclosure. FIG. 8 is a view illustrating an operation of an electronic device according to an embodiment of the disclosure.

Referring to FIGS. 7 and 8, a second plate 721 may include a conductive plate 723 provided on an inner surface, and the conductive plate 723 may include at least one of a ground portion 723a, an extension 723b extending from the ground portion 723a, and protrusions 723c and 723d formed on the extension 723b. The protrusions 723c and 723d may provide a function similar to that of the dielectric protrusion 511 of FIG. 5. For example, the positions (or coordinates) of the protrusions 723c and 723d may be detected through the touchscreen function of the display.

According to various embodiments of the disclosure, the conductive plate 723 may include at least one of a first protrusion 723c or a second protrusion 723d. In an embodiment of the disclosure, when the electronic device (e.g., the electronic device 101 of FIG. 1A) is in a closed state (e.g., when one end of the display 712 is positioned at the point indicated by 'P1'), the first protrusion 723c and the second protrusion 723d may be positioned to face one portion and another portion, respectively, of the display 712. The electronic device or the processor of the electronic device may detect the position (or coordinates) of the first protrusion 723c or the second protrusion 723d using the touchscreen function of the display 712 and, based on the detected position, determine that the electronic device is in a closed state.

According to various embodiments of the disclosure, if the electronic device or the first structure (e.g., the first structure 110 of FIG. 1A) gradually moves into an open state, the display 712 may move to a position off the first protrusion 723c. According to an embodiment of the disclosure, when the electronic device or the first structure is out of the closed state, the display 712 may detect the position of the second protrusion 723d through the touchscreen function, but the position of the first protrusion 723c may not be detected. For example, when the electronic device or the first structure leaves the closed state or reaches the open state (e.g., when one end of the display 712 is positioned at the point indicated by 'P2'), the electronic device or the processor of the electronic device may detect the position (or coordinates) of the second protrusion 723d using the touchscreen function of the display 712 and, based on the detected position or coordinates of the second protrusion 23d, calculate the exposed area of the display.

Figure 9:
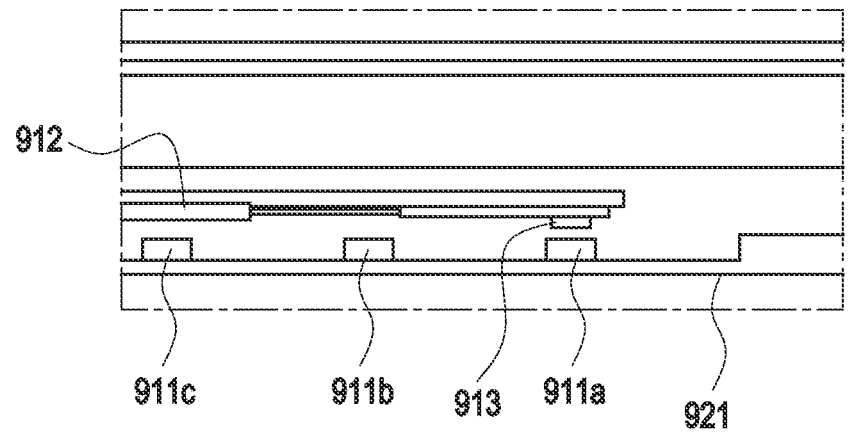
FIGS. 9 and 10 are views illustrating an operation of an electronic device according to various embodiments of the disclosure.
Figure 10:
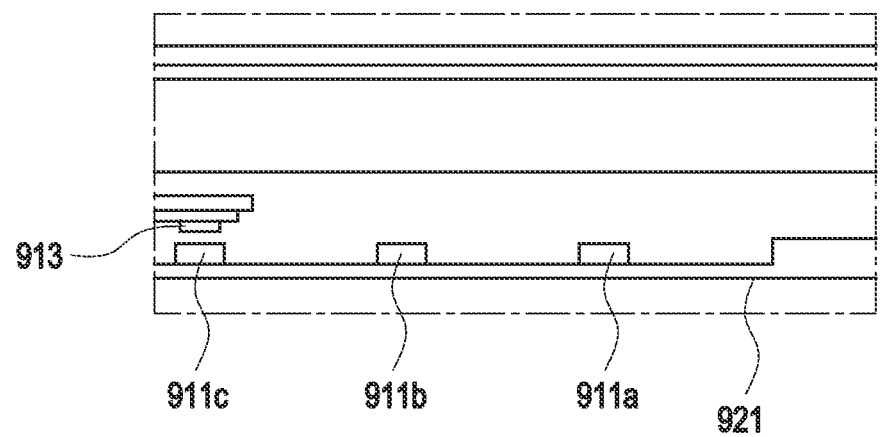
Figure 11:
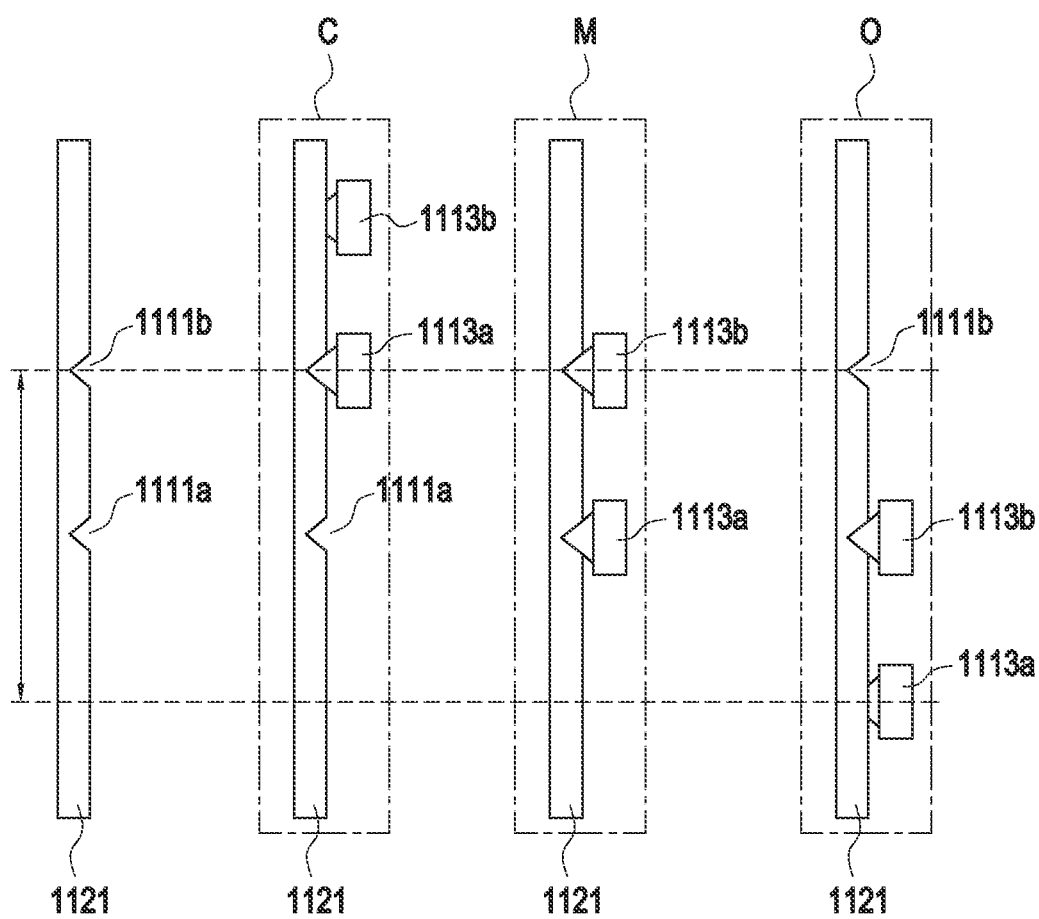
FIG. 11 is a view illustrating an operation of an electronic device according to an embodiment of the disclosure.

FIGS. 9 and 10 are views illustrating an operation of an electronic device according to various embodiments of the disclosure. FIG. 11 is a view illustrating an operation of an electronic device according to an embodiment of the disclosure.

Referring to FIGS. 9, 10, and 11, they may include the operation of detecting the closed state or open state of the first structure (e.g., the first structure 210 of FIG. 2), e.g., the display 912 (e.g., the display 212 of FIG. 2), using a detection element and a detection object. The detection element may include, e.g., a hall sensor (e.g., the hall sensors 911a, 911b, and 911c of FIG. 9 or 10), a switch element (e.g., the switch elements 1113a and 1113b of FIG. 11) mechanically operated, or a photo detector, and the detection object may be diversified depending on the type of the detection element. For example, if the hall sensor is used as a detection element, the detection object may include a magnet (e.g., the magnet 913 of FIG. 9). As another example, if a mechanical switch element is used as a detection element, the detection object may include a recess or protrusion (e.g., recesses 1111a and 1111b in FIG. 11) that may engage or interfere with the switch element. As another example, if a photo detector is used as a detection element, the detection object may include an optical pattern. If such a detection element is mounted on the first structure or display (e.g., the first structure 110 or the display 112 of FIG. 1A), the detection object may be mounted (or formed) on the second structure (e.g., the second structure 120 of FIG. 1A). In an embodiment of the disclosure, the detection element may be mounted on the second structure, and the detection object may be mounted on the first structure.

Referring to FIGS. 9 and 10, as the detection element, at least one of the hall sensors 911a, 911b, and 911c may be mounted on the second plate 921 (e.g., the second plate 221 of FIG. 2 or the second structure 220) and, as the detection object, at least one magnet 913 may be mounted on the display 912 (or the first plate 211 of FIG. 2). According to an embodiment of the disclosure, the three hall sensors 911a, 911b, and 911c may be mounted on the second plate 921, and one magnet 913 may be mounted on a structure connected to the display 912. For example, if the first structure (e.g., the first structure 110 of FIG. 1A) or the display 912 moves, the magnet may move accordingly.

According to various embodiments of the disclosure, when the electronic device is in a closed state (e.g., the state illustrated in FIG. 1A), the magnet 913 may be positioned to face the first hall sensor 911a. For example, when the first hall sensor 911a detects the magnet 913, the electronic device (or processor) may be determined to be in the closed state. When the electronic device is opened or reaches the open state (e.g., the state shown in FIG. 1B), the magnet 913 may be positioned to face the second hall sensor 911b or the third hall sensor 911c. For example, if the second hall sensor 911b or the third hall sensor 911c detects the magnet 913, the electronic device (or the processor) may determine that it is in the at least partially open state.

Referring to FIG. 11, at least one of the switch elements 1113a and 1113b operating in a push manner as the detection element may be mounted on the first structure (e.g., the first structure 110 of FIG. 1A) or the display (e.g., the display 112 of FIG. 1A) and, as the detection object, at least one of the recesses 1111a and 111b may be formed on the second plate 1121 (e.g., the second plate 221 of FIG. 2). According to an embodiment of the disclosure, the two switch elements 1113a and 1113b may be mounted on the first structure. The two recesses 1111a and 1111b may be formed in the second structure or the second plate 1121. As the first structure (e.g., the first structure 110 of FIG. 1A) moves, the switch elements 1113a and 1113b may be engaged with any one of the recesses 1111a and 1111b to be turned on/off. For example, in the closed state C, only the first switch element 1113a among the switch elements may be turned off and, in the open state O, only the second switch element 1113b may be turned off. In an embodiment of the disclosure, when both the first switch element 1113a and the second switch element 1113b are in an on state or both are in an off state, the first structure may be in an intermediate state M between the closed state C and the open state O. For example, the electronic device or the processor may detect at least a closed state or an open state of the electronic device based on on/off states of the switch elements 1113a and 1113b.

According to various embodiments, the number and arrangement positions of the detection elements (or detection objects) as described above may vary. For example, if more switch elements and detection objects (recesses or protrusions) corresponding to the switch elements are disposed, the exposed area of the display may be stepwise detected. The stepwise detection of the exposed area of the display is possible even when more hall sensors are used as detection elements. For example, combinations of detection elements and detection objects or the number of detection elements (or detection objects) may be varied considering the use environment of the electronic device (e.g., the electronic device 101 of FIG. 1A), moving range of the first structure (e.g., the first structure 110 of FIG. 1A), and detected position or coordinates.

Figure 12A:
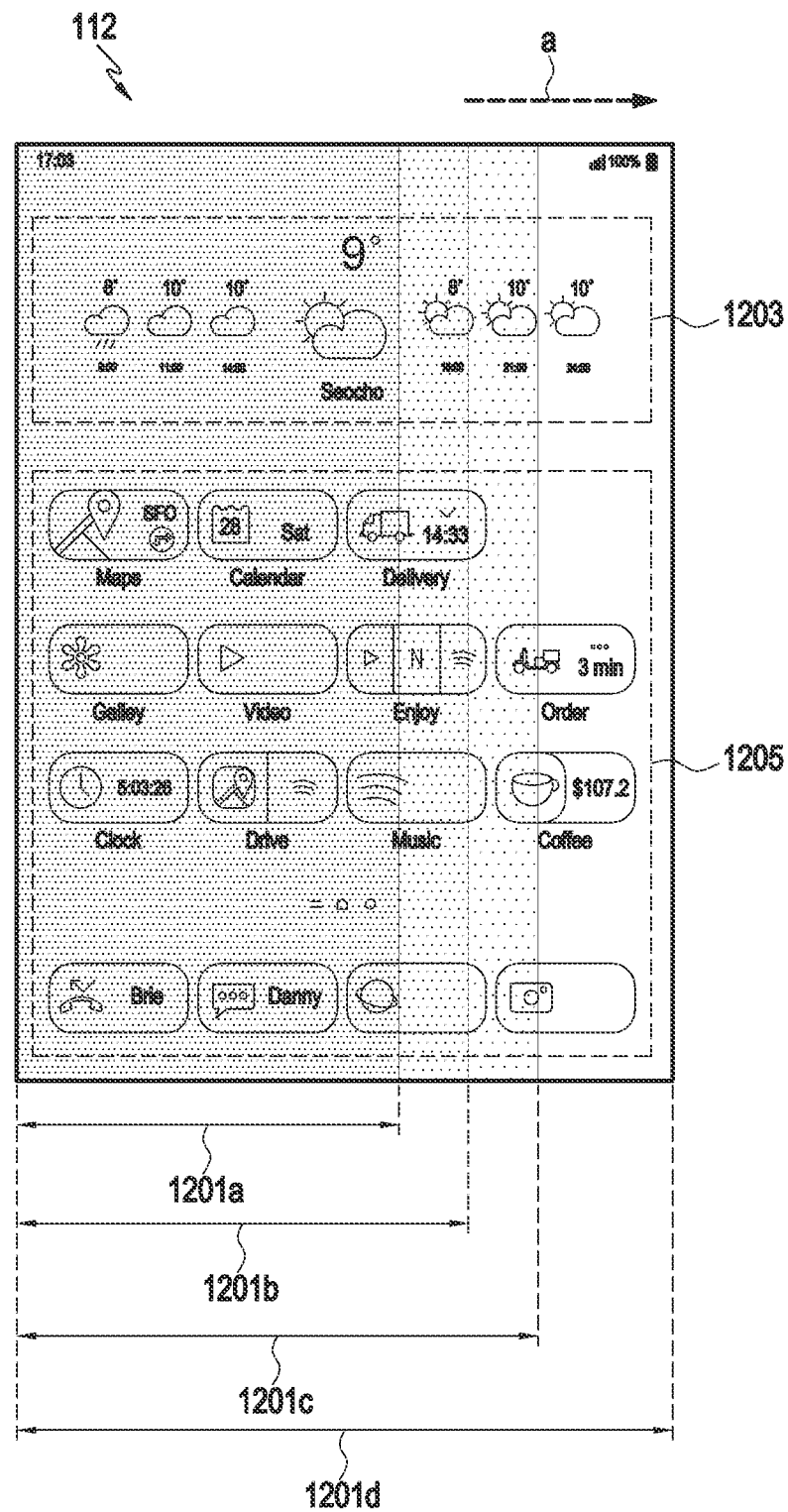
FIG. 12A illustrates a change in a display area of a flexible display according to an embodiment of the disclosure.
Figure 12B:
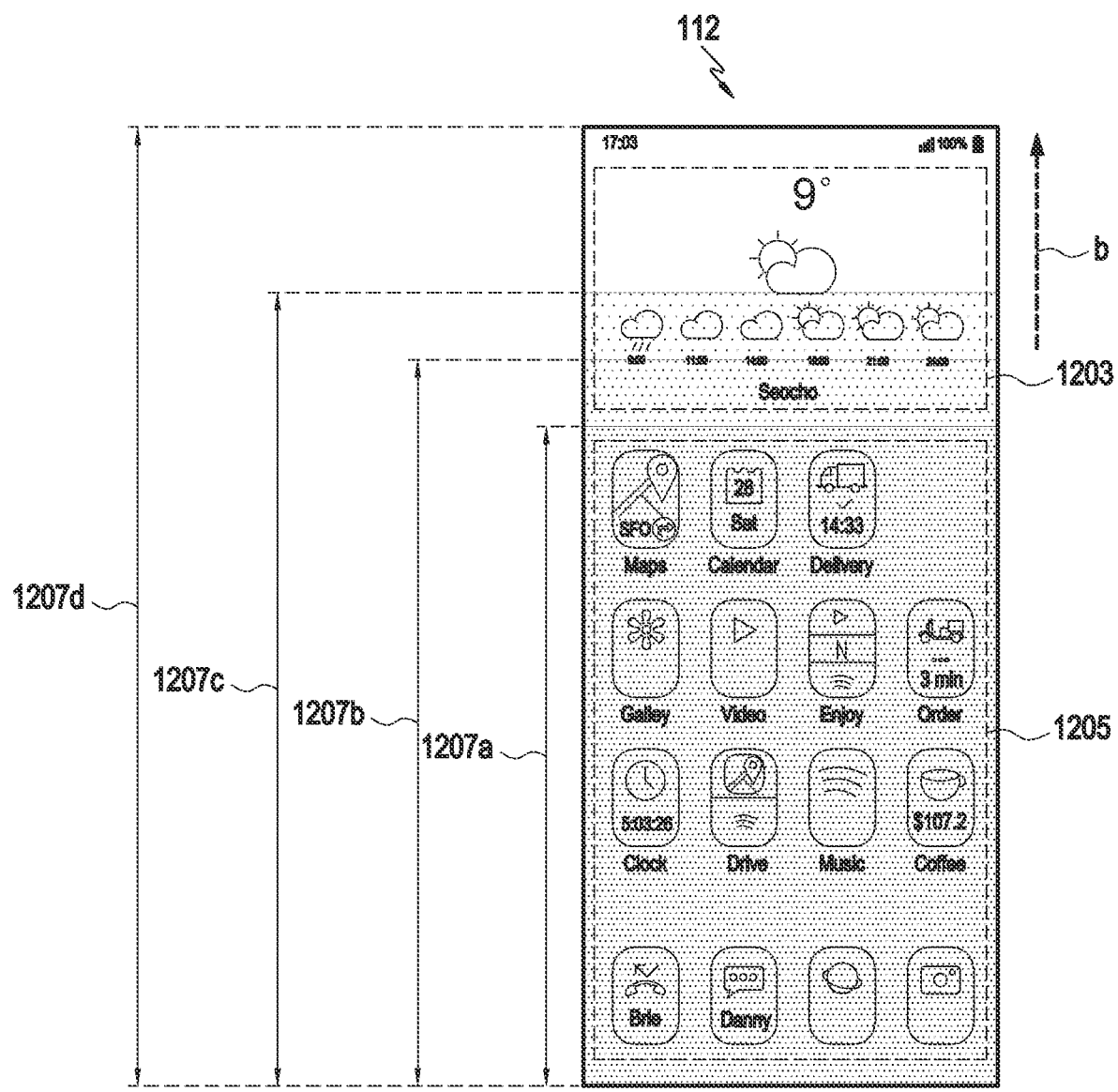
FIG. 12B illustrates a change in a display area of a flexible display according to an embodiment of the disclosure.
Figure 12C:
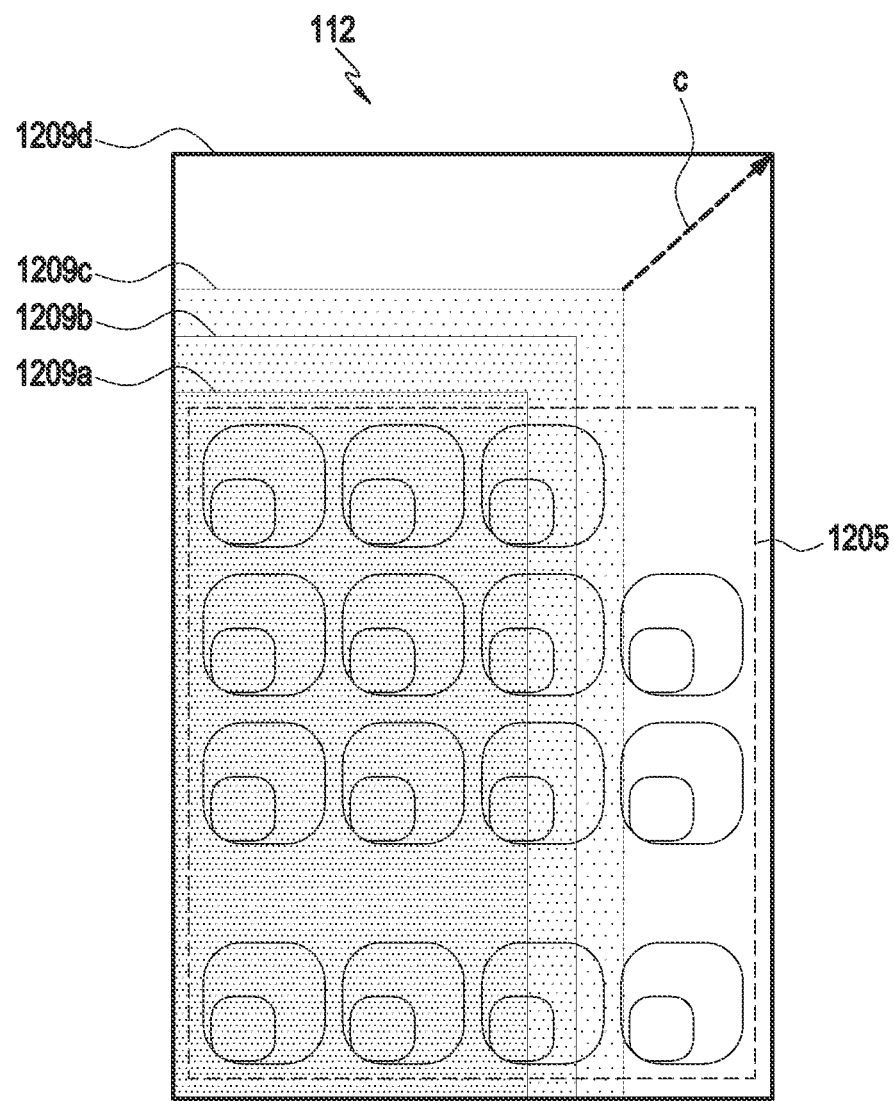
FIG. 12C illustrates a change in a display area of a flexible display according to an embodiment of the disclosure.

FIG. 12A illustrates a change in the display area (e.g., the display area of FIG. 1A or 2) of a flexible display according to an embodiment of the disclosure. FIG. 12B illustrates a change in a display area of a flexible display according to an embodiment of the disclosure. FIG. 12C illustrates a change in a display area of a flexible display according to an embodiment of the disclosure.

According to various embodiments, as the first structure (e.g., the first structure 110 of FIG. 1A) of the flexible display 112 moves, the size of the surface (e.g., the first surface 212a and/or the second surface 212b of FIG. 2) exposed to the outside may be changed. According to various embodiments, as the size of the surface (e.g., the first surface 212a and/or second surface 212b of FIG. 2) exposed to the outside is changed, the size of the display area (e.g., the display area of FIG. 1A or 2) (in other words, active area) of the flexible display 112 may be changed (e.g., enlarged or shrunken). According to various embodiments, the electronic device (e.g., the electronic device 101 of FIG. 1A) or the processor of the electronic device (e.g., the electronic device 101 of FIG. 1A) may determine the size of the display area (e.g., the display area of FIG. 1A or 2) using the touchscreen function or detection element of the flexible display 112. For example, the electronic device (e.g., the electronic device 101 of FIG. 1A) or the processor of the electronic device (e.g., the electronic device 101 of FIG. 1A) may identify the size of the surface (e.g., the first surface 212a and/or second surface 212b of FIG. 2) exposed to the outside by identifying the position or coordinates of the dielectric protrusion (e.g., the dielectric protrusion 511 of FIG. 5) or conductive protrusion (e.g., the first protrusion 723c and/or second protrusion 723d of FIG. 7) using the touchscreen function, and thereby determine the size of the display area (e.g., the display area of FIG. 1A or 2). For example, the electronic device (e.g., the electronic device 101 of FIG. 1A) or the processor of the electronic device (e.g., the electronic device 101 of FIG. 1A) may identifying the size of the surface (e.g., the first surface 212a and/or second surface 212b of FIG. 2) exposed to the outside by detecting the detection object (e.g., the magnet 913 of FIG. 9 or the recesses 1111a and 1111b of FIG. 11 or optical pattern) using the detection element (e.g., the hall sensors 911a and 911b of FIG. 9, the mechanical switch elements 1113a and 1113b of FIG. 11, or a photo detector), and thereby determine the size of the display area (e.g., the display area of FIG. 1A or 2). According to various embodiments, the electronic device (e.g., the electronic device 101 of FIG. 1A) or the processor of the electronic device (e.g., the electronic device 101 of FIG. 1A) may continuously and/or discretely determine the size of the display area (e.g., the display area of FIG. 1A or 2) (in other words, active area).

Referring to FIG. 12A, according to various embodiments, in the flexible display 112, the size of the display area (e.g., the display area of FIG. 1A or 2) may be changed in the horizontal direction a. For example, the display area (e.g., the display area of FIG. 1A or 2) of the flexible display 112 may be extended in the horizontal direction a in the order of 1201a, 1201b, 1201c, and 1201d. According to various embodiments, it will be appreciated by one of ordinary skill in the art that the display area (e.g., the display area of FIG. 1A or 2) of the flexible display 112 may be shrunken in the opposite direction to the horizontal direction a in the order of 1201d, 1201c, 1201b, and 1201a.

Referring to FIG. 12B, according to various embodiments, in the flexible display 112, the size of the display area (e.g., the display area of FIG. 1A or 2) may be changed in the vertical direction b. For example, the display area (e.g., the display area of FIG. 1A or 2) of the flexible display 112 may be extended in the vertical direction b in the order of 1207a, 1207b, 1207c, and 1207d. According to various embodiments, it will be appreciated by one of ordinary skill in the art that the display area (e.g., the display area of FIG. 1A or 2) of the flexible display 112 may be shrunken in the opposite direction to the vertical direction b in the order of 1207d, 1207c, 1207b, and 1207a.

Referring to FIG. 12C, according to various embodiments, in the flexible display 112, the size of the display area (e.g., the display area of FIG. 1A or 2) may be changed in an oblique direction c (in other words, diagonal direction). For example, the display area (e.g., the display area of FIG. 1A or 2) of the flexible display 112 may be extended in the oblique direction c in the order of 1209a, 1209b, 1209c, and 1209d. According to various embodiments, it will be appreciated by one of ordinary skill in the art that the display area (e.g., the display area of FIG. 1A or 2) of the flexible display 112 may be shrunken in the opposite direction to the oblique direction c in the order of 1209d, 1209c, 1209b, and 1209a.

Referring to FIGS. 12A, 12B, and 12C, according to various embodiments, various contents may be displayed on the display area (e.g., the display area of FIG. 1A or 2) of the flexible display 112. For example, at least one widget 1203 and/or at least one shortcut icon 1205 may be displayed on the display area (e.g., the display area of FIG. 1A or 2) of the flexible display 112. In the disclosure, unless otherwise specified, the display area of the flexible display 112 may be described as meaning the same area as the surface (e.g., the first surface 212a and/or second surface 212b of FIG. 2) exposed to the outside of the flexible display 112.

According to various embodiments, the widget 1203 may also be referred to as a mini application. According to various embodiments, if the widget 1203 is selected (e.g., touched), an execution screen corresponding to a designated state of a corresponding application may be displayed. According to various embodiments, the icon 1205 may be an icon for executing the application. According to various embodiments, it may be a shortcut icon for displaying an execution screen corresponding to an initial state or specific state of the corresponding application if the icon 1205 is selected (e.g., touched). According to various embodiments, the icon 1205 may be an extended shortcut icon further including a menu for providing additional information and/or function. The extended shortcut icon and/or the additional information and/or function provided through the extended shortcut icon are described below with reference to the drawings.

Referring to FIGS. 12A, 12B, and 12C, according to various embodiments, as the size of the display area (e.g., the display area of FIG. 1A or 2) of the flexible display 112 is changed, the attribute of the widget 1203 and/or icon 1205 displayed in the display area may be changed. For example, the attributes of the widget 1203 and/or icon 1205 may include physical size, array (in other words, layout), and/or content of information displayed therethrough. According to various embodiments, the attribute of the widget 1203 and/or icon 1205 displayed in the display area may be continuously changed. For example, the size of the widget 1203 and/or icon 1205 may be continuously changed corresponding to the size of the display area (e.g., the display area of FIG. 1A or 2) of the flexible display 112. According to various embodiments, the attribute of the widget 1203 and/or icon 1205 displayed in the display area may be discretely changed. For example, the attribute of the widget 1203 and/or icon 1205 displayed in the display area may be changed into the attribute corresponding to each of whenever the size of the surface (e.g., the first surface 212a and/or second surface 212b of FIG. 2) exposed to the outside reaches a first threshold size (e.g., 1201a, 1207a, or 1209a), whenever reaching a second threshold size (e.g., 1201b, 1207b, or 1209b), whenever reaching a third threshold size (e.g., 1201c, 1207c, or 1209c), or whenever reaching a fourth threshold size (e.g., 1201d, 1207d, or 1209d). For example, in a state in which the surface (e.g., the first surface 212a and/or second surface 212b of FIG. 2) exposed to the outside is the first threshold size (e.g., 1201a, 1207a, or 1209a), the attribute of the widget 1203 and/or icon 1205 displayed until before reaching the second threshold size (e.g., 1201b, 1207b, or 1209b) may be maintained, and the attribute of the widget 1203 and/or icon 1205 displayed when reaching the second threshold size (e.g., 1201b, 1207b, or 1209b) may be changed. Further, even in the case of reaching the third threshold size (e.g., 1201c, 1207c, or 1209c) (or fourth threshold size (e.g., 1201d, 1207d, or 1209d)) in a state in which the surface (e.g., the first surface 212a and/or second surface 212b of FIG. 2) exposed to the outside is the second threshold size (e.g., 1201b, 1207b, or 1209b) (or third threshold size (e.g., 1201c, 1207c, or 1209c)), in a similar manner, the attribute of the widget 1203 and/or icon 1205 displayed until before reaching the third threshold size (e.g., 1201c, 1207c, or 1209c) (or fourth threshold size (e.g., 1201d, 1207d, or 1209d)) may be maintained, and the attribute of the widget 1203 and/or icon 1205 displayed when reaching the third threshold size (e.g., 1201c, 1207c, or 1209c) (or fourth threshold size (e.g., 1201d, 1207d, or 1209d)) may be changed. The above-described four sizes (or steps) are exemplary and, according to less or more than four sizes (or steps), the attribute of the widget 1203 and/or icon 1205 displayed in the display area may be changed into the attribute corresponding to each thereof. Changes in the attribute of the widget 1203 and/or icon 1205 displayed in the display area are described below with reference to the drawings.

In the disclosure, it is described that the attribute of the widget 1203 and/or icon 1205 is changed in terms of changes in the size of the display area (e.g., the display area of FIG. 1A or 2) in the horizontal direction a, but a similar description is possible even where the size of the display area (e.g., the display area of FIG. 1A or 2) is changed in the above-described vertical direction b or oblique direction c. According to various embodiments, a method of displaying a shortcut icon, an extended shortcut icon, and/or a widget based on the size of the portion exposed to the outside of the flexible display and/or the size of the display area, described in the disclosure may be applied likewise to electronic devices including, e.g., a flexible display, which is able to increase or reduce the display area of the display.

Figure 13A:
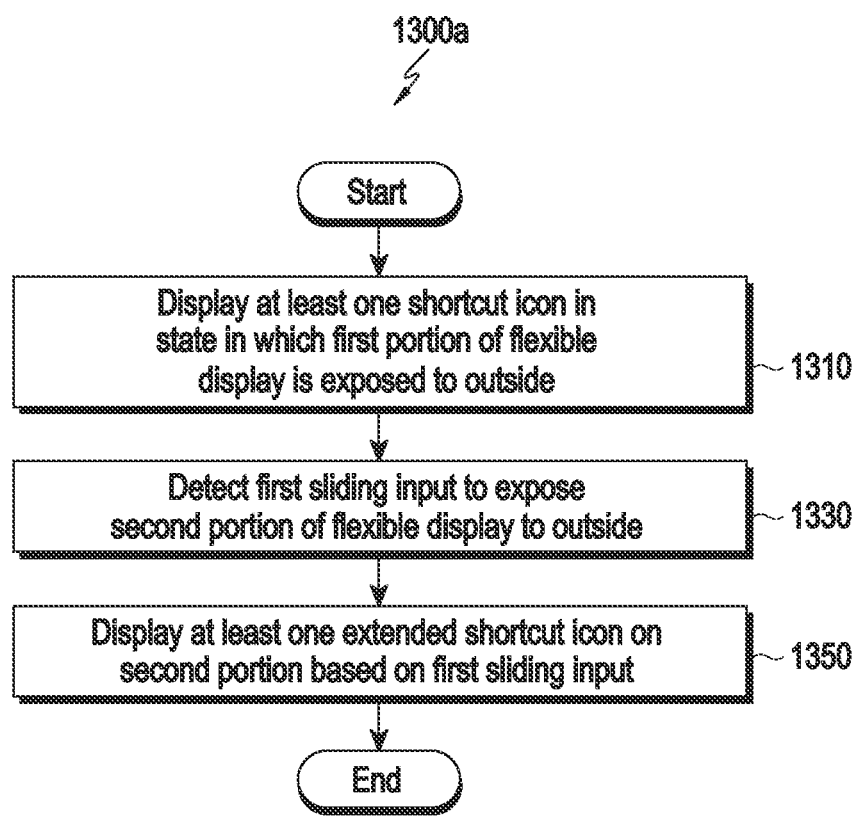
FIG. 13A is a flowchart illustrating an operation of displaying an extended shortcut icon by an electronic device according to an embodiment of the disclosure.

FIG. 13A is a flowchart 1300a illustrating an operation of displaying an extended shortcut icon by an electronic device according to an embodiment of the disclosure.

Referring to FIG. 13A, according to various embodiments, in operation 1310, the electronic device (e.g., the electronic device 101 of FIG. 1A) may display at least one shortcut icon in a state in which a first portion of the flexible display (e.g., the flexible display 112 of FIG. 1A) is exposed to the outside (e.g., closed state). According to various embodiments, if the icon is selected (e.g., touched), it may be a shortcut icon for displaying an execution screen corresponding to an initial state or specific state of the corresponding application. According to various embodiments, the at least one shortcut icon may be displayed on the display area (e.g., the display area of FIG. 1A or 2) of the flexible display (e.g., the flexible display 112 of FIG. 1A). For example, the display area of the flexible display (e.g., the flexible display 112 of FIG. 1A) may be 1201a of FIG. 12A, 1207 of FIG. 12B, or 1209a of FIG. 12C in the state in which the first portion is exposed to the outside. According to various embodiments, the display area in the state in which the first portion is exposed to the outside may mean an area in a relatively smaller size than the display area in the state in which the second portion, third portion, or fourth portion is exposed to the outside as described below in the disclosure and may mean, e.g., any one of 1201a of FIG. 12A, 1207a of FIG. 12B, or 1209a of FIG. 12C.

According to various embodiments, in operation 1330, the electronic device (e.g., the electronic device 101 of FIG. 1A) may detect a first sliding input to expose the second portion of the flexible display (e.g., the flexible display 112 of FIG. 1A) to the outside. For example, the display area of the flexible display (e.g., the flexible display 112 of FIG. 1A) may be 1201b of FIG. 12A, 1207b of FIG. 12B, or 1209b of FIG. 12C in the externally exposed state of the second portion (e.g., first open state). According to various embodiments, the display area in the externally exposed state of the second portion may mean an area relatively larger than the display area in the externally exposed state of the first portion described in the disclosure and relatively smaller than the display area in the externally exposed state of the third portion or fourth portion. For example, the display area in the externally exposed state of the second portion may mean any one of 1201b of FIG. 12A, 1207b of FIG. 12B, or 1209b of FIG. 12C. According to various embodiments, the electronic device (e.g., the electronic device 101 of FIG. 1A) or the processor of the electronic device (e.g., the electronic device 101 of FIG. 1A) may detect a movement of one surface (e.g., the first surface 212a, second surface 212b or the third surface 212c of FIG. 2) of the first structure (e.g., the first structure 110 of FIG. 1A) or flexible display using at least one sensor (e.g., a switch, hall sensor, touch sensor, pressure sensor, dielectric or metal) and detect the movement of one surface (e.g., the first surface 212a, second surface 212b or third surface 212c of FIG. 2) of the first structure (e.g., the first structure 110 of FIG. 1A) or flexible display, as the first sliding input. Sliding inputs to be described below in the disclosure may also be detected in the same manner According to various embodiments, the movement of one surface (e.g., the first surface 212a, second surface 212b or the third surface 212c of FIG. 2) of the first structure (e.g., the first structure 110 of FIG. 1A) or flexible display may be performed in response to the user's direct touch input to the flexible display (e.g., the flexible display 112 of FIG. 1A), the first structure (e.g., the first structure 110 of FIG. 1A), or the second structure (e.g., the second structure 120 of FIG. 1A) or an input to another structure (e.g., home button or another dedicated button) (not shown) disposed on the electronic device (e.g., the electronic device 101 of FIG. 1A).

According to various embodiments, in operation 1350, the electronic device (e.g., the electronic device 101 of FIG. 1A) may display at least one extended shortcut icon on the second portion based on the first sliding input. According to various embodiments, the extended shortcut icon may be an extended shortcut icon in which the physical size has been increased corresponding to the size of the display area in the exposed state of the second portion.

According to various embodiments, even when the electronic device (e.g., the electronic device 101 of FIG. 1A) includes a flexible display, a shortcut icon extended similarly may be displayed. For example, in the cases where the display of the electronic device is in the folded state and the display is in the unfolded state, the size of the display area of the display (e.g., activated area) or the portion exposed to the outside of the display may be varied. For example, the activated area of the display (or portion exposed to the outside of the display) when the display is in the unfolded state may be larger than the activated area of the display when the display is in the folded state. The electronic device may display the shortcut icon when the display is in the folded state and, when the display becomes the unfolded state, change the shortcut icon into an extended shortcut icon and display the extended shortcut icon. In other words, a display switch may be performed between the shortcut icon and the extended shortcut icon depending on the size of the externally exposed portion of the display or the activated area of the display.

Figure 13B:
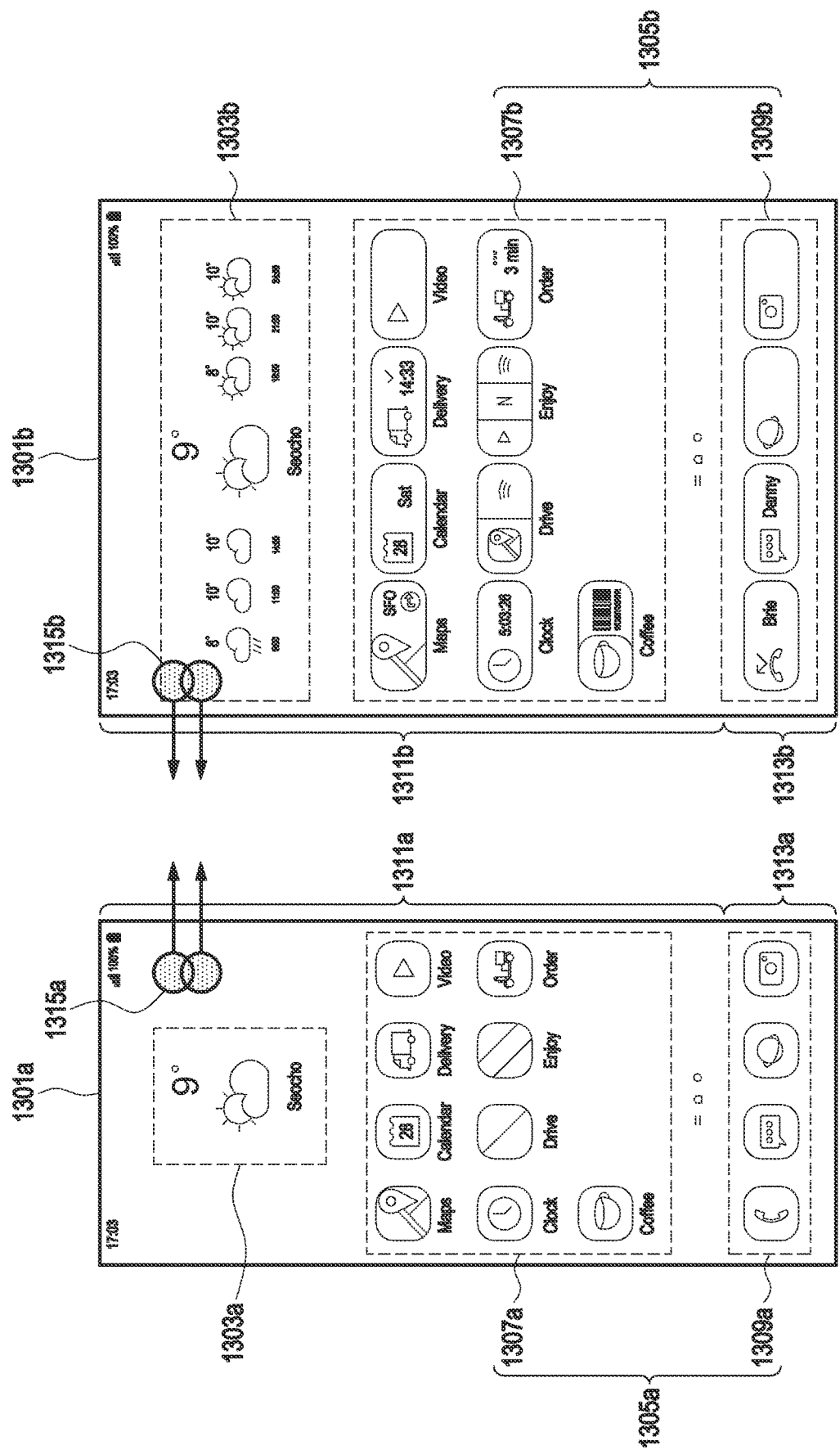
FIG. 13B illustrates a shortcut icon or an extended shortcut icon displayed on a flexible display according to a size of a display area according to an embodiment of the disclosure.

FIG. 13B illustrates a shortcut icon or an extended shortcut icon displayed on a flexible display depending on a size of a display area according to an embodiment of the disclosure.

Part (a) of FIG. 13B illustrates a home screen displayed in the display area 1301a of the flexible display (e.g., the flexible display 112 of FIG. 1A) in the exposed state (e.g., closed state) of the first portion of the flexible display (e.g., the flexible display 112 of FIG. 1A). According to various embodiments, the display area may mean an area activated to output a screen, of the externally exposed portion (e.g., first portion) of the flexible display (e.g., the flexible display 112 of FIG. 1A). According to various embodiments, the display area (i.e., the activated area) may include the whole or only part of the externally exposed portion (e.g., first portion) of the flexible display (e.g., the flexible display 112 of FIG. 1A).

Referring to part (a) of FIG. 13B, according to various embodiments, at least one widget 1303a and/or at least one shortcut icon 1305a may be displayed on the display area 1301*a*. According to various embodiments, the shortcut icon 1307*a* may be a shortcut icon displayed in, e.g., the home screen area 1311*a* constituting one area of the home screen displayed in the display area 1301*a*. According to various embodiments, the shortcut icon 1309*a* may be a shortcut icon displayed in, e.g., a dock area 1313*a* constituting another area of the home screen displayed in the display area 1301*a*. According to various embodiments, the shortcut icon 1309*a* may be displayed according to a different setting (e.g., size or layout) from the shortcut icon 1307*a*. According to various embodiments, if the shortcut icon 1305*a* is selected (e.g., touched), an execution screen corresponding to the initial state or specific state (e.g., state recently executed and displayed) of the corresponding application may be displayed. In the disclosure, the widget 1303*a* or shortcut icon 1305*a* shown in part (a) of FIG. 13B is described as having a first size.

Part (b) of FIG. 13B illustrates a home screen displayed in the display area 1301*b* of the flexible display (e.g., the flexible display 112 of FIG. 1A) in the exposed state (e.g., first open state) of the second portion, including the first portion, of the flexible display (e.g., the flexible display 112 of FIG. 1A). According to various embodiments, even in a state in which the portion (e.g., third portion or fourth portion) including the second portion is exposed (e.g., second open state or third open state), a description similar to part (b) of FIG. 13B may be made.

Referring to part (b) of FIG. 13B, according to various embodiments, at least one widget 1303*b* and/or at least one extended shortcut icon 1305*b* may be displayed on the display area 1301*b*. According to various embodiments, the extended widget 1303*b* has a larger physical size than the widget 1303*a* part (a) of FIG. 13B and may provide more information. For example, the widget 1303*a* provides information regarding the current weather (e.g., cloudy, 9 Celsius degrees) in a specific area (e.g., Seocho) while the extended widget 1303*b* may further provide real-time weather information (e.g., weather every three hours) for one day. According to various embodiments, the shortcut icon 1307*b* may be an extended shortcut icon displayed in, e.g., the home screen area 1311*b* constituting one area of the home screen displayed in the display area 1301*b*. According to various embodiments, the shortcut icon 1309*b* may be an extended shortcut icon displayed in, e.g., a dock area 1313*b* constituting another area of the home screen displayed in the display area 1301*b*. According to various embodiments, at least one extended widget 1303*b* and/or at least one extended shortcut icon 1305*b* may be disposed in an array (e.g., relative positional relationship with adjacent icons) corresponding to the pre-extension state (e.g., part (a) of FIG. 13B). According to various embodiments, the extended shortcut icon 1309*b* may also be displayed according to a setting (e.g., layout) different from the extended shortcut icon 1307*b*. According to various embodiments, when the extended shortcut icon 1305*b* is selected (e.g., touched), an additional function may further be provided in addition to the function of displaying the execution screen corresponding to the initial state or specific state of the corresponding application. For example, the additional function may include the function of displaying additional information based on the user's setting (e.g., when the user sets to expose specific information), use-related information (e.g., the user's current position, current time and/or the manner in which the user uses the application), and/or application setting (e.g., when the application is set to provide specific information) or displaying a menu for providing an additional function (e.g., a corresponding application function).

In the disclosure, the size of the extended shortcut icon 1305*b* and the widget 1303*b* shown in part (b) of FIG. 13B is described as being a second size.

According to various embodiments, the above-described first and second sizes may be determined based on the size of the display area (e.g., the display area of FIG. 1A or 2) and/or the size of the externally exposed portion of the flexible display (e.g., the flexible display 112 of FIG. 1A). For example, the extended shortcut icon 1305*b* may be displayed in a size about twice (e.g., 2.3 times) the shortcut icon 1305*a* in a state in which the second portion of the flexible display (e.g., the flexible display 112 of FIG. 1A) is exposed to the outside or its corresponding display area is activated. For example, the extended shortcut icon 1305*b* may be displayed in a size about three times (e.g., 3.3 times) the shortcut icon 1305*a* in a state in which the third portion of the flexible display (e.g., the flexible display 112 of FIG. 1A) is exposed to the outside or its corresponding display area is activated. For example, the extended shortcut icon 1305*b* may be displayed in a size about four times (e.g., 4.5 times) the shortcut icon 1305*a* in a state in which the fourth portion of the flexible display (e.g., the flexible display 112 of FIG. 1A) is exposed to the outside or its corresponding display area is activated.

For example, when the size of the display area 1301*b* is twice the size of the display area 1301*a*, the second size may be twice (or substantially twice) the first size.

According to various embodiments, according to the first sliding input (e.g., the first sliding input of FIG. 13A), the size of the externally exposed portion of the flexible display (e.g., the flexible display 112 of FIG. 1A) may increase, so that the display area may be increased. For example, the display area may be changed from the display area 1301*a* to the display area 1301*b* according to the first sliding input (e.g., the first sliding input of FIG. 13A). Similarly, when the size of the externally exposed portion of the flexible display (e.g., the flexible display 112 of FIG. 1A) reduces, the display area may be decreased (e.g., changed from the display area 1301*b* to the display area 1301*a*).

According to various embodiments, the switch between the display state of part (a) of FIG. 13B and the display state of part (b) of FIG. 13B may be made according to the user's gesture on the display area. According to various embodiments, when the size of the display area increases (e.g., changes from the closed state to the first open state), the increased portion of the display area may be displayed as an empty space or the home screen of the adjacent next page may be displayed. According to various embodiments, upon further detecting a swipe gesture 1315*a* to the right on one area (e.g., display area 1301*a*) of the increased display area, the display state may be changed from the display state of part (a) of FIG. 13B to the display state of part (b) of FIG. 13B. According to various embodiments, upon further detecting a swipe gesture 1315*b* to the left on the display area 1301*b*, the display state may be changed from the display state of part (b) of FIG. 13B to the display state of part (a) of FIG. 13B.

According to various embodiments, the size of the display area may be changed according to the user's gesture on the display area. According to various embodiments, although the size of the externally exposed portion of the flexible display (e.g., the flexible display 112 of FIG. 1A) is increased (e.g., although the state is changed from the closed state to the first open state), the size of the display area may be maintained. According to various embodiments, the increased portion of the externally exposed portion of the flexible display (e.g., the flexible display 112 of FIG. 1A)

may remain in the inactive state. According to various embodiments, when the user's gesture on the display area (e.g., the area in the active state) is detected in a state in which the size of the externally exposed portion has been increased, the size of the display area may be increased (e.g., the portion which remains in the inactive state may be switched into the active state). For example, upon further detecting a swipe gesture 1315a to the right on the display area 1301a in a state in which the size of the externally exposed portion of the flexible display (e.g., the flexible display 112 of FIG. 1A) is increased (e.g., when the state is changed from the closed state to the first open state), the size of the display area may be increased. According to various embodiments, upon further detecting a swipe gesture 1315b to the left on one area (e.g., the externally exposed portion of the display area 1301b) of the display area 1301b in a state in which a reduction in the size of the externally exposed portion of the flexible display (e.g., the flexible display 112 of FIG. 1A) is detected (e.g., when the state is changed from the first open state to the closed state), the size of the display area may be reduced.

Figure 13C:
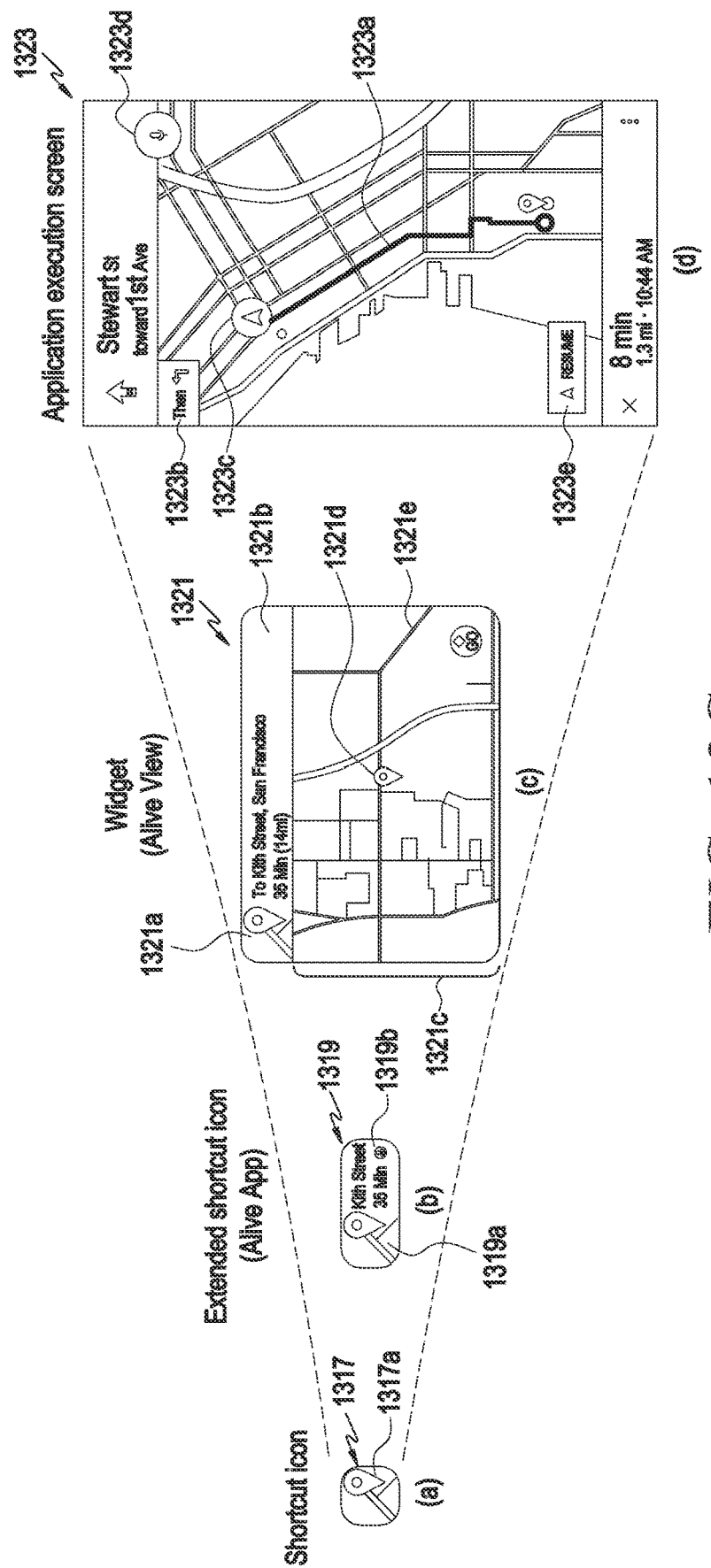
FIG. 13C is a view illustrating various types of contents of an application according to an embodiment of the disclosure.

FIG. 13C is a view illustrating various types of contents of an application according to an embodiment of the disclosure.

Referring to FIG. 13C, a shortcut icon 1317 (e.g., 1305a of part (a) of FIG. 13B, an extended shortcut icon 1319 (e.g., 1305b of FIG. 13B), a widget 1321 (e.g., 1303a or 1303b of FIG. 13B), and an application execution screen 1323 are shown. According to various embodiments, the shortcut icon 1317, the extended shortcut icon 1319, and/or the widget 1321 may be displayed on a home screen (e.g., the home screen areas 1311a and 1311b and the dock area 1313b of FIG. 13B).

Referring to part (a) of FIG. 13C, according to various embodiments, the shortcut icon 1317 may include an icon image 1317a representing a corresponding application. For example, referring to part (a) of FIG. 13C, the icon image 1317a may indicate that the corresponding application is a map application. According to various embodiments, the shortcut icon 1317 may further include text representing the corresponding application (e.g., the name of the application). According to various embodiments, if the shortcut icon 1317 is selected (e.g., touched) by the user, the execution screen of the corresponding application, corresponding to the initial state or specific state, may be displayed.

Referring to part (b) of FIG. 13C, according to various embodiments, the extended shortcut icon 1319 may include a first area where the icon image 1319a is displayed and a second area where at least one menu 1319b is displayed. In the disclosure, the first and second areas of the extended shortcut icon 1319 are described below. In the disclosure, unless otherwise specified, the second area may mean a remaining area of the extended shortcut icon 1319 except for the first area where the image 1319a is displayed. According to various embodiments, the first and second areas may be set as one non-separated area.

According to various embodiments, the icon image 1319a may represent a corresponding application. For example, referring to part (b) of FIG. 13C, the icon image 1319a may indicate that the corresponding application is a map application. According to various embodiments, the icon image 1319a of the extended shortcut icon 1319 may be the same as or partially different from the icon image 1317a of the shortcut icon 1317. According to various embodiments, if the icon image 1319a is selected by the user, an execution screen corresponding to a specific state (e.g., initial state) of the corresponding application may be displayed. According to various embodiments, the icon image 1319a may not be displayed. In this case, at least one menu 1319b may be displayed on the entire area of the extended shortcut icon 1319.

According to various embodiments, the at least one menu 1319b may provide additional information and/or functions related to the corresponding application. According to various embodiments, the additional information may be information and/or function based on the user's setting (e.g., when the user sets to expose specific information), user-related information (e.g., the user's current position, current time and/or the manner in which the user uses the application), and/or application setting (e.g., when the application is set to provide specific information). For example, referring to part (b) of FIG. 13C, information about the destination searched by the user (e.g., "Kith Street") and/or information about the estimated time (e.g., "35 Min.") from the user's current location to the destination may be displayed through the menu 1319b. According to various embodiments, the additional information may include at least part of information displayed on the widget 1321 or the application execution screen 1323. According to various embodiments, the additional information displayed through the menu 1319b may be provided in real-time. For example, referring to part (b) of FIG. 13C, when the user moves and the current location is changed, the estimated time required based on the changed current location may be updated in real-time and displayed through the menu 1319b. According to various embodiments, at least one menu 1319b may be selectable by the user. For example, when at least one menu 1319b is selected (e.g., touched) by the user, a function related to additional information or a designated function of the corresponding application may be provided. For example, referring to parts (b) and (d) of FIG. 13C, when the menu 1319b is selected by the user, the application execution screen 1323 related to information about the destination searched by the user and/or information about the estimated time required may be displayed. According to various embodiments, when the menu 1319b is selected by the user, a screen corresponding to the application execution screen 1323, e.g., related to information about the destination searched by the user and/or the estimated required time, may be displayed in a pop-up form (e.g., a pop-up window). Although not shown, if the corresponding application is a media playback application, the extended shortcut icon of the media playback application may also include a menu and, if a menu is selected, e.g., a function of pausing playback of the media being played may be provided. According to various embodiments, there may be a plurality of menus 1319b. According to various embodiments, when the corresponding application supports a plurality of displayable menus, some menus determined based on the priority set by the user may also be displayed.

Referring to part (c) of FIG. 13C, according to various embodiments, the widget 1321 may include a first area where an icon image 1321a representing a corresponding application is displayed, a second area where at least one menu 1321b is displayed, and a third area in which a widget screen 1321c is displayed. In the disclosure, the first, second, and third areas of the widget 1321 are described below. According to various embodiments, the first and second areas may be set as one non-separated area. According to various embodiments, the icon image 1321a of the widget 1321 may be the same as or partially different from the icon image 1317a of the shortcut icon 1317 or the icon image 1319a of the extended shortcut icon 1319. According to various embodiments, the menu 1321b of the widget 1321 may be the same as or partially different from the menu 1319b of the extended shortcut icon 1319. For example, the menu 1321b may be selectable by the user, similarly to the extended shortcut icon 1319. In this case, a function related to additional information or a designated function of the corresponding application may be provided. Alternatively, e.g., the menu 1321b may display only additional information. According to various embodiments, the additional information displayed through the menu 1321b may include more detailed information than the menu 1319b of the extended shortcut icon 1319. For example, referring to parts (b) and (c) of FIG. 13C, the additional information about the menu 1321b, as compared with the menu 1319b of the extended shortcut icon 1319, may further include detailed information (e.g., Kith Street, San Francisco) about the destination, information (e.g., "To") indicating the fact that the displayed location is the destination, and information (e.g., "14 mi") regarding the remaining distance to the destination from the user's current location. According to various embodiments, the widget screen 1321c may include information based on the user's setting (e.g., when the user sets to expose specific information), use-related information (e.g., the user's current position, current time and/or the manner in which the user uses the application), and/or application setting (e.g., when the application is set to provide specific information). For example, the widget screen 1321c may include location information 1321d about the user's destination and information 1321e about the surrounding geography. According to various embodiments, the menu 1321b and/or the widget screen 1321c may be provided in real-time. For example, information displayed through the above-described menu 1321b and/or widget screen 1321c may be updated and displayed in real-time based on the user's current location.

According to various embodiments, the application execution screen 1323 may provide more information and/or more functions than the widget screen 1321. For example, referring to parts (c) and (d) of FIG. 13C, the application execution screen 1323, as compared with the widget screen 1321, may further include information 1323a about the route to the destination from the current location, information 1323b about the direction in the route from the current location and information 1323c about the current location. For example, referring to part (d) of FIG. 13C, the application execution screen 1323 may further include an icon 1323d providing a voice search function and an icon 1323e providing a function of updating the displayed screen.

As described above, the extended shortcut icon 1319 and the widget 1321 may provide an additional function through a selectable menu and/or a function of displaying additional information as well as the function of the shortcut icon 1317, on the home screen. Further, the additional information displayed may be updated in real-time. Thus, the extended shortcut icon 1319 and widget 1321 may provide additional information and/or additional functions even without entry to the application execution screen 1323 (in other words, at the zero depth).

Figure 14:
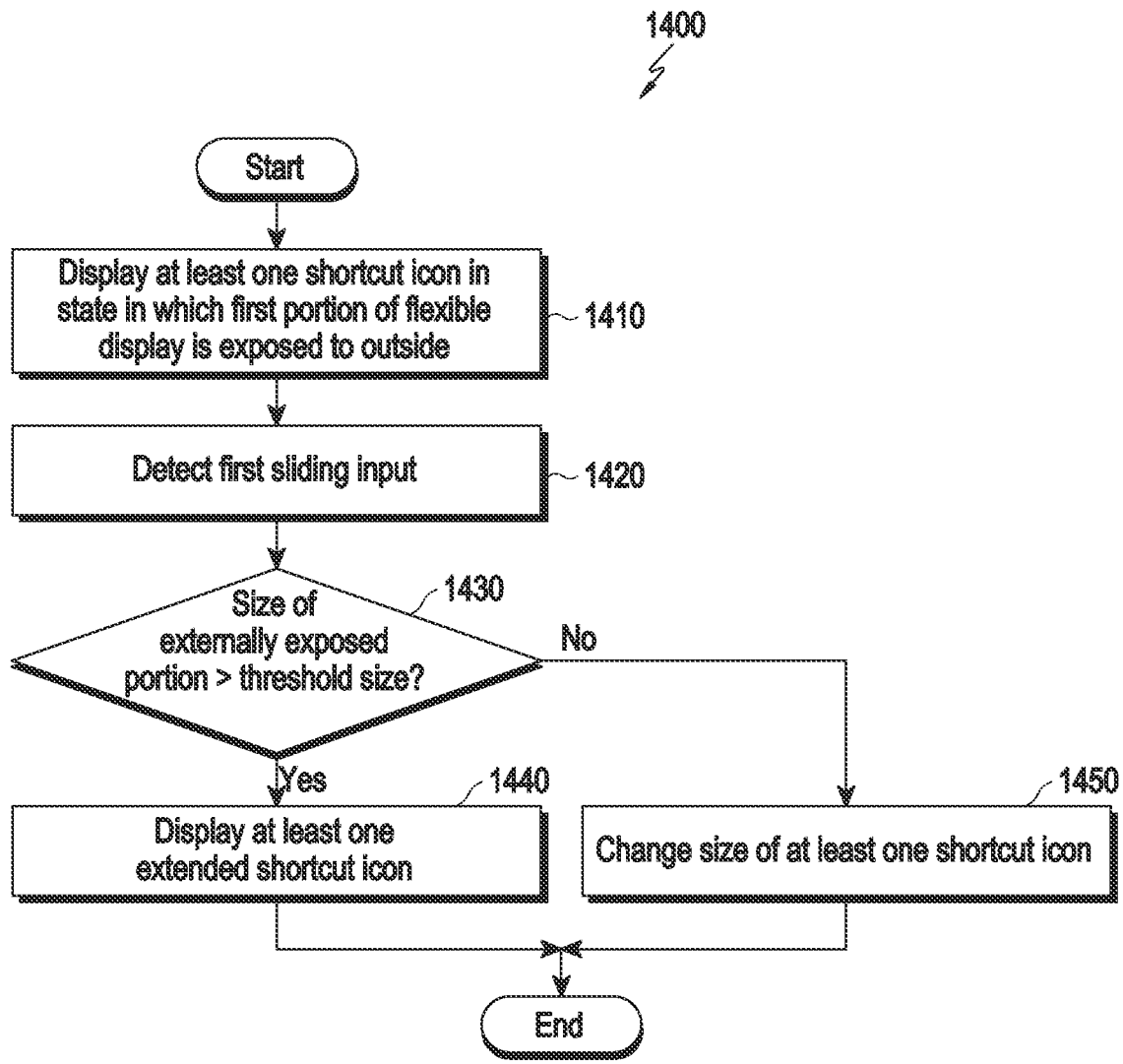
FIG. 14 is a flowchart illustrating an operation method of extending a shortcut icon by an electronic device according to an embodiment of the disclosure.

FIG. 14 is a flowchart 1400 illustrating an operation method for extending a shortcut icon by an electronic device according to an embodiment of the disclosure.

Referring to FIG. 14, according to various embodiments, in operation 1410, the electronic device (e.g., the electronic device 101 of FIG. 1A) may display at least one shortcut icon (e.g., the shortcut icon 1305a of FIG. 13B) in a state in which a first portion of the flexible display (e.g., the flexible display 112 of FIG. 1A) is exposed to the outside (e.g., closed state). According to various embodiments, the at least one shortcut icon (e.g., the shortcut icon 1305a of FIG. 13B) may be displayed in a first size (e.g., the first size of FIG. 13B).

According to various embodiments, the electronic device (e.g., the electronic device 101 of FIG. 1A) may detect the first sliding input (e.g., the first sliding input of FIG. 13A) in operation 1420.

According to various embodiments, in operation 1430, the electronic device (e.g., the electronic device 101 of FIG. 1A) may identify whether the size of the externally exposed portion (e.g., the first surface 212a and/or second surface 212b of FIG. 2) exceeds a threshold size. For example, the threshold size may be a second threshold size (e.g., 1201b of FIG. 12A, 1207b of FIG. 12B, or 1209b of FIG. 12C).

According to various embodiments, upon identifying that the size of the externally exposed portion (e.g., the first surface 212a and/or second surface 212b of FIG. 2) exceeds the threshold size, the electronic device (e.g., the electronic device 101 of FIG. 1A) may display at least one extended shortcut icon (e.g., the extended shortcut icon 1305b of FIG. 13B) in operation 1440.

According to various embodiments, if the size of the display area of the flexible display (e.g., the flexible display 112 of FIG. 1A) increases as the size of the externally exposed portion (e.g., the first surface 212a and/or second surface 212b of FIG. 2) increases, the electronic device (e.g., the electronic device 101 of FIG. 1A) may gradually (in other words, continuously) increase the size of at least one shortcut icon (e.g., the shortcut icon 1305a of FIG. 13B) corresponding to the size of the display area. According to various embodiments, if the increased size of the externally exposed portion (e.g., the first surface 212a and/or second surface 212b of FIG. 2) reaches the threshold size, the size of the at least one shortcut icon (e.g., the shortcut icon 1305a of FIG. 13B) may be increased to the second size (e.g., the second size of FIG. 13B). According to various embodiments, if the size of the at least one shortcut icon (e.g., the shortcut icon 1305a of FIG. 13B) reaches the second size, the electronic device (e.g., the electronic device 101 of FIG. 1A) may change the at least one shortcut icon (e.g., the shortcut icon 1305a of FIG. 13B) into at least one extended shortcut icon (e.g., the extended shortcut icon 1305b of FIG. 13B) and display it. According to various embodiments, when a user gesture is detected on the display area or the at least one shortcut icon (e.g., the shortcut icon 1305a of FIG. 13B) after the size of the at least one shortcut icon (e.g., the shortcut icon 1305a of FIG. 13B) reaches the second size, the electronic device (e.g., the electronic device 101 of FIG. 1A) may change the at least one shortcut icon (e.g., the shortcut icon 1305a of FIG. 13B) into at least one extended shortcut icon (e.g., the extended shortcut icon 1305b of FIG. 13B) and display it.

According to various embodiments, the electronic device (e.g., the electronic device 101 of FIG. 1A) may not increase the size of the at least one shortcut icon (e.g., the shortcut icon 1305a of FIG. 13B) until before the size of the externally exposed portion (e.g., the first surface 212a and/or second surface 212b of FIG. 2) reaches the threshold size. According to various embodiments, if the size of the externally exposed portion (e.g., the first surface 212a and/or second surface 212b of FIG. 2) reaches the threshold size, the electronic device (e.g., the electronic device 101 of FIG. 1A) may change the at least one shortcut icon (e.g., the shortcut icon 1305a of FIG. 13B) into at least one extended shortcut icon (e.g., the extended shortcut icon 1305b of FIG. 13B) and display it.

According to various embodiments, if a swipe gesture (e.g., 1315a of FIG. 13B) to the right on one area (e.g., the display area 1301a of FIG. 13B) of the increased display area is further detected after the size of the externally exposed portion (e.g., the first surface 212a and/or second surface 212b of FIG. 2) exceeds the threshold size, the electronic device (e.g., the electronic device 101 of FIG. 1A) may change the at least one shortcut icon (e.g., the shortcut icon 1305a of FIG. 13B) into at least one extended shortcut icon (e.g., the extended shortcut icon 1305b of FIG. 13B) and display it.

According to various embodiments, if a user gesture (e.g., a long touch and slide gesture on at least one shortcut icon (e.g., the shortcut icon 1305a of FIG. 13B)) on at least one shortcut icon (e.g., the shortcut icon 1305a of FIG. 13B) is identified, the electronic device (e.g., the electronic device 101 of FIG. 1A) may change at least one shortcut icon (e.g., the shortcut icon 1305a of FIG. 13B) into at least one extended shortcut icon (e.g., the extended shortcut icon 1305b of FIG. 13B) and display it.

According to various embodiments, the at least one extended shortcut icon (e.g., the extended shortcut icon 1305b of FIG. 13B) may be displayed in a second size (e.g., the second size of FIG. 13B).

According to various embodiments, upon identifying that the size of the externally exposed portion (e.g., the first surface 212a and/or second surface 212b of FIG. 2) does not exceed the threshold size, the electronic device (e.g., the electronic device 101 of FIG. 1A) may change the size of at least one shortcut icon (e.g., the shortcut icon 1305a of FIG. 13B) in operation 1450. According to various embodiments, the electronic device (e.g., the electronic device 101 of FIG. 1A) may increase the size of at least one shortcut icon (e.g., the shortcut icon 1305a of FIG. 13B) corresponding to the increased size of the externally exposed portion (e.g., the first surface 212a and/or second surface 212b of FIG. 2).

According to various embodiments, when the size of the externally exposed portion (e.g., the first surface 212a and/or second surface 212b of FIG. 2) is smaller than or equal to the threshold size, the electronic device (e.g., the electronic device 101 of FIG. 1A) may change the extended shortcut icon (e.g., the extended shortcut icon 1305b of FIG. 13B) into a shortcut icon (e.g., the shortcut icon 1305a of FIG. 13B) and display it. According to various embodiments, as the size of the externally exposed portion (e.g., the first surface 212a and/or second surface 212b of FIG. 2) is decreased, the electronic device (e.g., the electronic device 101 of FIG. 1A) may gradually (in other words, continuously) reduce the size of the extended shortcut icon (e.g., the extended shortcut icon 1305b of FIG. 13B). According to various embodiments, if the size of the extended shortcut icon (e.g., the extended shortcut icon 1305b of FIG. 13B) reaches a designated size (e.g., the first size of FIG. 13B) as the size of the externally exposed portion (e.g., the first surface 212a and/or second surface 212b of FIG. 2) is decreased, the electronic device (e.g., the electronic device 101 of FIG. 1A) may change the extended shortcut icon (e.g., the extended shortcut icon 1305b of FIG. 13B) into the shortcut icon (e.g., the shortcut icon 1305a of FIG. 13B) and display it. According to various embodiments, if a swipe gesture (e.g., 1315b of FIG. 13B) to the left on one area of the display area is further detected after the size of the externally exposed portion (e.g., the first surface 212a and/or second surface 212b of FIG. 2) is smaller than or equal to the threshold size, the electronic device (e.g., the electronic device 101 of FIG. 1A) may change the extended shortcut icon (e.g., the extended shortcut icon 1305b of FIG. 13B) into a shortcut icon (e.g., the shortcut icon 1305a of FIG. 13B) and display it. According to various embodiments, upon identifying a user gesture on the extended shortcut icon (e.g., the extended shortcut icon 1305b of FIG. 13B) (e.g., a long touch and slide gesture on the extended shortcut icon (e.g., the extended shortcut icon 1305b of FIG. 13B)), the electronic device (e.g., the electronic device 101 of FIG. 1A) may change the extended shortcut icon (e.g., the extended shortcut icon 1305b of FIG. 13B) into the shortcut icon (e.g., the shortcut icon 1305a of FIG. 13B) and display it.

Figure 15A:
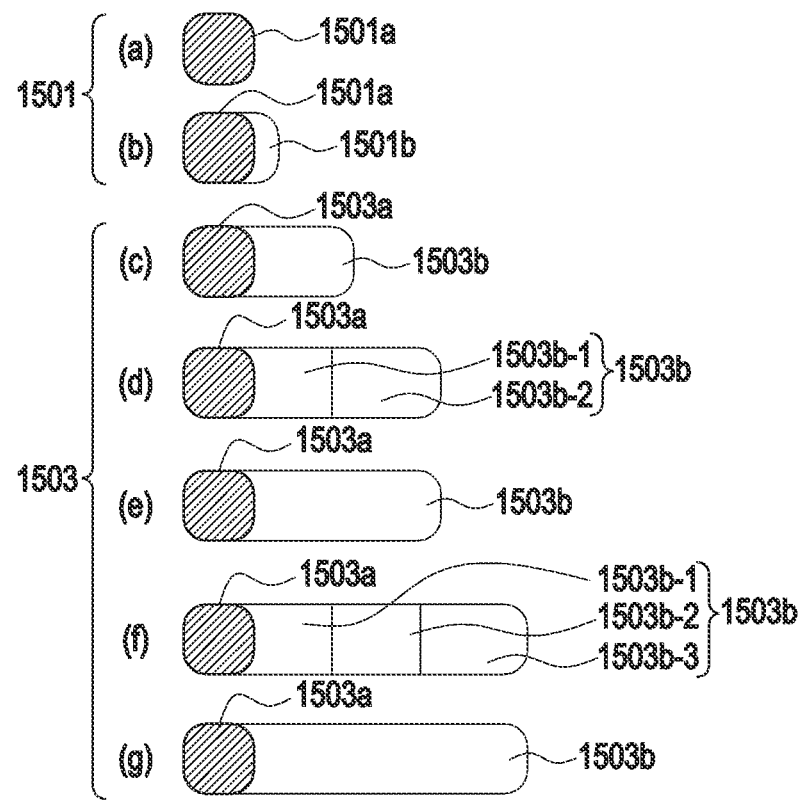
FIG. 15A illustrates areas constituting a shortcut icon and an extended shortcut icon according to an embodiment of the disclosure.

FIG. 15A illustrates areas constituting a shortcut icon and an extended shortcut icon according to an embodiment of the disclosure.

Parts (a) and (b) of FIG. 15A illustrate examples of a shortcut icon (e.g., the shortcut icon 1305a of FIG. 13B), and parts (c) to (g) of FIG. 15A illustrate examples of an extended shortcut icon (e.g., the extended shortcut icon 1305b of FIG. 13B).

Referring to parts (a) and (b) of FIG. 15A, according to various embodiments, the shortcut icon 1501 may include a first area 1501a. According to various embodiments, an icon image (e.g., the icon image 1317a of FIG. 13C) may be displayed in the first area 1501a.

Referring to part (b) of FIG. 15A, according to various embodiments, the shortcut icon 1501 may be, e.g., the shortcut icon which increased in size, as described with reference to FIG. 14. According to various embodiments, the size of the shortcut icon 1501 may correspond to the size of the externally exposed portion (e.g., the first surface 212a and/or second surface 212b of FIG. 2), the size of the display area of the flexible display (e.g., the flexible display 112 of FIG. 1A), and/or the moving distance of the user gesture on the shortcut icon 1501. According to various embodiments, the shortcut icon 1501 may further include a second area 1501b. According to various embodiments, a visual effect for indicating that the size of the shortcut icon 1501 is increasing may be displayed in the second area 1501b. For example, the visual effect may include a gradation effect based on the image displayed in the first area 1501a or a visual effect in a color different from the image displayed in the first area 1501a. According to various embodiments, a visual effect at least partially related to a menu to be displayed in the second area 1503b of the extended shortcut icon 1503 may be displayed in the second area 1501b. For example, in the second area 1501b, at least a portion of the image to be displayed in the second area 1503b of the extended shortcut icon 1503 or a gradation effect based on the image to be displayed in the second area 1503b of the extended shortcut icon 1503, or a blurred-processed visual effect of the image to be displayed in the second area 1503b may be displayed. For example, in the second area 1501b, partial information of the additional information to be displayed in the second area 1503b of the extended shortcut icon 1503 or brief information of the additional information to be displayed in the second area 1503b may be displayed. According to various embodiments, unlike shown, the size of the shortcut icon 1501 may be discretely changed. For example, referring to FIG. 14 together, the shortcut icon 1501 may be maintained as the shortcut icon 1501 of part (a) of FIG. 15A (i.e., the shortcut icon not including the second area 1503b) until before the size of the externally exposed portion (e.g., the first surface 212a and/or second surface 212b of FIG. 2) exceeds the threshold size (e.g., the second threshold size) and be changed into the extended shortcut icon 1503 described below and displayed when the size of the externally exposed portion (e.g., the first surface 212a and/or second surface 212*b* of FIG. 2) exceeds the threshold size (e.g., the second threshold size).

Referring to parts (c) to (g) of FIG. 15A, according to various embodiments, the extended shortcut icon 1503 may include a first area 1503*a* and a second area 1503*b*. According to various embodiments, an icon image (e.g., the icon image 1319*a* of FIG. 13C) may be displayed in the first area 1503*a*. According to various embodiments, at least one menu related to a corresponding application may be displayed in the second area 1503*b*. According to various embodiments, the size of the second area 1503*b* may be determined based on the size of the externally exposed portion (e.g., the first surface 212*a* and/or second surface 212*b* of FIG. 2) and/or the size of the extended shortcut icon. According to various embodiments, the second area 1503*b* may include at least one subarea (e.g., 1503*b*-1, 1503*b*-2, and 1503*b*-3). According to various embodiments, the size of each subarea (e.g., 1503*b*-1, 1503*b*-2, and 1503*b*-3) may be determined based on the size of the extended shortcut icon. According to various embodiments, at least one menu may be displayed in at least one subarea (e.g., 1503*b*-1, 1503*b*-2, and 1503*b*-3), respectively. According to various embodiments, two or more menus providing different functions or two or more menus providing the same function may be displayed in the at least one subarea 1503*b*-1, 1503*b*-2, and 1503*b*-3. According to various embodiments, two or more menus providing the same function may provide information about different contents. According to various embodiments, the number of the at least one subarea 1503*b*-1, 1503*b*-2, and 1503*b*-3 included in the second area 1503*b* may be determined based on the size of the extended shortcut icon 1503 and/or the size of the second area 1503*b*. For example, as the size of the extended shortcut icon 1503 and/or the size of the second area 1503*b* increases, the number of at least one subarea 1503*b*-1, 1503*b*-2, and 1503*b*-3 may increase. According to various embodiments, the at least one menu displayed in the at least one subarea 1503*b*-1, 1503*b*-2, and 1503*b*-3 may be determined based on the priority for one or more options determined by the user. For example, the one or more options whose priorities may be determined by the user may include a first option (e.g., a menu based on the user's setting), a second option (e.g., a menu based on user-related information), or a third option (e.g., a menu based on the settings of the application). The priorities of one or more options may be determined by the user, and menus may be displayed in the number and/or order based on the priorities determined for the options, in at least one subarea. For example, when the number of subareas is three, menus based on the first, second, and third options described above may be displayed. For example, when the number of subareas is two, two menus based on the options corresponding to the first and second priorities among the menus based on the above-described first, second, and third options may be displayed. For example, when the number of subareas is one, one menu based on the option corresponding to the first priority among the menus based on the above-described first, second, and third options may be displayed. For example, menus corresponding to options having higher priorities are displayed in the left subarea according to the priorities according to the options, and menus corresponding to options having lower priorities are displayed in the right subarea. According to various embodiments, the priority for one or more options, determined by the user, may be changed. For example, if there is no information to display through a menu based on a relatively high priority option, a menu based on a relatively low priority option may be displayed instead of a menu based on a relatively high priority option. For example, when menus based on two options may be displayed through two subareas, if there is no information to be displayed through the menu of the first or second priority option, the menu of the third priority option may be displayed instead of the menu of the first or second priority option. According to various embodiments, the priorities of the one or more options described above may be preset by an application (e.g., by a creator of the application). According to various embodiments, the priorities of the one or more options described above may be set according to whether a recent event has occurred, the user's use history, the user's current location (e.g., the location of the electronic device) and/or the current time. For example, even when the above-mentioned priorities are set by the user or application, a menu based on an option in which an event has recently occurred may be displayed first. For example, although the above-described priorities are set by the user or application, if the user frequently changes to the lower priority option (e.g., when frequently changing to the lower priority option while the higher priority option is displayed), the electronic device 101 may change the option set to the lower priority to a higher priority than the option set to the higher priority. For example, if there is a history in which the user had selected a menu based on a specific option in a specific place (or location) or a history of frequent selection is identified, and the user is later located in the same specific place (e.g., if the electronic device is identified to be located in the specific place), the menu based on the specific option may be displayed first. For example, if there is a history in which the user has selected a menu based on a specific option in a specific time period, or a history of frequent selection is identified, the menu based on the specific option may be first displayed in the same time period. According to various embodiments, if the number of menus is smaller than the number of subareas determined based on the size of the extended shortcut icon 1503 and/or the size of the second area 1503*b*, the number of subareas may be determined to correspond to the number of menus that have information to be displayed. For example, referring to parts (e) and (g) of FIG. 15A, if the number of menus having information to be displayed is one, the number of subareas may be determined to be 1 differently from part (d) or (f) of FIG. 15A. According to various embodiments, the number of subareas may also be set to a predesignated number (e.g., 1). According to various embodiments, each subarea may be selectable. For example, when the plurality of subareas are displayed, each subarea may be selected (e.g., touched) by the user, and a different function and/or information corresponding to the menu included in the selected subarea may be provided. According to various embodiments, the order of at least one menu (e.g., order from the left to right) displayed in at least one subarea 1503*b*-1, 1503*b*-2, and 1503*b*-3 may be determined based on the user's priority for at least one menu. For example, the menu displayed relatively on the left side may be a menu having a higher priority than the menu displayed relatively on the right side. According to various embodiments, the second area 1503*b* may not be divided into subareas 1503*b*-1, 1503*b*-2, and 1503*b*-3. For example, at least one menu and/or at least one additional information all may be displayed on one area (e.g., the second area 1503*b*) which is not divided into the subareas 1503*b*-1, 1503*b*-2, and 1503*b*-3. According to various embodiments, when there is no additional information and/or menu to be displayed in the second area 1503*b*, an image which is identical to or partially different from the icon image displayed in the first area 1503*a* may be displayed. For example, the second area 1503b may be filled in the color related to the icon image. For example, regardless of the icon image, a designated color (e.g., gray) may also be displayed in the second area 1503b. According to various embodiments, the icon image may not be displayed. For example, at least one menu may be displayed in the entire area (or second area) of the extended shortcut icon 1503 without the first area displaying the icon image.

According to various embodiments, if the subareas 1503b-1, 1503b-2, and 1503b-3 is selected (e.g., long touch), a user interface for selecting any one from among the options (e.g., the first, second, and third options) may be displayed in the form of a popup. According to various embodiments, as any one option is selected by the user through the user interface, the menu displayed in at least one subarea 1503b-1, 1503b-2, and 1503b-3 may be changed. For example, if the subarea displaying any one among the menu based on the first option or the menu based on the second option is selected (e.g., long touch) in a state in which the menu based on the first option or the menu based on the second option is displayed, the user interface may be displayed and, if the third option is selected (e.g., touched) through the user interface, the menu based on the third option may be displayed in the selected (e.g., long touch) subarea instead of the menu displayed in the selected (e.g., long touch) subarea.

Figure 15B:
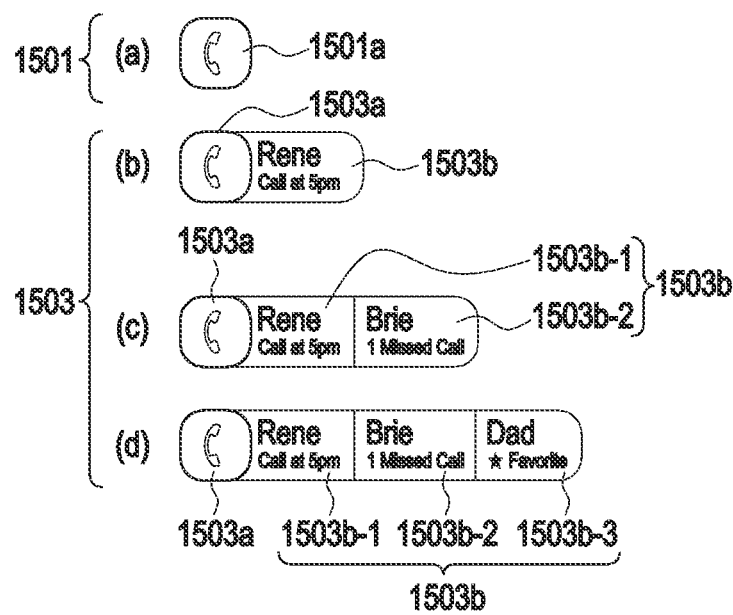
FIG. 15B illustrates a shortcut icon and an extended shortcut icon of a call application according to an embodiment of the disclosure.

FIG. 15B illustrates a shortcut icon and an extended shortcut icon of a call application according to an embodiment of the disclosure.

Referring to part (a) of FIG. 15B, according to various embodiments, a shortcut icon 1501 may be a shortcut icon of a call application. According to various embodiments, an icon image of the call application may be displayed in the first area 1501a.

Referring to parts (b) to (d) of FIG. 15B, according to various embodiments, the extended shortcut icon 1503 may be an extended shortcut icon of the call application. According to various embodiments, an icon image of the call application may be displayed in the first area 1503a. According to various embodiments, at least one menu providing additional information and/or function related to the call application may be displayed in the second area 1503b. For example, referring to part (b) of FIG. 15B, information about a call schedule registered by the user (e.g., "Rene, Call at 5 pm") may be displayed through the Call schedule menu included in the second area 1503b (or first subarea 1503b-1). For example, referring to part (c) of FIG. 15B, information (e.g., "Brie, 1 Missed call") regarding an event that has occurred (e.g., a recent missed call) may be displayed through the Recent Missed call menu included in the second area 1503b (e.g., the second subarea 1503b-2). For example, referring to part (d) of FIG. 15B, information about a contact registered as a favorite by the user (e.g., "Dad, ★ Favorite") may be displayed through the Favorite Contact menu included in the second area 1503b (e.g., the third subarea 1503b-3). According to various embodiments, menus included in the above-described second area 1503b may be selectable by the user. For example, when the Call schedule menu is selected, a call origination function may be executed based on the contact (e.g., "Rene" contact) included in the registered call schedule information (e.g., "Rene, Call at 5 pm"). For example, if the Recent Missed call menu is selected, an execution screen of the call application including information (e.g., "Brie, 1 Missed call") regarding an event that has occurred (e.g., a recently missed call) may be displayed. For example, when the Favorite Contact menu is selected, a call origination function may be executed to the contact registered as a favorite (e.g., "Dad" contact).

Figure 15C:
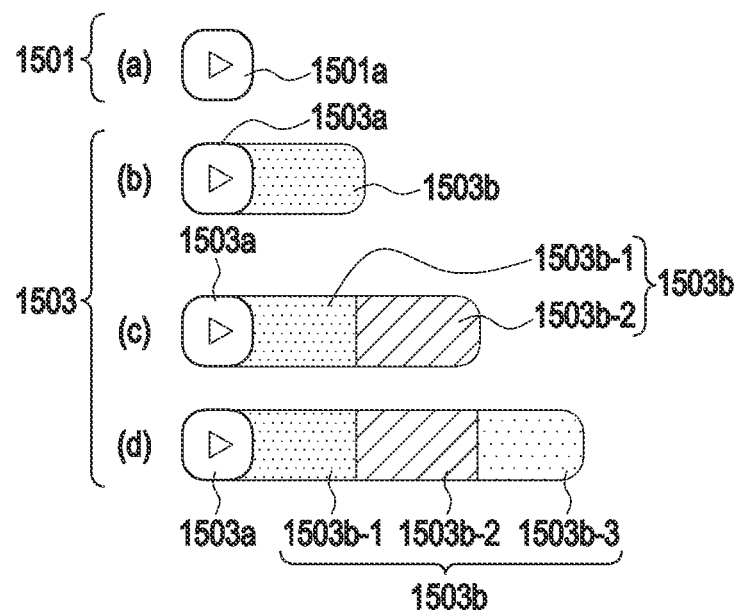
FIG. 15C illustrates a shortcut icon and an extended shortcut icon of a media playback application according to an embodiment of the disclosure.

FIG. 15C illustrates a shortcut icon and an extended shortcut icon of a media playback application according to an embodiment of the disclosure.

Referring to part (a) of FIG. 15C, according to various embodiments, a shortcut icon 1501 may be a shortcut icon of a media playback application. According to various embodiments, an icon image of the media playback application may be displayed in the first area 1501a.

Referring to parts (b) to (d) of FIG. 15C, according to various embodiments, the extended shortcut icon 1503 may be an extended shortcut icon of the media playback application. According to various embodiments, an icon image of the media playback application may be displayed in the first area 1503a. According to various embodiments, at least one menu providing additional information and/or function related to the media playback application may be displayed in the second area 1503b. For example, information about the channel the user frequently accesses, information about the channel the user subscribes to (e.g., content update news), information about the media recently executed (or played), or information about the channel managed by the user may be displayed through at least one menu, respectively, included in the second area 1503b. According to various embodiments, at least one menu may be displayed in at least one subarea 1503b-1, 1503b-2, and 1503b-3, respectively, included in the second area 1503b. According to various embodiments, menus included in the above-described second area 1503b may be selectable by the user. For example, if any one of the at least one menu described above is selected, an execution screen of the media playback application including the above-described information corresponding to the selected menu may be displayed.

Figure 15D:
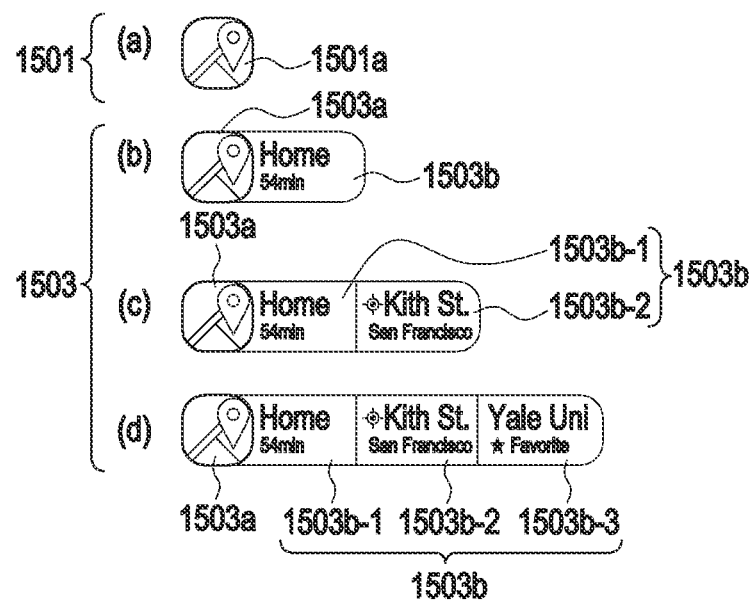
FIG. 15D illustrates a shortcut icon and an extended shortcut icon of a map application according to an embodiment of the disclosure.

FIG. 15D illustrates a shortcut icon and an extended shortcut icon of a map application according to an embodiment of the disclosure.

Referring to part (a) of FIG. 15D, according to various embodiments, a shortcut icon 1501 may be a shortcut icon of a map application. According to various embodiments, an icon image of the map application may be displayed in the first area 1501a.

Referring to parts (b) to (d) of FIG. 15D, according to various embodiments, the extended shortcut icon 1503 may be an extended shortcut icon of the map application. According to various embodiments, an icon image of the map application may be displayed in the first area 1503a. According to various embodiments, at least one menu providing additional information and/or function related to the map application may be displayed in the second area 1503b. For example, referring to part (b) of FIG. 15D, information (e.g., "Home") regarding a place predesignated by the user and information (e.g., "54 min") about the estimated required time to the predesignated place from the user's current location may be displayed through the first menu included in the second area 1503b (or the first subarea 1503b-1). For example, referring to part (c) of FIG. 15C, information (e.g., "Kith St., San Francisco") regarding the destination searched by the user may be displayed through the second menu included in the second area 1503b (e.g., the second subarea 1503b-2). For example, referring to part (d) of FIG. 15C, information about a place registered as a favorite by the user (e.g., "Yale Uni, ★ Favorite") may be displayed through the third menu included in the second area 1503b (e.g., the third subarea 1503b-3). According to various embodiments, menus included in the above-described second area 1503b may be selectable by the user. For example, if the first menu is selected, an execution screen of the map application, providing a route directing function to the predesignated place from the user's current location, may be displayed. For example, if the second menu is selected, an execution screen of the map application, providing information regarding the location of the destination searched by the user and/or the surrounding geography, may be displayed. For example, if the third menu is selected, an execution screen of the map application, providing a route directing function to the place registered as a favorite by the user from the user's current location, may be displayed.

Figure 16:
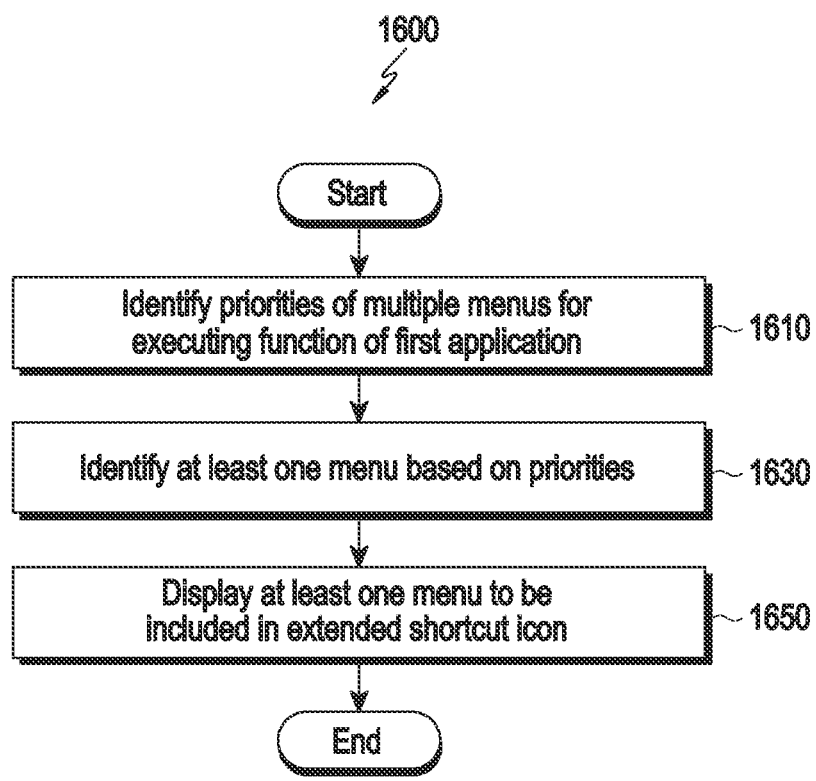
FIG. 16 is a flowchart illustrating an operation of displaying an extended shortcut icon based on priority by an electronic device according to an embodiment of the disclosure.

FIG. 16 is a flowchart 1600 illustrating an operation of displaying an extended shortcut icon based on priority by an electronic device according to an embodiment of the disclosure.

Referring to FIG. 16, according to various embodiments, in operation 1610, the electronic device (e.g., the electronic device 101 of FIG. 1A) may identify priorities for a plurality of menus for executing the function of the first application. According to various embodiments, the plurality of menus may be menus supported by the first application, providing additional information and/or function related to the first application.

According to various embodiments, in operation 1630, the electronic device (e.g., the electronic device 101 of FIG. 1A) may identify at least one menu based on the priorities. According to various embodiments, the at least one menu may be at least one menu set (e.g., activated) by the user among the plurality of menus supported by the first application. According to various embodiments, the at least one menu may be at least one menu in a number displayable (e.g., the number of subareas) determined based on the size of the second area 1503b and/or the size of the extended shortcut icon 1503 among the menus set (e.g., activated) by the user. According to various embodiments, if the number of menus set (e.g., activated) by the user is larger than the displayable number (e.g., the number of subareas), at least one menu corresponding to the displayable number (e.g., the number of subareas) may be identified.

According to various embodiments, in operation 1650, the electronic device (e.g., the electronic device 101 of FIG. 1A) may display at least one menu to be included in the extended shortcut icon (e.g., the extended shortcut icon 1503 of FIG. 15A). According to various embodiments, at least one menu may be included and displayed in the second area (e.g., the second area 1503b of FIG. 15A) of the extended shortcut icon (e.g., the extended shortcut icon 1503 of FIG. 15A) of the first application.

Figure 17A:
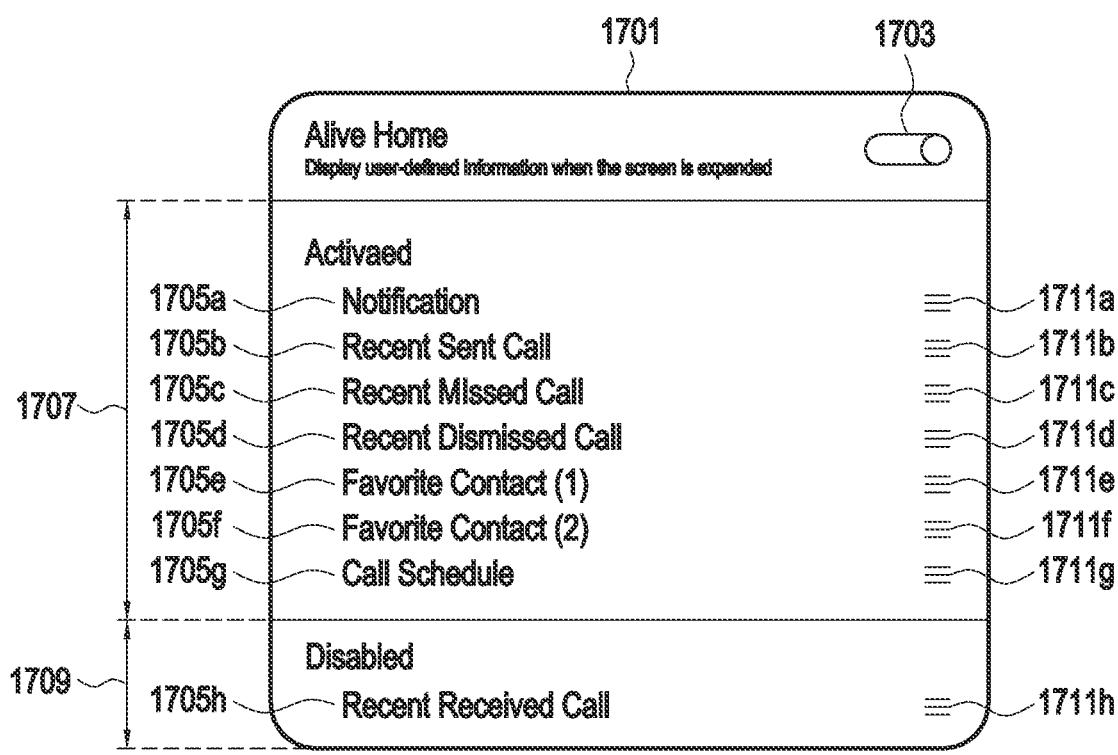
FIG. 17A illustrates a setting screen for setting priority of menus supported by an application according to an embodiment of the disclosure.
Figure 17B:
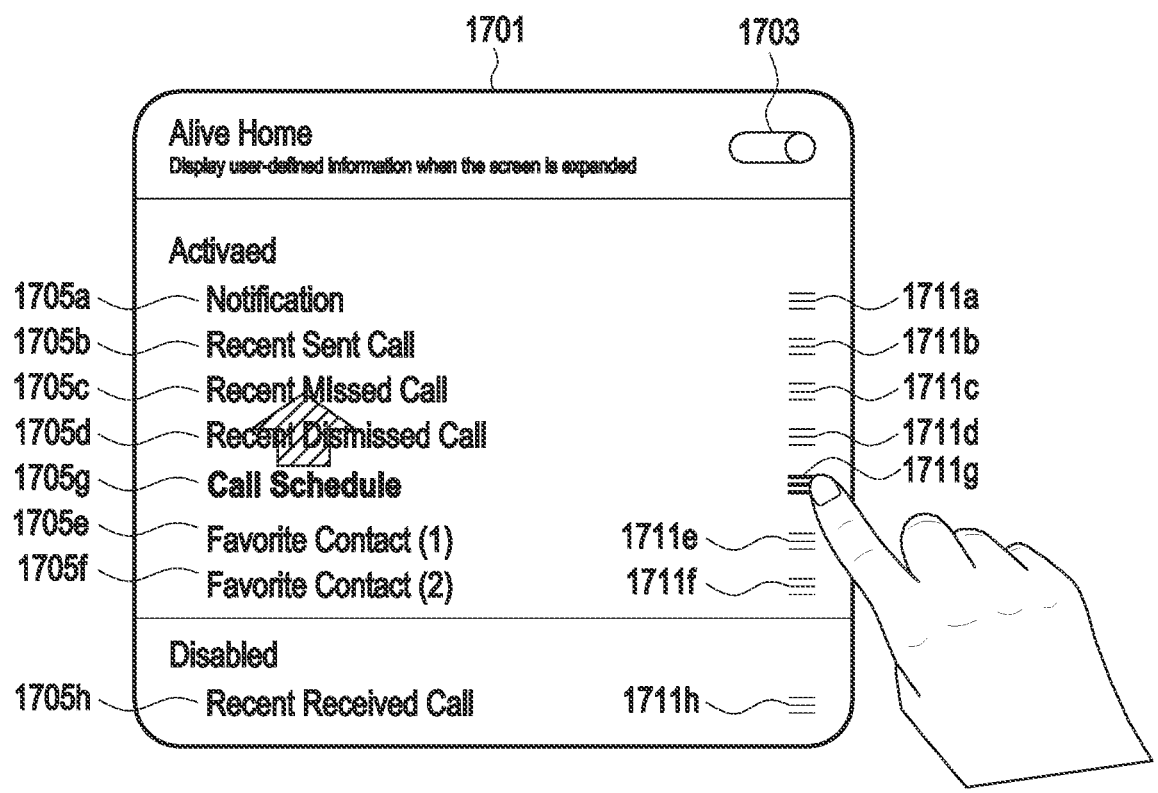
FIG. 17B illustrates a method for changing a priority of menus supported by an application according to an embodiment of the disclosure.

FIG. 17A illustrates a setting screen 1701 for setting priority of menus supported by an application according to an embodiment of the disclosure. FIG. 17B illustrates a method for changing a priority of menus supported by an application according to an embodiment of the disclosure.

Referring to FIG. 17A, according to various embodiments, the setting screen 1701 for setting the menus supported by the application may be displayed on the flexible display (e.g., the flexible display 112 of FIG. 1A).

According to various embodiments, on the setting screen 1701, a user interface (UI) may be displayed to select the menus (e.g., 1705a to 1705h) supported by a corresponding application, per application. According to various embodiments, a toggle icon 1703 may be displayed on the setting screen 1701. According to various embodiments, if the toggle icon 1703 is selected (e.g., touched), the function of displaying the extended shortcut icon (e.g., the extended shortcut icon 1503 of FIG. 15A) for the application corresponding to the setting screen 1701 may be activated or deactivated. For example, in a case where, for the first application, the above-described display function is deactivated, and for the second application, the above-described display function is activated, if the size of the externally exposed portion (e.g., the first surface 212a and/or second surface 212b of FIG. 2) exceeds the threshold size, the shortcut icon (e.g., the shortcut icon 1501 of FIG. 15A) of the first application is not changed into the extended shortcut icon (e.g., the extended shortcut icon 1503 of FIG. 15A), but the shortcut icon (e.g., the shortcut icon 1501 of FIG. 15A) of the second application may be changed into the extended shortcut icon (e.g., the extended shortcut icon 1503 of FIG. 15A). In other words, in a case where a plurality of shortcut icons are displayed, whether the plurality of shortcut icons are to be displayed as an extended shortcut icon may be individually determined depending on whether the above-described display function is activated for each application. According to various embodiments, the shortcut icon of the application where the above-described display function is deactivated may be changed into the extended shortcut icon (e.g., the extended shortcut icon 1503 of FIG. 15A) and displayed when a separate user gesture (e.g., a long touch and slide gesture for the corresponding shortcut icon) is identified.

According to various embodiments, the setting screen 1701 may include an active area 1707 displaying at least one object (e.g., 1705a to 1705g) corresponding to the activated menu and an inactive area 1709 displaying at least one object (e.g., 1705h) corresponding to the deactivated menu. According to various embodiments, at least one bar icon (e.g., 1711a to 1711g) corresponding to at least one object (e.g., 1705a to 1705h) described above may be displayed on the setting screen 1701. According to various embodiments, whether to display the menu corresponding to the bar icon whose display position is changed and/or priority may be changed by changing the display position of at least one bar icon (e.g., 1711a to 1711g). This is described with reference to FIG. 17B.

According to various embodiments, the menus, or some of the menus, corresponding to the objects (e.g., 1705a to 1707g) displayed in the active area 1707 may be included and displayed in the second area (e.g., the second area 1503b of FIG. 15A) of the extended shortcut icon (e.g., the extended shortcut icon 1503 of FIG. 15A). According to various embodiments, the menus corresponding to the displayable number (e.g., the number of subareas) among the activated menus may be displayed through the extended shortcut icon (e.g., the extended shortcut icon 1503 of FIG. 15A). According to various embodiments, the order of display of the objects (e.g., 1705a to 1705g) included in the active area 1707 may represent the priorities set for the menus. For example, menus corresponding to the objects displayed relatively on the upper side among the objects (e.g., 1705a to 1705g) included in the active area 1707 may have higher priorities than the menus corresponding to the objects displayed relatively on the lower side. According to various embodiments, when the number of menus displayable in the second area (e.g., the second area 1503b of FIG. 15A) of the extended shortcut icon (e.g., the extended shortcut icon 1503 of FIG. 15A) (or the number of subareas of the second area 1503b of FIG. 15A) (e.g., N) is smaller than or equal to the number of objects (e.g., 1705a to 1705g) included in the active area 1707 (e.g., M), menus corresponding to top N (or fewer) objects among the objects (e.g., 1705a to 1705g) included in the active area 1707 may be displayed in the second area (e.g., the second area 1503b of FIG. 15A). According to various embodiments, if the number M of the activated menus exceeds the number N (e.g., the number of subareas) of menus displayable through the second area (e.g., the second area 1503*b* of FIG. 15A) of the extended shortcut icon (e.g., the extended shortcut icon 1503 of FIG. 15A), the top N (or fewer) menus among the M activated menus may be determined to be displayed through the second area (e.g., the second area 1503*b* of FIG. 15A).

According to various embodiments, the setting screen 1701 may be the setting screen corresponding to, e.g., a call application. According to various embodiments, at least one objects (e.g., 1705*a* to 1705*h*) corresponding to the menus supported by the call application may be displayed on the setting screen 1701 corresponding to the call application.

According to various embodiments, the notification function corresponding to the first object 1705*a* may be a function that allows the menu where an event occurs among other menus related to the application (e.g., the call application) to be first included and displayed in the extended shortcut icon (e.g., the extended shortcut icon 1503 of FIG. 15A). According to various embodiments, the menus set to have lower priorities than the first object 1705*a* may be included and displayed in the extended shortcut icon (e.g., the extended shortcut icon 1503 of FIG. 15A) first over the menus where no event occurs, when the corresponding event occurs. For example, when the event (e.g., missed call) related to the Recent Missed call menu corresponding to the second object 1705*c* does not occur, and the event (e.g., presence of today's call schedule) related to the Call Schedule menu 1705*g* corresponding to the third object 1705*g* occurs, the Call Schedule menu may be included and displayed in the extended shortcut icon (e.g., the extended shortcut icon 1503 of FIG. 15A) first over the Recent Missed call menu which has been set to have a relatively high priority. According to various embodiments, the menu set to have a higher priority than the first object 1705*a*, regardless of whether the corresponding event occurs, may be included and displayed in the extended shortcut icon (e.g., the extended shortcut icon 1503 of FIG. 15A) first over the menus set to have lower priorities than the first object 1705*a*.

According to various embodiments, the second object 1705*b* may correspond to the Recent Sent Call menu providing information and/or function regarding the recently sent call in relation to the call application. According to various embodiments, if the Recent Sent Call menu is included and displayed in the extended shortcut icon (e.g., the extended shortcut icon 1503 of FIG. 15A), information regarding the sent call (e.g., recipient's name, contact, and/or sent time) may be displayed through the Recent Sent Call menu. According to various embodiments, in a case where the Recent Sent Call menu is included and displayed in the extended shortcut icon (e.g., the extended shortcut icon 1503 of FIG. 15A), if the Recent Sent Call menu is selected, the execution screen of the call application including information regarding the displayed sent call may be displayed, or the call originating function at the contact of the recipient of the displayed sent call may be executed.

According to various embodiments, the third object 1705*c* may correspond to the Recent Missed Call menu providing information and/or function regarding the recently missed call in relation to the call application. According to various embodiments, if the Recent Missed Call menu is included and displayed in the extended shortcut icon (e.g., the extended shortcut icon 1503 of FIG. 15A), through the Recent Missed Call menu, for example, information about the missed call (e.g., the caller's name, the caller's contact information and/or incoming call time) may be displayed. According to various embodiments, in a case where the Recent Missed Call menu is included and displayed in the extended shortcut icon (e.g., the extended shortcut icon 1503 of FIG. 15A), if the Recent Missed Call menu is selected, the execution screen of the call application including information regarding the displayed missed call may be displayed, or the call originating function at the contact of the caller of the displayed missed call may be executed.

According to various embodiments, the fourth object 1705*d* may correspond to the Recent Dismissed Call menu providing information and/or function regarding the recently dismissed call in relation to the call application. According to various embodiments, if the Recent Dismissed Call menu is included and displayed in the extended shortcut icon (e.g., the extended shortcut icon 1503 of FIG. 15A), through the Recent Dismissed Call menu, for example, information about the dismissed call (e.g., the caller's name, the caller's number and/or dismissed time) may be displayed. According to various embodiments, in a case where the Recent Dismissed Call menu is included and displayed in the extended shortcut icon (e.g., the extended shortcut icon 1503 of FIG. 15A), if the Recent Dismissed Call menu is selected, the execution screen of the call application including information regarding the displayed dismissed call may be displayed, or the call originating function at the contact of the caller of the displayed dismissed call may be executed.

According to various embodiments, the fifth and sixth objects 1705*e* and 1705*f* may correspond to the Favorite Contact menu providing information and/or function regarding the favorite in relation to the call application. According to various embodiments, if the Favorite Contact menu is included and displayed in the extended shortcut icon (e.g., the extended shortcut icon 1503 of FIG. 15A), through the Favorite Contact menu, for example, information about the contact registered as a favorite (e.g., the contact name and/or contact number) may be displayed. According to various embodiments, in a case where the Favorite Contact menu is included and displayed in the extended shortcut icon (e.g., the extended shortcut icon 1503 of FIG. 15A), if the Favorite Contact menu is selected, the execution screen of the call application including information regarding the information regarding the contact registered as a favorite, as displayed, may be displayed, or the call originating function at the contact registered as the favorite may be executed. According to various embodiments, Favorite Contact menus corresponding to a plurality of (e.g., two) contacts registered as favorites may be included and displayed in the extended shortcut icon (e.g., the extended shortcut icon 1503 of FIG. 15A).

According to various embodiments, the seventh object 1705*g* may correspond to the Call Schedule menu providing information and/or function regarding the registered call schedule in relation to the call application. According to various embodiments, if the Call Schedule menu is included and displayed in the extended shortcut icon (e.g., the extended shortcut icon 1503 of FIG. 15A), through the Call Schedule menu, for example, information about the registered call schedule (e.g., the contact name, the contact number and/or scheduled call date) may be displayed. According to various embodiments, in a case where the Call Schedule menu is included and displayed in the extended shortcut icon (e.g., the extended shortcut icon 1503 of FIG. 15A), if the Call Schedule menu is selected, the execution screen of the call application including information regarding the displayed call schedule may be displayed, or the call originating function at the contact corresponding to the displayed call schedule may be executed.

According to various embodiments, the eighth object 1705*h* may correspond to the Recent Received Call menu providing information and/or function regarding the recently received call in relation to the call application. According to various embodiments, if the Recent Received Call menu is included and displayed in the extended shortcut icon (e.g., the extended shortcut icon 1503 of FIG. 15A), through the Recent Received Call menu, for example, information about the received call (e.g., the caller's name, the caller's contact information and/or received time) may be displayed. According to various embodiments, in a case where the Recent Received Call menu is included and displayed in the extended shortcut icon (e.g., the extended shortcut icon 1503 of FIG. 15A), if the Recent Received Call menu is selected, the execution screen of the call application including information regarding the displayed received call may be displayed, or the call originating function at the contact corresponding to the displayed received call may be executed.

Referring to FIG. 17B, according to various embodiments, the electronic device (e.g., the electronic device 101 of FIG. 1A) may set whether to display a menu corresponding to at least one bar icon (e.g., 1711*a* to 1711*g*) and/or priority, based on the display position of the at least one bar icon (e.g., 1711*a* to 1711*g*).

According to various embodiments, the electronic device (e.g., the electronic device 101 of FIG. 1A) may identify a user input to change the display position of the bar icon (e.g., the seventh bar icon 1711*g*) corresponding to any one object (e.g., the seventh object 1705*g*) from the user 1713. For example, if the user 1713 touches (e.g., long touch) and drags, in one direction (e.g., upper or lower direction), the seventh bar icon 1711*g*, the electronic device (e.g., the electronic device 101 of FIG. 1A) may identify that the display position of the bar icon 1711*g* is moved in one direction (e.g., upper or lower direction). As the display position of the seventh bar icon 1711*g* is moved higher than the fourth bar icon 1711*d*, the electronic device (e.g., the electronic device 101 of FIG. 1A) may set the priority of the Call Schedule menu corresponding to the seventh bar icon 1711*g* to be higher than the priority of the Recent Dismissed Call menu corresponding to the fourth bar icon 1711*d*.

According to various embodiments, the electronic device (e.g., the electronic device 101 of FIG. 1A) may identify a user input to change the display position of the bar icon corresponding to any one object from the user 1713. For example, the user 1713 may touch (e.g., long touch) and drag, in one direction (e.g., lower direction), the seventh bar icon 1711*g* included in the active area 1707, thereby moving the display position of the seventh bar icon 1711*g* to the inactive area 1709. The electronic device (e.g., the electronic device 101 of FIG. 1A) may identify that the display position of the seventh bar icon 1711*g* is included in the inactive area 1709. The electronic device (e.g., the electronic device 101 of FIG. 1A) may deactivate the display function of the menu (e.g., Call Schedule menu) corresponding to the seventh bar icon 1711*g* included in the inactive area 1709. For example, if the user 1713 moves the display position of any one bar icon (e.g., eighth bar icon 1711*h*) included in the inactive area 1709 to the active area 1707, the electronic device (e.g., the electronic device 101 of FIG. 1A) may activate the display function of the menu corresponding to the bar icon included in the active area 1707.

According to various embodiments, as the display position of the at least one bar icon (e.g., 1711*a* to 1711*h*) is changed, the display position of each corresponding objects (e.g., 1705*a* to 1705*h*) may be changed as well. According to various embodiments, according to a user input (e.g., a touch (e.g., long touch) and drag, in one direction (e.g., upper or lower direction), on any one of at least one object) on at least one objects (e.g., 1705*a* to 1705*h*), whether to display the menu corresponding to at least one objects (e.g., 1705*a* to 1705*h*) and/or priority may be set.

Figure 18:
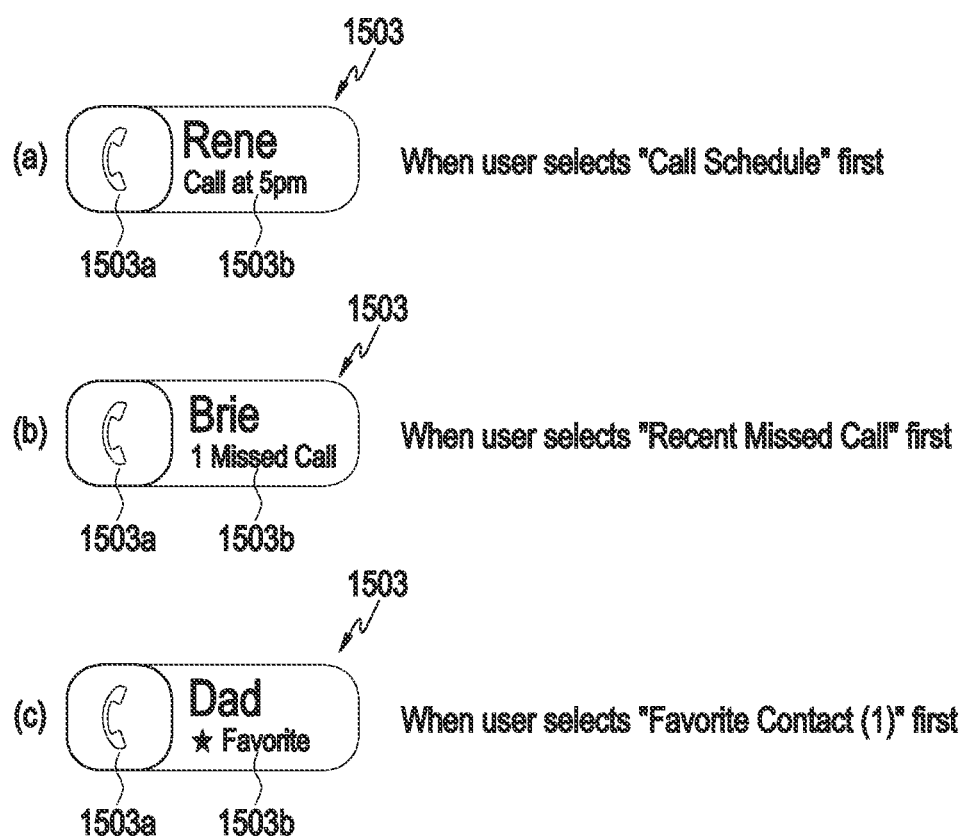
FIG. 18 illustrates an extended shortcut icon based on priority set for an application according to an embodiment of the disclosure.

FIG. 18 illustrates an extended shortcut icon based on priority set for an application according to an embodiment of the disclosure.

According to various embodiments, the extended shortcut icon 1503 illustrated in parts (a) to (c) of FIG. 18 may include a first area 1503*a* and a second area 1503*b*. According to various embodiments, an icon image of, e.g., a call application may be displayed in the first area 1503*a*. According to various embodiments, the second area 1503*b* may be in a state of having been set to display one menu based on the size of the extended shortcut icon 1503. For example, the second area 1503*b* may be in a state of being not divided into a plurality of subareas (e.g., a state of including only one subarea) based on the size of the extended shortcut icon 1503. For example, the flexible display (e.g., the flexible display 112 of FIG. 1A) may be in a state (e.g., first open state) in which the second portion is exposed to the outside.

Referring to part (a) of FIG. 18, if the Call Schedule menu (e.g., the Call Schedule menu of FIG. 17A) is set to have the highest priority, a Call Schedule menu providing information and/or function regarding the registered call schedule may be displayed in the second area 1503*b*. For example, information (e.g., "Rene, Call at 5 pm") regarding the registered call schedule may be displayed through the Call Schedule menu included in the second area 1503*b*. For example, through the Call Schedule menu included in the second area 1503*b*, the execution screen of the call application including information regarding the registered call schedule is displayed, or the function of executing a call originating function at the contact corresponding to the displayed call schedule may be provided.

Referring to part (b) of FIG. 18, if the Recent Missed call menu (e.g., the Recent Missed call menu of FIG. 17A) is set to have the highest priority, a Recent Missed call menu providing information and/or function regarding the recently missed call may be displayed in the second area 1503*b*. For example, through the Recent Missed call menu included in the second area 1503*b*, information (e.g., "Brie, 1 Missed Call") regarding the missed call may be displayed. For example, through the Recent Missed call menu included in the second area 1503*b*, the execution screen of the call application including information regarding the displayed missed call is displayed, or the function of executing a call originating function at the contact of the caller of the displayed missed call may be provided.

Referring to part (c) of FIG. 18, if the Favorite Contact menu (e.g., the Favorite Contact (1) menu of FIG. 17A) is set to have the highest priority, a Favorite Contact menu providing information and/or function regarding the favorite may be displayed in the second area 1503*b*. For example, information (e.g., "Dad, ★ Favorite") about a contact registered as a favorite may be displayed through the Favorite Contact menu included in the second area 1503*b*. For example, through the Favorite Contact menu included in the second area 1503*b*, the execution screen of the call application including information regarding the contact registered as a favorite, as displayed, is displayed, or the function of executing a call originating function at the contact registered as a favorite, as displayed, may be provided.

Figure 19A:
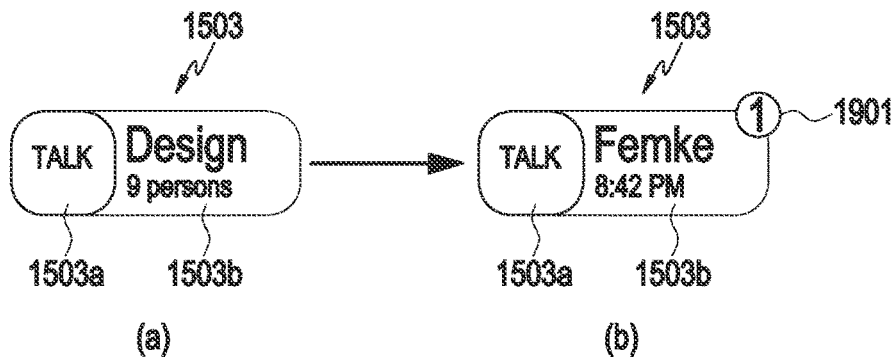
FIG. 19A illustrates an extended shortcut icon based on priority set for an application according to an embodiment of the disclosure.
Figure 19B:
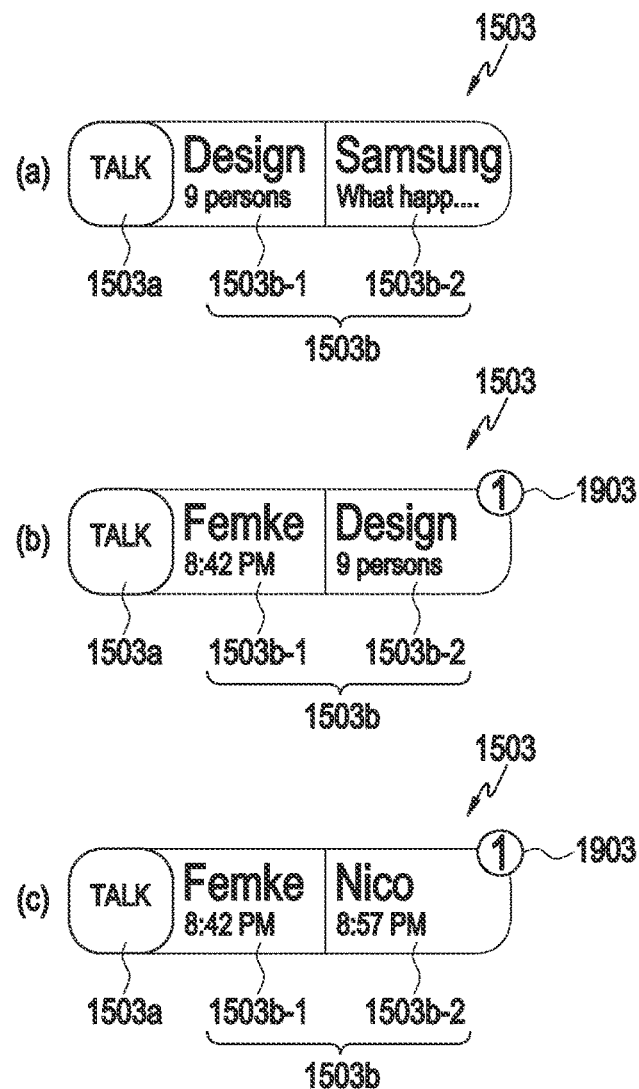
FIG. 19B illustrates an extended shortcut icon based on priority set for an application according to an embodiment of the disclosure.

FIG. 19A illustrates an extended shortcut icon based on priority set for an application (e.g., a messenger application) according to an embodiment of the disclosure. FIG. 19B illustrates an extended shortcut icon based on priority set for an application according to an embodiment of the disclosure.

FIG. 19A illustrates a case in which, according to various embodiments, a first menu (e.g., the Notification menu of FIG. 17A) to allow the menu where an event occurs among other menus related to the messenger application to be included and displayed in the extended shortcut icon 1503 first is set (e.g., activated) to have a relatively high priority (e.g., first priority), and a second menu providing information and/or function regarding the chat room registered as a favorite is set (e.g., activated) to have a relatively lower priority (e.g., second priority).

Referring to part (a) of FIG. 19A, according to various embodiments, when there is no menu where an event occurs for the messenger application (e.g., when no new message is received), the second menu regarding the chat room "Design" which is the chat room registered as a favorite may be displayed in the second area 1503b first. According to various embodiments, through the second menu regarding the chat room registered as a favorite, information regarding the chat room registered as a favorite (e.g., room name (or sender's name) (e.g., "Design") and/or number of persons (e.g., "9 persons") in the chat room) may be displayed. According to various embodiments, through the third menu regarding the chat room registered as a favorite, some content of the last received message regarding the chat room registered as a favorite may be displayed. According to various embodiments, if the third menu regarding the "Design" chat room included in the second area 1503b is selected (e.g., touched) by the user, the execution screen of the messenger application including the "Design" chat room may be displayed.

Referring to part (b) of FIG. 19A, according to various embodiments, if an event occurs (e.g., if a new message is received) for the messenger application, the number of menus (e.g., two) to be displayed according to the user setting (e.g., priority) may exceed the number of displayable menus (e.g., the number of subareas) (e.g., one). According to various embodiments, since the first menu (e.g., the Notification menu of FIG. 17A) is set (e.g., activated) to have a higher priority (e.g., first priority) than the second menu, the second menu regarding the chat room (e.g., "Femke" chat room) corresponding to the occurring event may be included and displayed in the second area 1503b first over the second menu regarding the chat room (e.g., "Design" chat room) registered as a favorite. According to various embodiments, through the second menu regarding the chat room (e.g., "Femke" chat room) corresponding to the occurring event, information regarding the chat room (e.g., "Femke" chat room) corresponding to the occurring event (e.g., room name (or sender's name) (e.g., "Femke") and/or time of occurrence of event (e.g., "8:42 PM")) may be displayed. According to various embodiments, the third menu regarding the chat room (e.g., "Femke" chat room) corresponding to the occurring event may be displayed on the second area 1503b in place of the second menu (e.g., menu regarding the "Design" chat room) previously displayed, as shown in part (b) of FIG. 19A. Although not shown, the third menu regarding the chat room (e.g., the third menu regarding the "Femke" chat room) corresponding to the occurring event may be displayed on the second area 1503b alternately (in other words, alternatively) with the second menu (e.g., the menu regarding the "Design" chat room) previously displayed, every predetermined time (e.g., 2 seconds). According to various embodiments, an indicator 1901 indicating the number of chat rooms (e.g., one) corresponding to the occurring event may be displayed on the extended shortcut icon 1503 of part (b) of FIG. 19A. According to various embodiments, the indicator 1901 may be selectable by the user. For example, if the indicator 1901 is selected (e.g., touched), the execution screen of the messenger application including the chat room (e.g., "Femke" chat room) corresponding to the occurring event may be displayed.

Although not shown, the third menu regarding the "Femke" chat room corresponding to the occurring event, along with the second menu regarding the "Design" chat room, may be displayed on the second area 1503b. For example, if an event (e.g., reception of a new message regarding the "Femke" chat room) regarding the "Femke" chat room in a state in which the second menu is displayed on the second area 1503b, the size of the extended shortcut icon 1503 may be increased (e.g., increased by about 1.5 times (e.g., 3.3/2.3) the extended shortcut icon 1503 of FIG. 19A), and the third menu regarding the "Femke" chat room and the second menu regarding the "Design" chat room together may be displayed in the second area of the extended shortcut icon 1503 with the increased size.

FIG. 19B illustrates a case in which, according to various embodiments, a first menu to allow the menu where an event occurs to be displayed first for the messenger application is set to have a relatively higher priority (e.g., first priority), and the second and fourth menus to display the chat room registered as a favorite are set to have a relatively lower priority (e.g., second priority). As compared with FIG. 19A, in FIG. 19B, a plurality of (e.g., two) subareas 1503b-1 and 1503b-2 may be included in the second area 1503b.

Referring to part (a) of FIG. 19B, according to various embodiments, for the messenger application, when there is no menu where an event occurs (e.g., when no new message is received), the second and fourth menus regarding a plurality of (e.g., two) chat rooms (e.g., the "Design" chat room and the "Samsung" chat room) registered as favorites may be displayed in the second area 1503b. According to various embodiments, the room name (or sender's name) (e.g., "Design"), number of persons in chat room (e.g., "9 persons"), and information regarding a recent event (e.g., "What happ . . . ") may be displayed through the second and fourth menus. According to various embodiments, if the second menu or fourth menu displayed in the second area 1503b is selected (e.g., touched) by the user, the execution screen of the messenger application, including the chat room (e.g., the "Design" chat room or "Samsung" chat room) corresponding to the selected menu, may be displayed.

Referring to part (b) of FIG. 19B, according to various embodiments, if a first event occurs (e.g., if a new message is received) on the messenger application in a state in which the second and fourth menus are displayed in the second area 1503b, the third menu regarding the "Femke" chat room corresponding to the occurring first event may be displayed in the second area 1503b. According to various embodiments, since the first menu (e.g., the Notification menu of FIG. 17A) is set (e.g., activated) to have a higher priority (e.g., first priority) than the second and fourth menus, the third menu regarding the chat room (e.g., "Femke" chat room) corresponding to the occurring first event may be included and displayed in the second area 1503b first over the second and fourth menus regarding the chat rooms (e.g., the "Design" chat room or "Samsung" chat room) registered as favorites, displayed before. For example, the third menu regarding the chat room (e.g., the "Femke" chat room) corresponding to the occurring first event may be displayed on the second area 1503b in place of any one (e.g., the fourth menu regarding the "Samsung" chat room) of the second and fourth menus regarding the chat rooms (e.g., the "Design" chat room or "Samsung" chat room) registered as favorites, displayed before as shown in part (b) of FIG. 19B. According to various embodiments, through the third menu regarding the chat room (e.g., "Femke" chat room) corresponding to the occurring first event, information regarding the occurring first event (e.g., room name (or sender's name) (e.g., "Femke") and/or time of occurrence of first event (e.g., "8:42 PM")) may be displayed. According to various embodiments, an indicator 1903 indicating the number of chat rooms (e.g., one) corresponding to the occurring event (e.g., first event) may be displayed on the extended shortcut icon 1503 of part (b) of FIG. 19B. According to various embodiments, the indicator 1903 may be selectable by the user. For example, if the indicator 1903 is selected (e.g., touched), the execution screen of the messenger application including the chat room (e.g., "Femke" chat room) corresponding to the occurring first event may be displayed.

Referring to part (c) of FIG. 19B, according to various embodiments, if a second event further occurs (e.g., if a new message on another chat room is received) on the messenger application, a fifth menu regarding the "Nico" chat room corresponding to the occurring second event may be displayed in the second area 1503b. According to various embodiments, since the first menu (e.g., the Notification menu of FIG. 17A) is set (e.g., activated) to have a higher priority (e.g., first priority) than the second and fourth menus, the fifth menu regarding the chat room (e.g., "Nico" chat room) corresponding to the occurring second event may be included and displayed in the second area 1503b first over the second menu regarding the chat room (e.g., the "Design" chat room) registered as a favorite, displayed before. For example, the fifth menu regarding the chat room (e.g., the "Nico" chat room) corresponding to the occurring second event may be displayed on the second area 1503b in place of the second menu regarding the "Samsung" chat room registered as a favorite, displayed before, as shown in part (c) of FIG. 19B. According to various embodiments, through the fifth menu regarding the chat room (e.g., "Nico" chat room) corresponding to the occurring second event, information regarding the occurring second event (e.g., room name (or sender's name) (e.g., "Nico") and/or time of occurrence of second event (e.g., "8:57 PM")) may be displayed.

According to various embodiments, menus corresponding to the occurring events (e.g., the first and second events) may be arrayed according to the times of occurrence of the events. For example, the third menu corresponding to the first event that occurs relatively earlier may be displayed on the left side, and the fifth menu corresponding to the second event occurring relatively later may be displayed on the right side. According to various embodiments, an indicator 1905 indicating the number of chat rooms (e.g., two) corresponding to the occurring events (e.g., first and second events) may be displayed on the extended shortcut icon 1503 of part (c) of FIG. 19B. According to various embodiments, the indicator 1905 may be selectable by the user. For example, if the indicator 1905 is selected (e.g., touched), the execution screen of the messenger application, including at least one of the chat rooms corresponding to the occurring events (e.g., the first and second events), may be displayed.

According to various embodiments, the text (e.g., "Femake", "8:42 PM", "Nico" and/or "8:57") of the menu corresponding to the occurring event may be displayed in a color and/or font different from the text of the other menus to indicate that the menu corresponding to the occurring event has been displayed according to the occurrence of the event.

Although not shown, if a third event further occurs (e.g., if a new message for another chat room is received) after the first and second events occur, a sixth menu regarding the chat room corresponding to the third event may be displayed in place of any one of the menus (e.g., the third menu and fifth menu) displayed before. In this case, an indicator (not shown) indicating the number (e.g., three) of the chat rooms where an event occurs may be displayed on the extended shortcut icon 1503. Although not shown, the menus (e.g., the third, fifth, and sixth menus) regarding the chat rooms where an event occurs may be displayed on the second area 1503b alternately (in other words, alternatively) every predetermined time (e.g., 2 seconds).

Figure 20:
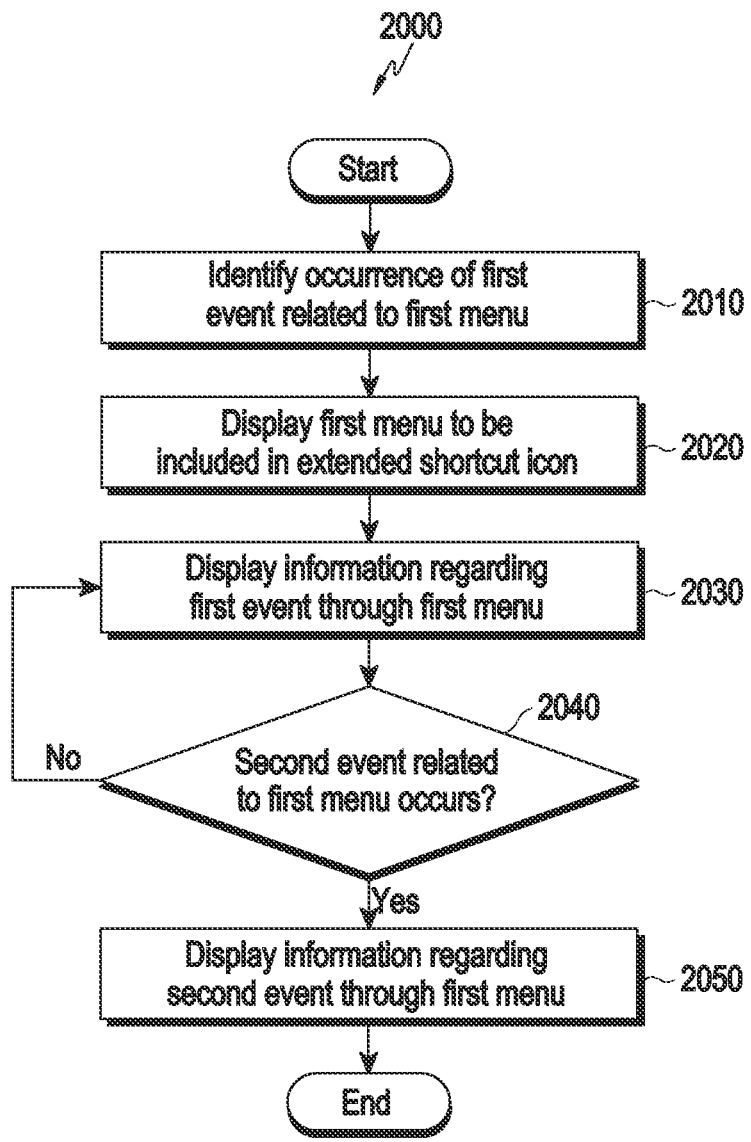
FIG. 20 is a flowchart illustrating a method of displaying an extended shortcut icon by an electronic device when a plurality of events occur according to an embodiment of the disclosure.

FIG. 20 is a flowchart 2000 illustrating a method of displaying an extended shortcut icon by an electronic device when a plurality of events occur according to an embodiment of the disclosure.

Referring to FIG. 20, according to various embodiments, in operation 2010, the electronic device (e.g., the electronic device 101 of FIG. 1A) may identify an occurrence of a first event related to a first menu. According to various embodiments, the electronic device (e.g., the electronic device 101 of FIG. 1A) may identify that the first event corresponding to the first menu, which is any one of the menus (e.g., the menus included in the active area 1707 of FIG. 17A) set (e.g., selected) by the user among the menus supported by the application, has occurred.

According to various embodiments, in operation 2020, the electronic device (e.g., the electronic device 101 of FIG. 1A) may display the first menu to be included in the extended shortcut icon 1503. According to various embodiments, the electronic device (e.g., the electronic device 101 of FIG. 1A) may identify the priorities of the menus (e.g., the menus included in the active area 1707 of FIG. 17A) set (e.g., selected) by the user. According to various embodiments, the electronic device (e.g., the electronic device 101 of FIG. 1A) may identify that the menu (e.g., the Notification menu of FIG. 17A) to allow the menu where an event occurs to be displayed first is set to have a relatively higher priority (e.g., first priority). According to various embodiments, the electronic device (e.g., the electronic device 101 of FIG. 1A) may display the first menu corresponding to the occurring first event to be included in the extended shortcut icon (e.g., the extended shortcut icon 1503 of FIG. 15A).

According to various embodiments, in operation 2030, the electronic device (e.g., the electronic device 101 of FIG. 1A) may display information regarding the first event through the first menu. For example, when the first menu is the Recent Missed call menu of FIG. 17A, information regarding the first event may include the caller's name, contact, and/or incoming time.

According to various embodiments, in operation 2040, the electronic device (e.g., the electronic device 101 of FIG. 1A) may identify whether the second event related to the first menu occurs. For example, when the first menu is the Recent Missed call menu of FIG. 17A, the second event may be a missed call from a caller different from the caller of the missed call of the first event.

According to various embodiments, when the second event does not occur, the electronic device (e.g., the electronic device 101 of FIG. 1A) may maintain the operation of displaying the information regarding the first event through the first menu. According to various embodiments, in operation 2050, when the second event occurs, the electronic device (e.g., the electronic device 101 of FIG. 1A) may display the information regarding the second event through the first menu. According to various embodiments, the electronic device (e.g., the electronic device 101 of FIG. 1A) may display the information regarding the first event and the information regarding the second event together. According to various embodiments, the electronic device (e.g., the electronic device 101 of FIG. 1A) may display the information regarding the second event in place of the information regarding the first event. According to various embodiments, the electronic device (e.g., the electronic device 101 of FIG. 1A) may alternatively display the information regarding the first event and the information regarding the second event through the first menu every predetermined time (e.g., 2 seconds).

Figure 21A:
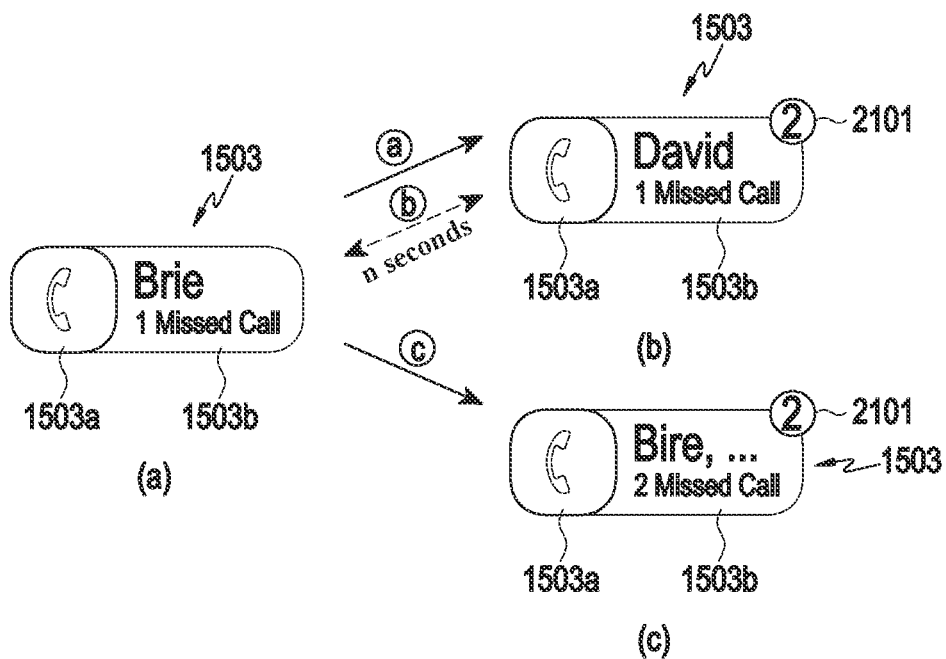
FIG. 21A illustrates a method of displaying an extended shortcut icon when a plurality of events related to a same menu occur according to an embodiment of the disclosure.

FIG. 21A illustrates a method of displaying an extended shortcut icon when a plurality of events related to a same menu occur according to an embodiment of the disclosure.

According to various embodiments, the extended shortcut icon 1503 may be an extended shortcut icon of the call application. According to various embodiments, the extended shortcut icon 1503 may include a first area 1503a and a second area 1503b. According to various embodiments, an icon image of, e.g., a call application may be displayed in the first area 1503a. According to various embodiments, at least one menu (e.g., the Recent Missed call menu of FIG. 17A) providing additional information and/or function related to, e.g., the call application may be displayed in the second area 1503b.

Referring to part (a) of FIG. 21A, when the first event (e.g., a missed call from "Brie") related to the first menu (e.g., the Recent Missed call menu 1705c of FIG. 17A) occurs, the information (e.g., "Brie, 1 Missed Call") regarding the first event may be displayed through the first menu included in the second area 1503b.

Referring to part (b) of FIG. 21A, when the second event (e.g., a missed call from "David") related to the first menu (e.g., the Recent Missed call menu of FIG. 17A) occurs after the first event (e.g., a missed call from "Brie") related to the first menu (e.g., the Recent Missed call menu 1705c of FIG. 17A) occurs, the first menu to provide information (e.g., "David, 1 Missed Call") regarding the second event may be displayed through the first menu included in the second area 1503b. According to various embodiments, the information regarding the second event may be displayed in place of the information regarding the first event displayed before (ⓐ). According to various embodiments, the information regarding the second event may be alternately (e.g., alternatively) displayed with the previously displayed first event-related information every predetermined time (e.g., n seconds) (ⓑ).

Referring to part (c) of FIG. 21A, when the second event (e.g., a missed call from "David") related to the first menu (e.g., the Recent Missed Call menu of FIG. 17A) occurs after the first event (e.g., a missed call from "Brie") related to the first menu (e.g., the Recent Missed call menu 1705c of FIG. 17A) occurs, information regarding the second event, along with information regarding the first event, may be displayed through the first menu included in the second area 1503b (ⓒ). For example, information (e.g., "2 Missed Calls") indicating that there is one more missed call from another person, as well as one missed call from "Brie" may be displayed. For example, as shown in part (c) of FIG. 21A, it may be displayed through the text " . . . " that there are more missed calls from another person. Although not shown, text (e.g., "David") indicating the other person's name may further be displayed.

Referring to parts (b) and (c) of FIG. 21A, an indicator 2101 indicating the number of occurring events (e.g., first and second events) may be displayed on the extended shortcut icon 1503. According to various embodiments, the indicator 2101 may be selectable by the user. For example, if the indicator 2101 is selected (e.g., touched), the execution screen (e.g., an execution screen including a list of missed calls) of the call application, corresponding to the occurring event, may be displayed.

Figure 21B:
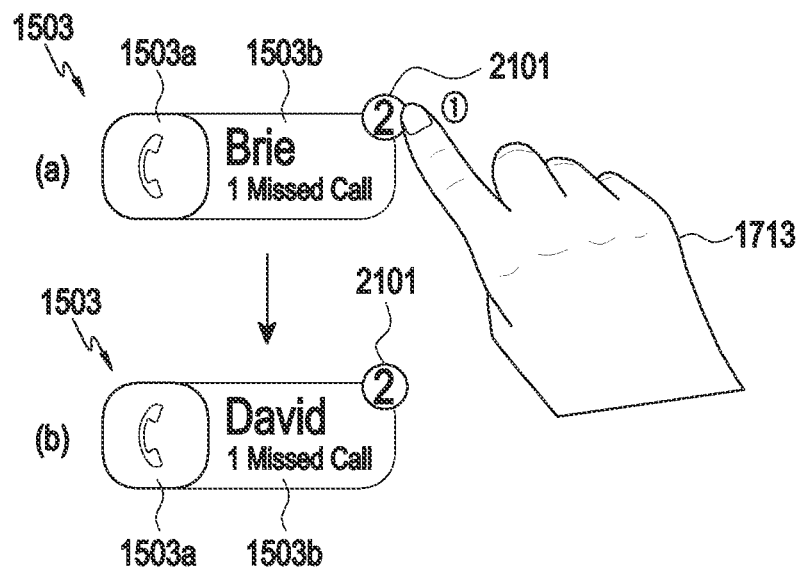
FIG. 21B illustrates a method of displaying an extended shortcut icon when a plurality of events related to a same menu occur according to an embodiment of the disclosure.

FIG. 21B illustrates a method of displaying an extended shortcut icon when a plurality of events related to a same menu occur according to an embodiment of the disclosure.

According to various embodiments, the extended shortcut icon 1503 may be an extended shortcut icon of the call application. According to various embodiments, the extended shortcut icon 1503 may include a first area 1503a and a second area 1503b. According to various embodiments, an icon image of, e.g., a call application may be displayed in the first area 1503a. According to various embodiments, at least one menu (e.g., the Recent Missed call menu of FIG. 17A) providing additional information and/or function related to, e.g., the call application may be displayed in the second area 1503b.

Referring to part (a) of FIG. 21B, when the first event (e.g., a missed call from "Brie") related to the first menu (e.g., the Recent Missed call menu of FIG. 17A) occurs, the information (e.g., information indicating that there is one missed call from "Brie" (e.g., "Brie, 1 Missed Call")) regarding the first event may be displayed through the first menu included in the second area 1503b. When the second event (e.g., a missed call from "David") related to the first menu (e.g., the Recent Missed call menu of FIG. 17A) occurs after the first event (e.g., a missed call from "Brie") related to the first menu (e.g., the Recent Missed call menu of FIG. 17A) occurs, an indicator 2101 indicating the number of occurring events (e.g., the first and second events) may be displayed on the extended shortcut icon 1503. According to various embodiments, the indicator 2101 may be selectable by the user 1713. For example, if the indicator 2101 is selected (e.g., touched (①)), as shown in part (b) of FIG. 21B, information about the second event (e.g., "David, 1 Missed Call") may be displayed in place of the information (e.g., "Brie, 1 Missed Call") regarding the first event displayed before. According to various embodiments, the information regarding the second event may be alternately (e.g., alternatively) displayed with the previously displayed first event-related information every predetermined time (e.g., n seconds).

Figure 21C:
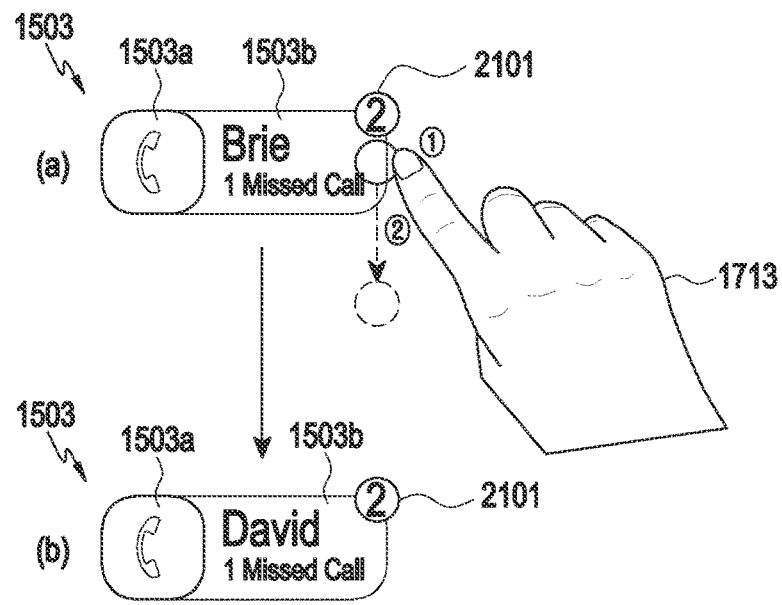
FIG. 21C illustrates a method of displaying an extended shortcut icon when a plurality of events related to a same menu occur according to an embodiment of the disclosure.

FIG. 21C illustrates a method of displaying an extended shortcut icon when a plurality of events related to a same menu occur according to an embodiment of the disclosure.

According to various embodiments, the extended shortcut icon 1503 may be an extended shortcut icon of the call application. According to various embodiments, the extended shortcut icon 1503 may include a first area 1503a and a second area 1503b. According to various embodiments, an icon image of, e.g., a call application may be displayed in the first area 1503a. According to various embodiments, at least one menu (e.g., the Recent Missed call menu of FIG. 17A) providing additional information and/or function related to, e.g., the call application may be displayed in the second area 1503b.

Referring to part (a) of FIG. 21C, when the second event (e.g., a missed call from "David") related to the first menu (e.g., the Recent Missed call menu of FIG. 17A) occurs in a state in which information (e.g., "Brie, 1 Missed Call") regarding the first event is displayed on the second area 1503b, an indicator 2101 indicating the number of occurring events (e.g., the first and second events) may be displayed on the extended shortcut icon 1503. According to various embodiments, if the user 1713 selects (e.g., touches ① and slides ② in one direction (e.g., lower direction)) the indicator 2101 or second area 1503b (e.g., the first menu), as shown in part (b) of FIG. 21C, the information (e.g., "David, 1 Missed Call") regarding the second event may be displayed in place of the information (e.g., "Brie, 1 Missed Call") regarding the first event displayed before. According to various embodiments, the information regarding the second event may be alternately (e.g., alternatively) displayed with the previously displayed first event-related information every predetermined time (e.g., n seconds).

Figure 21D:
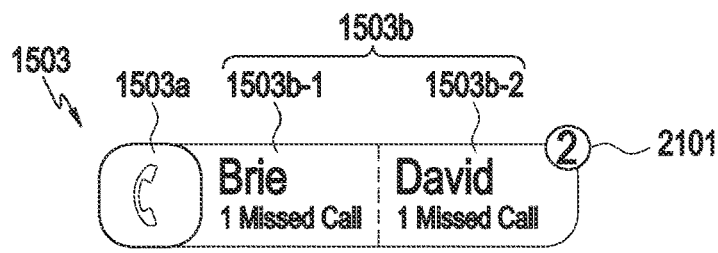
FIG. 21D illustrates a method of displaying an extended shortcut icon when a plurality of events related to a same menu occur according to an embodiment of the disclosure.
Figure 21E:
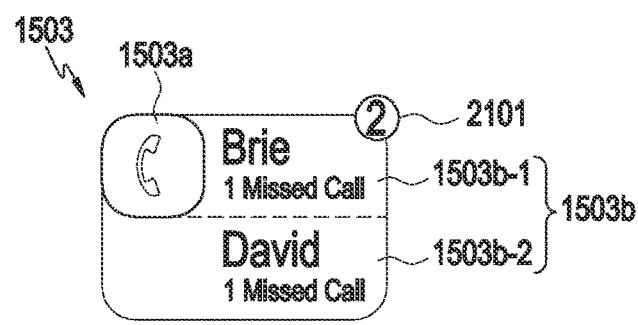
FIG. 21E illustrates a method of displaying an extended shortcut icon when a plurality of events related to a same menu occur according to an embodiment of the disclosure.

FIG. 21D illustrates a method of displaying an extended shortcut icon when a plurality of events related to a same menu occur according to an embodiment of the disclosure. FIG. 21E illustrates a method of displaying an extended shortcut icon when a plurality of events related to a same menu occur according to an embodiment of the disclosure.

Referring to FIGS. 21D and 21E, according to various embodiments, the second event (e.g., a missed call from "David") related to the first menu (e.g., the Recent Missed call menu of FIG. 17A) may occur in a state (e.g., part (a) of FIG. 21B or part (a) of FIG. 21C) in which the information (e.g., information (e.g., "Brie, 1 Missed Call") indicating that there is one missed call from "Brie")) regarding the first event is displayed on the second area 1503b.

According to various embodiments, when the second event (e.g., a missed call from "David") related to the first menu (e.g., the Recent Missed call menu 1705c of FIG. 17A) occurs in a state in which the information (e.g., "Brie, 1 Missed Call") regarding the first event is displayed on the second area 1503b (e.g., part (a) of FIG. 21B or part (a) of FIG. 21C), the size of the second area 1503b may be increased so that the information (e.g., "David, 1 Missed Call") regarding the second event may be displayed on the second area 1503b with the increased size. According to various embodiments, as shown in part (a) of FIG. 21B or part (a) of FIG. 21C, an indicator 2101 indicating the number of occurring events (e.g., first and second events) may be displayed on the extended shortcut icon 1503. According to various embodiments, upon identifying an input (e.g., ① of part (a) of FIG. 21B or ① and ② of part (a) of FIG. 21C) to select the second area 1503b (e.g., the first menu) or the indicator 2101 from the user, the electronic device (e.g., the electronic device 101 of FIG. 1A) may increase the size (e.g., the size of the second area 1503b) of the extended shortcut icon 1503 and display it. For example, referring to FIG. 21D, the size (e.g., the size of the second area 1503b) of the extended shortcut icon 1503 may be increased in the horizontal direction (e.g., right direction). For example, referring to FIG. 21E, the size (e.g., the size of the second area 1503b) of the extended shortcut icon 1503 may be increased in the vertical direction (e.g., lower direction). According to various embodiments, the information (e.g., "David, 1 Missed Call") regarding the second event may be displayed on the extended shortcut icon 1503 (e.g., the second area 1503b) with the increased size. According to various embodiments, the second area 1503b may be divided into a plurality of subareas 1503b-1 and 1503b-2, and first event-related information (e.g., "Brie, 1 Missed Call") and second event-related information (e.g., "David, 1 Missed Call"), respectively, may be displayed on the plurality of subareas 1503b-1 and 1503b-2.

Figure 22:
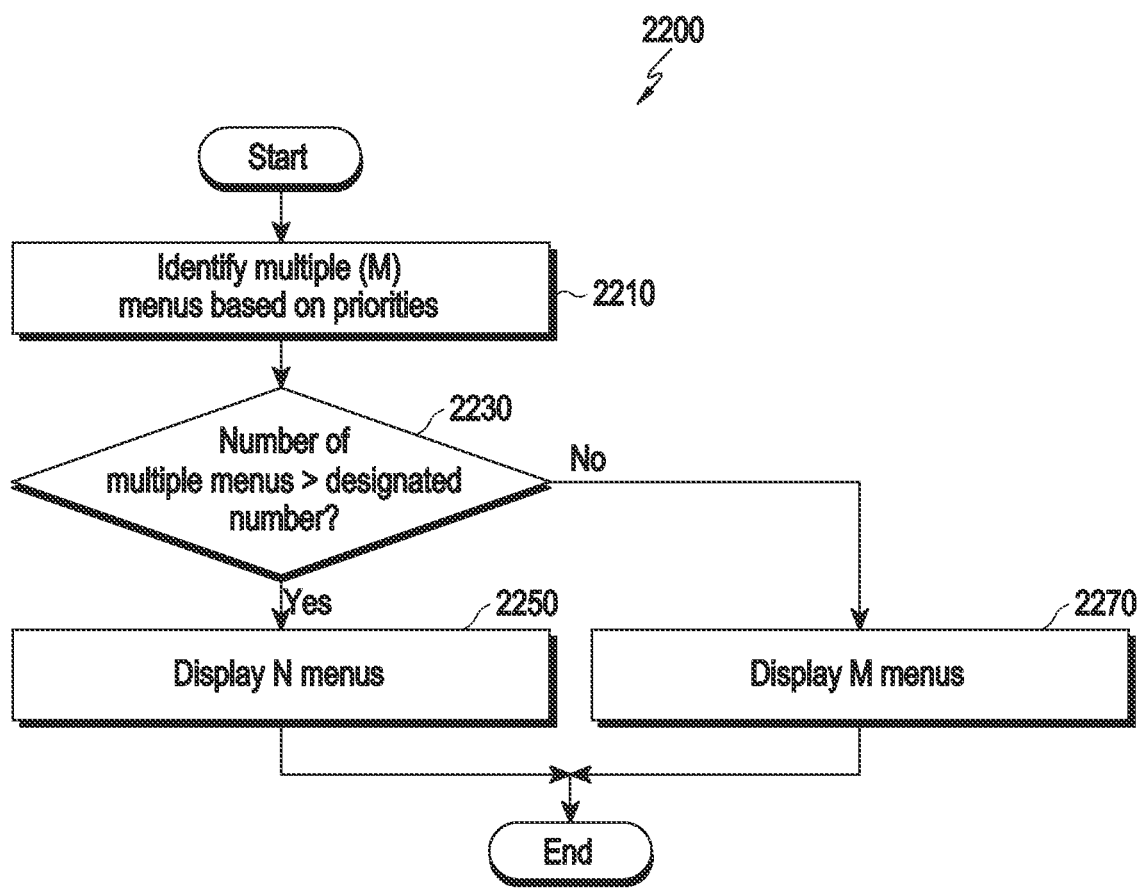
FIG. 22 is a flowchart illustrating a method of displaying a plurality of menus on an extended shortcut icon by an electronic device according to an embodiment of the disclosure.

FIG. 22 is a flowchart 2200 illustrating a method of displaying a plurality of menus on an extended shortcut by an electronic device according to an embodiment of the disclosure.

Referring to FIG. 22, according to various embodiments, in operation 2210, the electronic device (e.g., the electronic device 101 of FIG. 1A) may identify a plurality of (M) menus based on priority. According to various embodiments, the electronic device (e.g., the electronic device 101 of FIG. 1A) may identify M menus activated by the user among the menus (e.g., 1705a to 1705h of FIG. 17A) supported by the application. For example, referring to FIG. 17A, the electronic device (e.g., the electronic device 101 of FIG. 1A) may identify M menus included in the active area 1707. Or, when M events related to a plurality of activated menus occur, M menus corresponding to occurring events may be identified among the plurality of activated menus.

According to various embodiments, in operation 2230, the electronic device (e.g., the electronic device 101 of FIG. 1A) may identify whether the number (M) of the plurality of menus exceeds a designated number N. According to various embodiments, the designated number N may mean the number N (e.g., the number of subareas) of menus displayable on the extended shortcut icon (e.g., the extended shortcut icon 1503 of FIG. 15A). According to various embodiments, the designated number N may be determined based on the size of the extended shortcut icon (e.g., the extended shortcut icon 1503 of FIG. 15A) displayed.

According to various embodiments, upon identifying that the number M of the plurality of menus exceeds the designated number N, the electronic device (e.g., the electronic device 101 of FIG. 1A) may display N menus in operation 2250. According to various embodiments, the electronic device (e.g., the electronic device 101 of FIG. 1A) may display N menus among the M menus on the second area (e.g., the second area 1503b of FIG. 15A). According to various embodiments, the electronic device (e.g., the electronic device 101 of FIG. 1A) may identify the priorities of the M menus. According to various embodiments, the electronic device (e.g., the electronic device 101 of FIG. 1A) may select N menus among the M menus based on the priorities and display the N menus.

According to various embodiments, upon identifying that the number M of the plurality of menus does not exceed the designated number N, the electronic device (e.g., the electronic device 101 of FIG. 1A) may display M menus in operation 2270. According to various embodiments, the electronic device (e.g., the electronic device 101 of FIG. 1A) may display M menus on the second area (e.g., the second area 1503b of FIG. 15A).

Figure 23A:
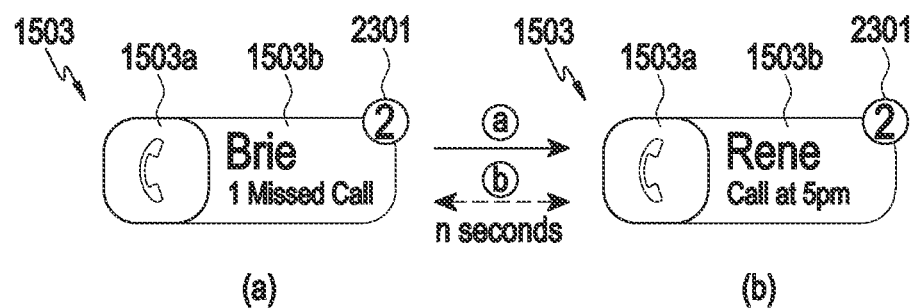
FIG. 23A illustrates a method of displaying an extended shortcut icon when a plurality of events related to different menus occur according to an embodiment of the disclosure.

FIG. 23A illustrates a method of displaying an extended shortcut icon when a plurality of events related to different menus occur according to an embodiment of the disclosure.

According to various embodiments, the extended shortcut icon 1503 may be an extended shortcut icon of, e.g., a call application. According to various embodiments, an icon image of, e.g., a call application may be displayed in the first area 1503a.

Referring to part (a) of FIG. 23A, when a first event (e.g., a missed call from "Brie") related to the first menu (e.g., the Recent Missed call menu of FIG. 17A) occurs, the electronic device (e.g., the electronic device 101 of FIG. 1A) may identify the priorities of the menus (e.g., the menus corresponding to the objects included in the active area 1707 of FIG. 17A) set (e.g., activated) by the user. According to various embodiments, the electronic device (e.g., the electronic device 101 of FIG. 1A) may identify that the first event related to the activated first menu occurs. According to various embodiments, the electronic device (e.g., the electronic device 101 of FIG. 1A) may identify that the number (e.g., one) of the activated menus (e.g., the first menu) where an event occurs does not exceed a designated number (e.g., one). According to various embodiments, the electronic device (e.g., the electronic device 101 of FIG. 1A) may display a designated number (e.g., one) of menus on the second area 1503b. For example, the electronic device (e.g., the electronic device 101 of FIG. 1A) may display the first menu providing the information (e.g., "Brie, 1 Missed Call") regarding the first event on the second area 1503b. According to various embodiments, when the second event (e.g., a call schedule to call "Rene" at 5 PM) related to the second menu (e.g., the Call Schedule menu of FIG. 17A) different from the first menu occurs after the first event (e.g., a missed call from "Brie") related to the first menu (e.g., the Recent Missed call menu of FIG. 17A) occurs, an indicator 2301 indicating the number (e.g., two) of occurring events (e.g., the first and second events) may be displayed on the extended shortcut icon 1503. According to various embodiments, the electronic device (e.g., the electronic device 101 of FIG. 1A) may identify the priorities of the menus (e.g., the menus corresponding to the objects included in the active area 1707 of FIG. 17A) set (e.g., activated) by the user. According to various embodiments, the electronic device (e.g., the electronic device 101 of FIG. 1A) may identify that the first event and second event related to the activated first menu and second menu occur. According to various embodiments, the electronic device (e.g., the electronic device 101 of FIG. 1A) may identify that the number (e.g., two) of the activated menus (e.g., the first and second menus) where an event occurs exceeds a designated number (e.g., one).

Referring to part (b) of FIG. 23A, according to various embodiments, the electronic device (e.g., the electronic device 101 of FIG. 1A) may display a designated number (e.g., one) of menus on the second area 1503b. For example, the electronic device (e.g., the electronic device 101 of FIG. 1A) may display the second menu providing information regarding the second event in place of the first menu providing information regarding the first event displayed before (ⓐ). For example, the second menu providing information regarding the second event may be displayed alternately (e.g., alternatively) with the first menu providing information regarding the first event displayed before, every predetermined time (e.g., n seconds) (ⓑ).

Figure 23B:
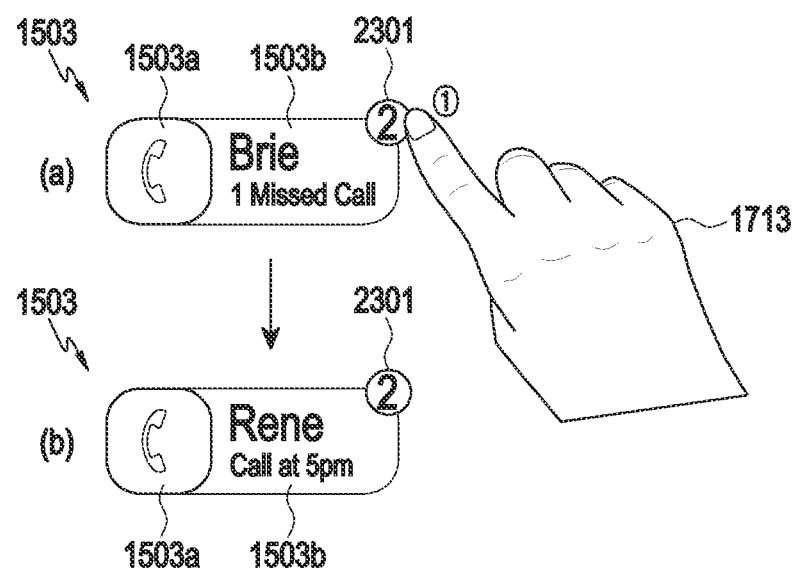
FIG. 23B illustrates a method of displaying an extended shortcut icon when a plurality of events related to different menus occur according to an embodiment of the disclosure.

FIG. 23B illustrates a method of displaying an extended shortcut icon when a plurality of events related to different menus occur according to an embodiment of the disclosure.

According to various embodiments, the extended shortcut icon 1503 may be an extended shortcut icon of the call application. According to various embodiments, an icon image of, e.g., a call application may be displayed in the first area 1503a.

Referring to part (a) of FIG. 23B, according to various embodiments, when the second event (e.g., a call schedule to call "Rene" at 5 PM) related to the second menu (e.g., the Call Schedule menu of FIG. 17A) different from the first menu occurs after the first event (e.g., a missed call from "Brie") related to the first menu (e.g., the Recent Missed call menu of FIG. 17A) occurs, an indicator 2301 indicating the number of occurring events (e.g., the first and second events) may be displayed on the extended shortcut icon 1503. According to various embodiments, the indicator 2301 may be selectable by the user 1713. For example, if the indicator 2301 is selected (e.g., touched ①), a designated number (e.g., one) of menus (e.g., the second menu) may be displayed on the second area 1503b as shown in part (b) of FIG. 23B. According to various embodiments, the second menu providing the information (e.g., "Rene, Call at 5 pm") regarding the second event may be displayed in place of the first menu providing the information (e.g., "Brie, 1 Missed Call") regarding the first event displayed before. According to various embodiments, the second menu providing information regarding the second event may be displayed alternately (e.g., alternatively) with the first menu providing information regarding the first event displayed before, every predetermined time (e.g., n seconds).

Figure 23C:
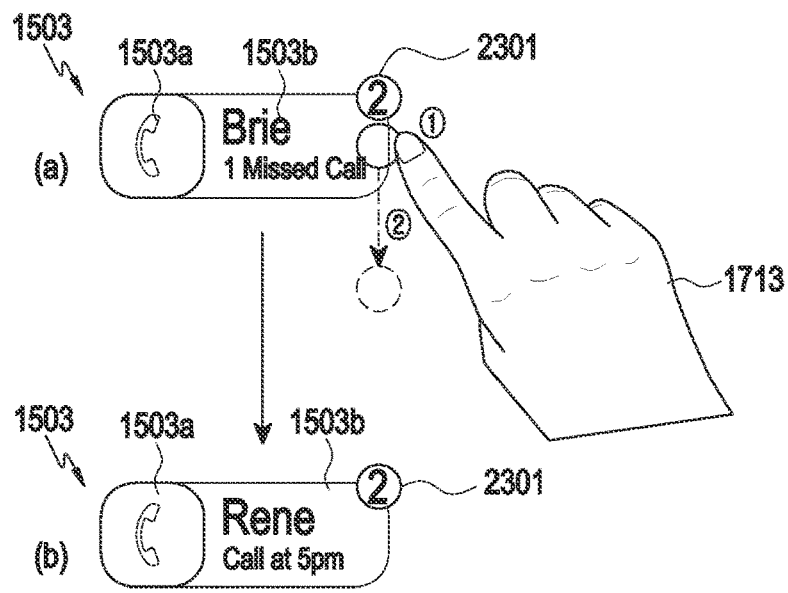
FIG. 23C illustrates a method of displaying an extended shortcut icon when a plurality of events related to different menus occur according to an embodiment of the disclosure.

FIG. 23C illustrates a method of displaying an extended shortcut icon when a plurality of events related to different menus occur according to an embodiment of the disclosure.

According to various embodiments, the extended shortcut icon 1503 may be an extended shortcut icon of the call application. According to various embodiments, an icon image of, e.g., a call application may be displayed in the first area 1503a.

Referring to part (a) of FIG. 23C, when the second event (e.g., a call schedule to call "Rene" at 5 PM) related to the different second menu (e.g., the Call Schedule menu of FIG. 17A) occurs in a state in which the first menu providing the information (e.g., "Brie, 1 Missed Call") regarding the first event is displayed on the second area 1503b, an indicator 2301 indicating the number of occurring events (e.g., the first and second events) may be displayed on the extended shortcut icon 1503. According to various embodiments, the second area 1503b (e.g., the first menu) or the indicator 2301 may be selected by the user 1713. For example, if the indicator 2301 or the second area 1503b (e.g., the first menu) is selected (e.g., touched ①) and slid ② in one direction (e.g., lower direction)), a designated number (e.g., one) of menus (e.g., the second menu) may be displayed on the second area 1503b as shown in part (b) of FIG. 23C. According to various embodiments, the second menu providing the information (e.g., "Rene, Call at 5 pm") regarding the second event may be displayed in place of the first menu providing the information (e.g., "Brie, 1 Missed Call") regarding the first event displayed before. According to various embodiments, the second menu providing information regarding the second event may be displayed alternately (e.g., alternatively) with the first menu providing information regarding the first event displayed before, every predetermined time (e.g., n seconds).

Figure 23D:
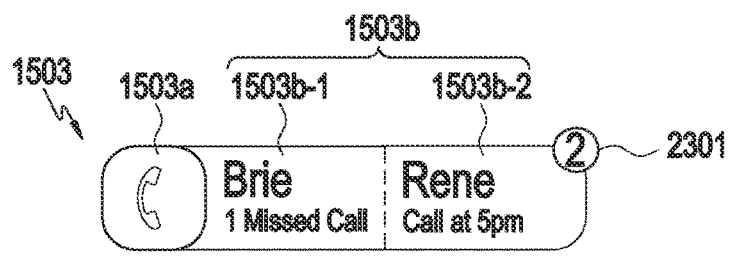
FIG. 23D illustrates a method of displaying an extended shortcut icon when a plurality of events related to different menus occur according to an embodiment of the disclosure.
Figure 23E:
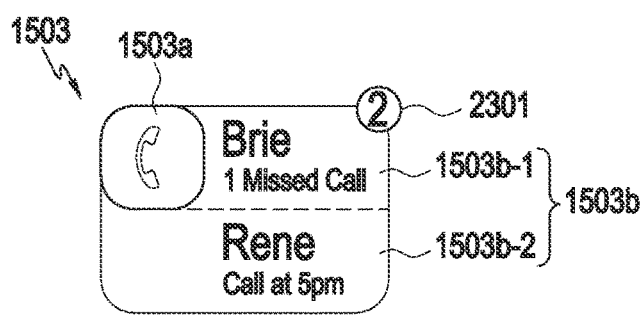
FIG. 23E illustrates a method of displaying an extended shortcut icon when a plurality of events related to different menus occur according to an embodiment of the disclosure.

FIG. 23D illustrates a method of displaying an extended shortcut icon when a plurality of events related to different menus occur according to an embodiment of the disclosure. FIG. 23E illustrates a method of displaying an extended shortcut icon when a plurality of events related to different menus occur according to an embodiment of the disclosure.

Referring to FIGS. 23D and 23E, according to various embodiments, the extended shortcut icon 1503 may be an extended shortcut icon of the call application. According to various embodiments, an icon image of, e.g., a call application may be displayed in the first area 1503a.

According to various embodiments, the second event (e.g., a call schedule to call "Rene" at 5 PM) related to the different second menu (e.g., the Call Schedule menu of FIG. 17A) may occur in a state in which the first menu (e.g., the Recent Missed call menu of FIG. 17A) providing information (e.g., "Brie, 1 Missed Call") regarding the first event is displayed on the second area 1503b (e.g., part (a) of FIG. 23B or part (a) of FIG. 23C).

According to various embodiments, when the second event (e.g., a call schedule to call "Rene" at 5 PM) related to the second menu (e.g., the Call Schedule menu of FIG. 17A) occurs in a state in which the first menu (e.g., the Recent Missed call menu of FIG. 17A) providing the information (e.g., "Brie, 1 Missed Call") regarding the first event is displayed on the second area 1503b (e.g., part (a) of FIG. 21B or part (a) of FIG. 21C), the size of the second area 1503b may be increased, and the second menu (e.g., the Call Schedule menu of FIG. 17A) providing the information (e.g., "Rene, Call at 5 pm") regarding the second event may be displayed on the second area 1503b with the increased size. According to various embodiments, as shown in part (a) of FIG. 23B or part (a) of FIG. 23C, an indicator 2301 indicating the number of occurring events (e.g., first and second events) may be displayed on the extended shortcut icon 1503. According to various embodiments, upon identifying an input (e.g., ① of part (a) of FIG. 23B or ① and ② of part (a) of FIG. 23C) to select the second area 1503b (e.g., the first menu) or the indicator 2301 from the user, the electronic device (e.g., the electronic device 101 of FIG. 1A) may increase the size (e.g., the size of the second area 1503b) of the extended shortcut icon 1503. For example, referring to FIG. 23D, the second area 1503b may be increased in size in the horizontal direction (e.g., right direction). For example, referring to FIG. 23E, the second area 1503b may be increased in size in the vertical direction (e.g., lower direction). According to various embodiments, the second menu providing the information (e.g., "Rene, Call at 5 pm") regarding the second event may be displayed on the extended shortcut icon 1503 (e.g., the second area 1503b) with the increased size. According to various embodiments, the second area 1503b may be divided into a plurality of subareas 1503b-1 and 1503b-2, and the first menu and second menu, respectively, may be displayed on the plurality of subareas 1503b-1 and 1503b-2.

Figure 24A:
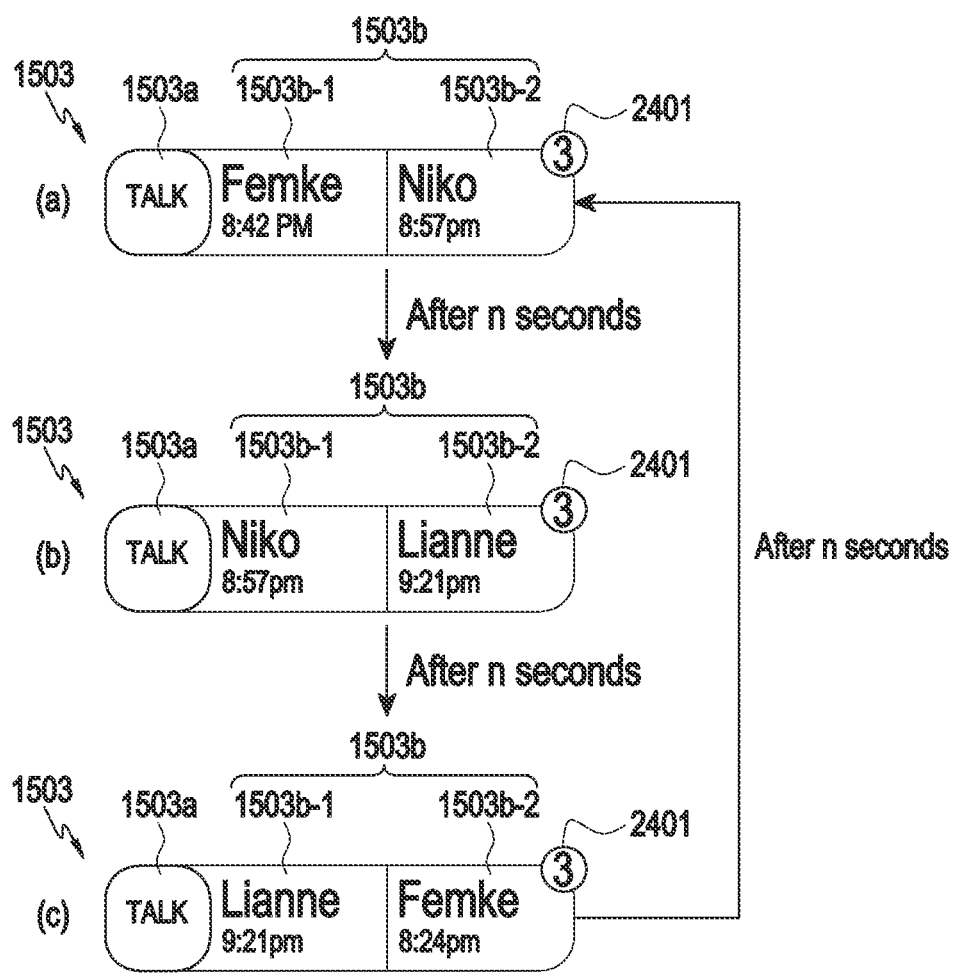
FIG. 24A illustrates a method of displaying an extended shortcut icon when a plurality of events related to a same type of menus occur according to an embodiment of the disclosure.

FIG. 24A illustrates a method of displaying an extended shortcut icon when a plurality of events related to a same type of menus occur according to an embodiment of the disclosure.

According to various embodiments, the extended shortcut icon 1503 may be an extended shortcut icon of, e.g., a messenger application. According to various embodiments, for the messenger application, the first menu (e.g., the Notification menu of FIG. 17A) to allow the menu where an event occurs to be displayed first may be set (e.g., activated) to have a relatively higher priority (e.g., first priority).

According to various embodiments, in the extended shortcut icon 1503, the number of displayable menus (e.g., the number of subareas) may be, e.g., two.

Referring to part (a) of FIG. 24A, when an event (e.g., reception of a new message) occurs regarding the "Femke" chat room, and an event (e.g., reception of a new message) occurs regarding the "Nico" chat room, the first menu regarding the "Femke" chat room may be displayed in the first subarea 1503b-1, and the second menu regarding the "Nico" chat room may be displayed in the second subarea 1503b-2. According to various embodiments, based on the times of occurrence of events (e.g., "8:42" and "8:57"), the second menu regarding the "Nico" chat room may be displayed on the right side as compared with the first menu regarding the "Femke" chat room. Thereafter, an event (e.g., reception of a new message) may occur regarding the "Lianne" chat room. According to various embodiments, an indicator 2401 indicating the number (e.g., three) of occurring events may be displayed on the extended shortcut icon 1503. According to various embodiments, since events (e.g., reception of a new message) have occurred regarding the "Femke" chat room, "Nico" chat room, and "Lianne" chat room, the first menu regarding the "Femke" chat room, the second menu regarding the "Nico" chat room, and the third menu regarding the "Lianne" chat room may have the same priority.

According to various embodiments, the electronic device (e.g., the electronic device 101 of FIG. 1A) may identify that the number (e.g., three) of menus corresponding to occurring events exceeds the number (e.g., two) of displayable menus. According to various embodiments, the electronic device (e.g., the electronic device 101 of FIG. 1A) may identify that the menus corresponding to the occurring events have the same priority and display the first, second, and third menus corresponding to the occurring events alternately (in other words, alternatively) on the second area 1503b every predetermined time (e.g., n seconds). For example, n seconds after displaying the first menu regarding the "Femke" chat room and the second menu regarding the "Nico" chat room (e.g., part (a) of FIG. 23A), the electronic device (e.g., the electronic device 101 of FIG. 1A) may display the second menu regarding the "Nico" chat room and the third menu regarding the "Lianne" chat room (e.g., part (b) of FIG. 23A) and, after n seconds, display the third menu regarding the "Lianne" chat room and the first menu regarding the "Femake" chat room (e.g., part (c) of FIG. 23A), and after n seconds, display the first menu regarding the "Femake" chat room and the second menu regarding the "Nico" chat room (e.g., part (a) of FIG. 23A). According to various embodiments, the operation of alternately displaying the first, second, and third menus as described above may be performed in response to a selection (e.g., touch) on the indicator 2401.

Figure 24B:
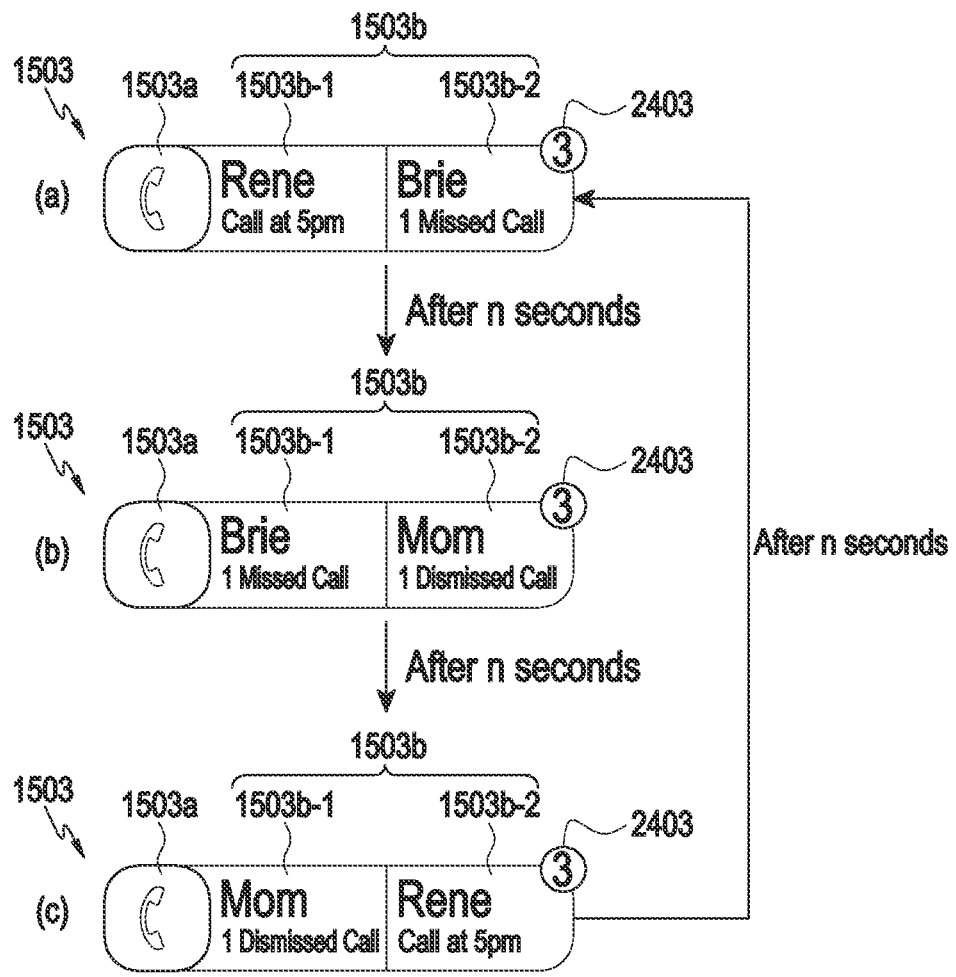
FIG. 24B illustrates a method of displaying an extended shortcut icon when a plurality of events related to different types of menus occur according to an embodiment of the disclosure.

FIG. 24B illustrates a method of displaying an extended shortcut icon when a plurality of events related to different types of menus occur according to an embodiment of the disclosure.

According to various embodiments, the extended shortcut icon 1503 may be an extended shortcut icon of, e.g., a call application.

According to various embodiments, in the extended shortcut icon 1503, the number of displayable menus (e.g., the number of subareas) may be, e.g., two. According to various embodiments, in relation to the call application, e.g., the Call Schedule menu, Recent Missed Call menu, and Recent Dismissed Call menu of FIG. 17A may be in active state. According to various embodiments, in relation to the call application, e.g., events may occur in relation to the Call Schedule menu, Recent Missed Call menu, and Recent Dismissed Call menu, respectively, of the activated menus of FIG. 17A.

Referring to part (a) of FIG. 24B, the electronic device (e.g., the electronic device 101 of FIG. 1A) may display the indicator 2403 on the extended shortcut icon 1503. According to various embodiments, the indicator 2403 may indicate the number (e.g., three) of menus activated in relation to the call application or the number (e.g., three) of menus where an event occurs in relation to the call application.

According to various embodiments, the electronic device (e.g., the electronic device 101 of FIG. 1A) may identify that the number (e.g., three) of the menus (e.g., the Call Schedule menu, Recent Missed Call menu, and Recent Dismissed Call menu) to be displayed exceeds a designated number (e.g., two). According to various embodiments, the electronic device (e.g., the electronic device 101 of FIG. 1A) may display the menus to be displayed (e.g., the Call Schedule menu, Recent Missed Call menu, and Recent Dismissed Call menu) alternately (in other words, alternatively) on the second area 1503b every predetermined time (e.g., n seconds). For example, n seconds after displaying (e.g., part (a) of FIG. 23B) the Call Schedule menu (e.g., "Rene, Call at 5 pm") and Recent Missed Call menu (e.g., "Brie, 1 Missed Call"), the electronic device (e.g., the electronic device 101 of FIG. 1A) may display the Recent Missed Call menu (e.g., "Brie, 1 Missed Call") and the Recent Dismissed Call menu (e.g., "Mom, 1 Dismissed Call") (e.g., part (b) of FIG. 23B), and after n seconds, display the Recent Dismissed Call menu (e.g., "Mom, 1 Dismissed Call") and Call Schedule menu (e.g., "Rene, Call at 5 pm") (e.g., part (c) of FIG. 23B), and after n seconds, display the Call Schedule menu (e.g., "Rene, Call at 5 pm") and Recent Missed Call menu (e.g., "Brie, 1 Missed Call") (e.g., part (a) of FIG. 23B). According to various embodiments, the operation of alternately displaying the Call Schedule menu (e.g., "Rene, Call at 5 pm"), Recent Missed Call menu (e.g., "Brie, 1 Missed Call") and Recent Dismissed Call menu (e.g., "Mom, 1 Dismissed Call") as described above may be performed in response to a selection (e.g., touch) on the indicator 2403.

According to various embodiments, referring to parts (a) and (b) of FIG. 21A, if an event further occurs on the same menu, information regarding the events may be alternately displayed through the same menu in the same subarea.

Figure 25A:
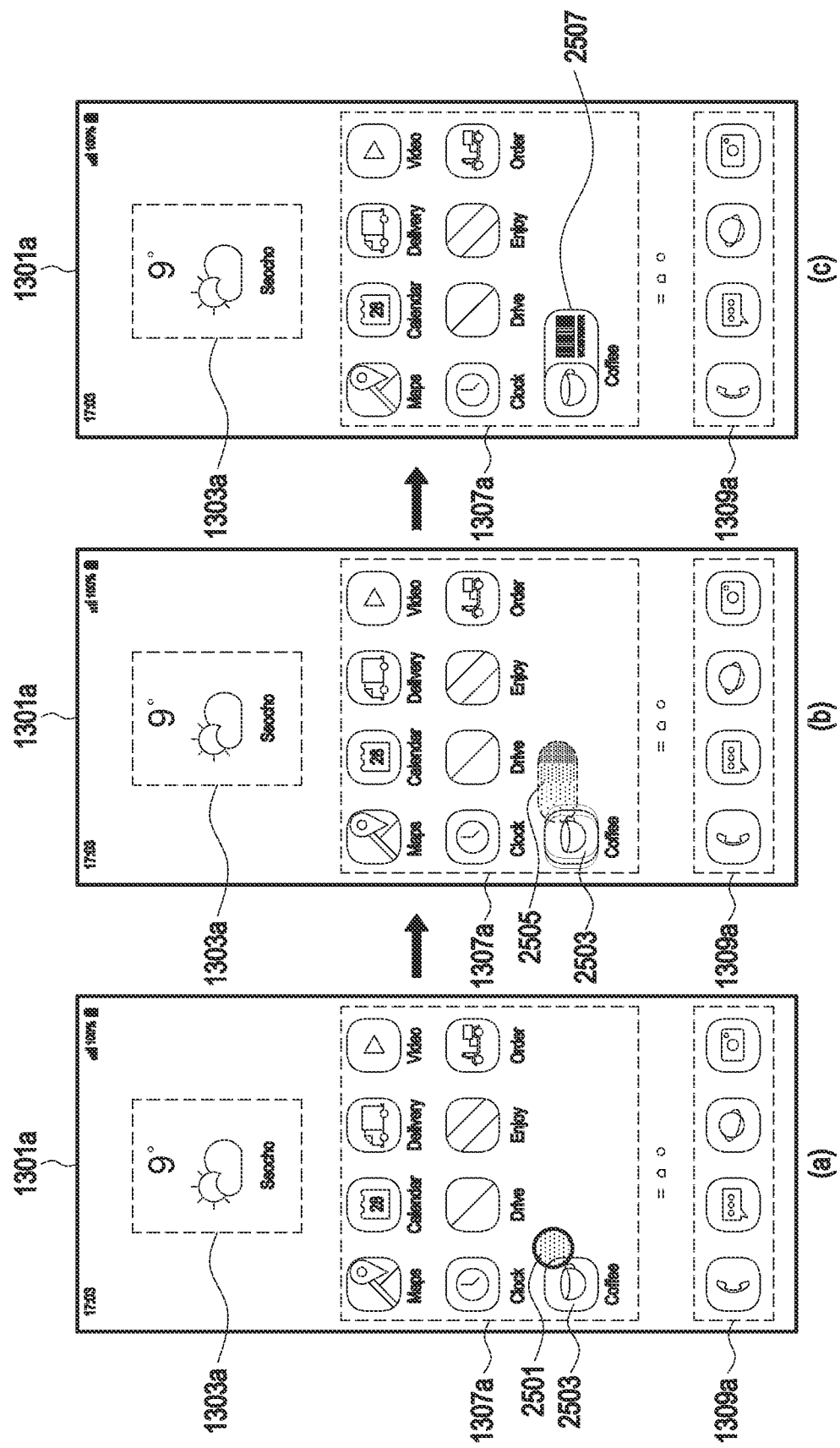
FIG. 25A illustrates a method of displaying an extended shortcut icon through a user gesture according to an embodiment of the disclosure.

FIG. 25A illustrates a method of displaying an extended shortcut icon through a user gesture according to an embodiment of the disclosure.

According to various embodiments, a home screen may be displayed on the display area 1301a of the flexible display (e.g., the flexible display 112 of FIG. 1A).

According to various embodiments, in the home screen, at least one widget 1303a and/or at least one shortcut icon 1307a and 1309a may be displayed on the display area 1301a. According to various embodiments, at least one shortcut icon may include at least one shortcut icon 1307a displayed in the home screen area and a shortcut icon 1309a displayed in the dock area.

Referring to parts (a) and (b) of FIG. 25A, the electronic device (e.g., the electronic device 101 of FIG. 1A) may identify a user input to select a first shortcut icon 2503 among at least one shortcut icon 1307a and 1309a. For example, the user input may include a long touch 2501 on the first shortcut icon 2503 (e.g., "Coffee") and a slide 2505 in one direction (e.g., right direction). According to various embodiments, upon identifying a user input to select the first shortcut icon 2503, the electronic device (e.g., the electronic device 101 of FIG. 1A) may display a visual effect to indicate that the size of the first shortcut icon 2503 is extendable. According to various embodiments, the visual effect may have a designated color or designated shape around the first shortcut icon 2503. According to various embodiments, a different visual effect may be displayed depending on whether the application corresponding to the first shortcut icon 2503 supports the function of displaying the menu to provide information and/or function of the application.

Referring to part (c) of FIG. 25A, the electronic device (e.g., the electronic device 101 of FIG. 1A) may display the first shortcut icon 2503 as a first extended shortcut icon 2507 based on the identified user input. According to various embodiments, the electronic device (e.g., the electronic device 101 of FIG. 1A) may increase the size of the first shortcut icon 2503 corresponding to the moving distance of the slide 2505 in one direction (e.g., right direction) and display it and, if the increased size of the first shortcut icon 2503 exceeds a threshold size (e.g., second size), display the first shortcut icon 2503 as the first extended shortcut icon 2507. According to various embodiments, when the moving distance of the slide 2505 in one direction (e.g., right direction) exceeds a designated distance, the electronic device (e.g., the electronic device 101 of FIG. 1A) may display the first shortcut icon 2503 as the first extended shortcut icon 2507. According to various embodiments, the first extended shortcut icon 2507 may provide additional information and/or function corresponding to the "Coffee" application. For example, the first extended shortcut icon 2507 may provide a barcode image that may be used as a means for payment in coffee shop.

According to various embodiments, even when at least one extended shortcut icon and the first shortcut icon 2503 are together displayed, according to the above-described user input to select the first shortcut icon 2503, the first shortcut icon 2503 may be changed into the first extended shortcut icon 2507 that is then displayed.

Figure 25B:
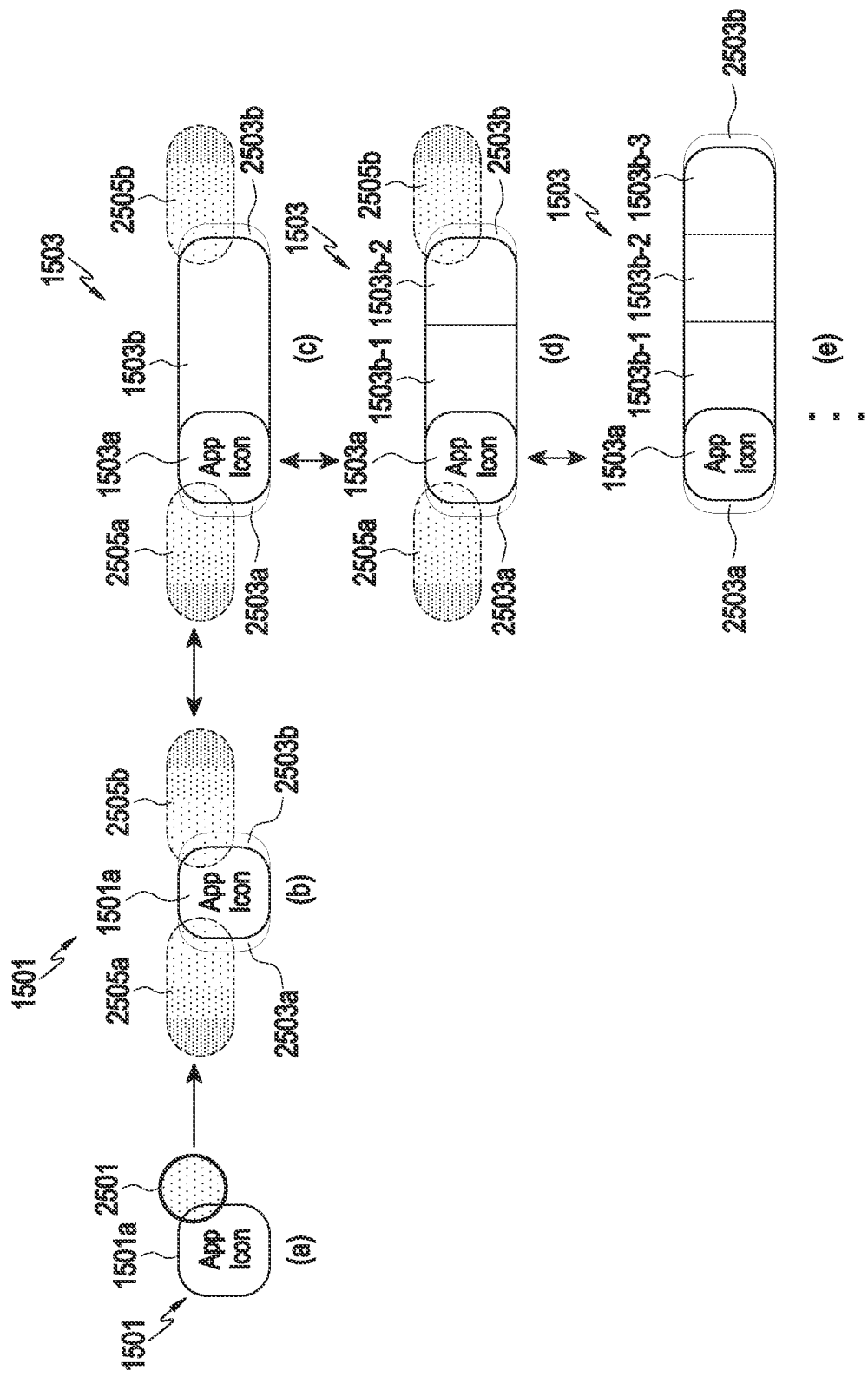
FIG. 25B illustrates a method of displaying an extended shortcut icon through a user gesture according to an embodiment of the disclosure.

FIG. 25B illustrates a method of displaying an extended shortcut icon through a user gesture according to an embodiment of the disclosure.

Parts (a) and (b) of FIG. 25B illustrate a shortcut icon 1501, and parts (c) to (e) of FIG. 25B illustrate an extended shortcut icon 1503.

Referring to part (a) of FIG. 25B, a first user input (e.g., a long touch 2501) to select the shortcut icon 1501 may be identified.

Referring to part (b) of FIG. 25B, when a user input (e.g., the long touch 2501) to select the shortcut icon 1501 is identified, visual effects 2503a and 2503b in a designated color or designated shape may be displayed around the shortcut icon 1501. A second user input (e.g., a slide 2505a to the left or a slide 2505b to the right) to select the shortcut icon 1501 may be identified.

Referring to part (c) of FIG. 25B, the shortcut icon 1501 may be changed into the extended shortcut icon 1503 that is then displayed, based on the moving direction and/or moving distance of a second user input (e.g., a slide 2505a to the left or slide 2505b to the right). For example, when the second user input is a slide 2505a to the left, the extended shortcut icon 1503 may be increased in size to the left from the position where the shortcut icon 1501 used to be displayed and be displayed. For example, when the second user input is a slide 2505b to the right, the extended shortcut icon 1503 may be increased in size to the right from the position where the shortcut icon 1501 used to be displayed and be displayed. For example, when the moving distance of the second user input (e.g., the slide 2505a to the left or the slide 2505b to the right) exceeds a designated distance (or when the size of the shortcut icon 1501 exceeds a threshold size (e.g., the second size) according to the second user input), the shortcut icon 1501 may be changed into the extended shortcut icon 1503 that may then be displayed.

Referring to parts (c) to (e) of FIG. 25B, the extended shortcut icon 1503 may include a first area 1503a including an image (e.g., icon image) representing the corresponding application and a second area 1503b including at least one menu. According to various embodiments, the image included in the first area 1503a may correspond to the icon image included in the first area 1501a of the shortcut icon 1501. According to various embodiments, the second area 1503b may include at least one subarea (1503b-1, 1503b-2, and 1503b-3). According to various embodiments, the number of at least one subarea 1503b-1, 1503b-2, and 1503b-3 may be determined based on the size of the extended shortcut icon 1503 changed according to the second user input (e.g., the slide 2505a to the left or the slide 2505b to the right). For example, when the extended shortcut icon 1503 exceeds the second size and is not more than the third size according to the second user input (e.g., the slide 2505*a* to the left or slide 2505*b* to the right), the second area 1503*b* may include one subarea (part (c) of FIG. 25B). For example, when the extended shortcut icon 1503 exceeds the third size and is not more than a fourth size according to the second user input (e.g., the slide 2505*a* to the left or slide 2505*b* to the right), the second area 1503*b* may include two subareas (part (d) of FIG. 25B). For example, when the extended shortcut icon 1503 exceeds the third size and is not more than the fourth size according to the second user input (e.g., the slide 2505*a* to the left or slide 2505*b* to the right), the second area 1503*b* may include three subareas (part (e) of FIG. 25B).

Figure 25C:
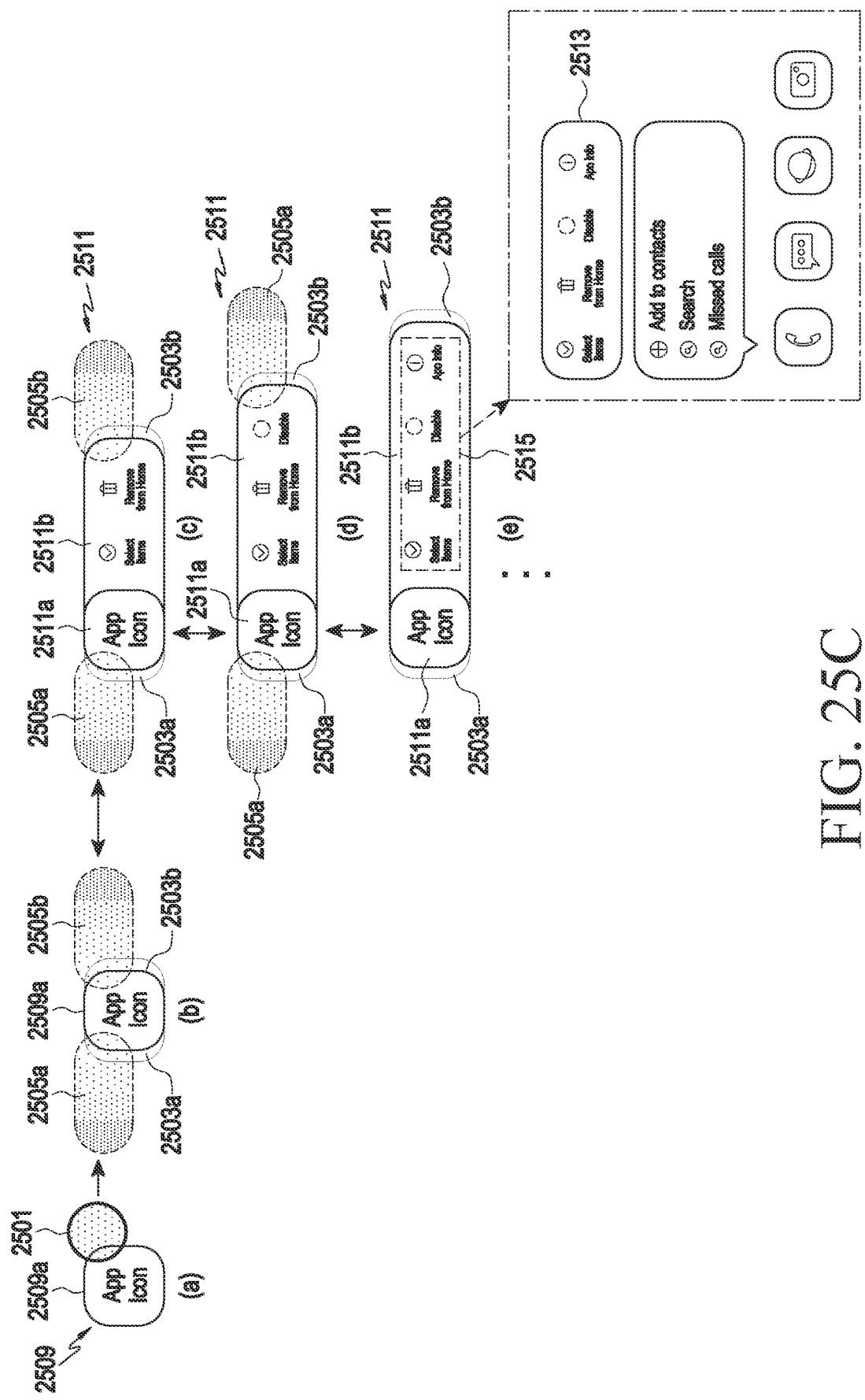
FIG. 25C illustrates a method of displaying an extended shortcut icon of an application not supporting a function of displaying a menu for providing a function of an application according to an embodiment of the disclosure.

FIG. 25C illustrates a method of displaying an extended shortcut icon of an application not supporting a function of displaying a menu for providing a function of an application according to an embodiment of the disclosure.

According to various embodiments, the application corresponding to the shortcut icon 2509 of part (a) or (b) of FIG. 25A may be an application not supporting the function of displaying the menu providing the function of the application. For example, the application corresponding to the shortcut icon 2511 may be an application not supporting the open application programming interface (API) and software development kit (SDK) for displaying the menu providing the function of the application.

According to various embodiments, like those described in connection with FIG. 25A or 25B, visual effects 2503*a* and 2503*b* may be displayed according to the first user input 2501 on the shortcut icon 2509 (part (b) of FIG. 25A). According to various embodiments, like those described in connection with FIG. 25A or 25B, the extended shortcut icon 2511 may be displayed according to the first user input 2501 and/or second user input 2505*a* or 2505*b* on the shortcut icon 2509 (parts (c) to (e) of FIG. 25A).

Referring to parts (c) to (e) of FIG. 25C, the extended shortcut icon 2511 may include a first area 2511*a* including an image (e.g., icon image) representing the corresponding application and a second area 2511 including at least one object According to various embodiments, at least one object 2515 providing functions related to the extended shortcut icon may be displayed in the second area 2511*b*. For example, at least one object 2515 may correspond to at least one object 2513 that may be displayed on the home screen in connection with the shortcut icon 2509. For example, the at least one object 2515 may include an object (e.g., "Select items") to provide the function of selecting the extended shortcut icon 2511, an object (e.g., "Remove from Home") to provide the function of removing the extended shortcut icon 2511 from the home screen, an object (e.g., "Disable") to provide the function of deactivating selection of the extended shortcut icon 2511, and/or an object (e.g., "App info") to provide the function of displaying detailed information about the application corresponding to the extended shortcut icon 2511. According to various embodiments, the number of objects 2515 displayed on the second area 2511*b* may be determined based on the size of the extended shortcut icon 1503 like those described in connection with FIG. 25A or 25B. For example, when the extended shortcut icon 2511 exceeds the second size and is not more than the third size according to the second user input (e.g., the slide 2505*a* to the left or slide 2505*b* to the right), two objects (e.g., "Select item" and "Remove from Home") may be displayed on the second area 2511*b* (part (c) of FIG. 25C). For example, when the extended shortcut icon 2511 exceeds the third size and is not more than a fourth size according to the second user input (e.g., the slide 2505*a* to the left or slide 2505*b* to the right), three objects (e.g., "Select item", "Remove from Home" and "Disable") may be displayed on the second area 2511*b* (part (d) of FIG. 25C). For example, when the extended shortcut icon 2511 exceeds the third size and is not more than the fourth size according to the second user input (e.g., the slide 2505*a* to the left or slide 2505*b* to the right), four objects (e.g., "Select item", "Remove from Home", "Disable," and "App info") may be displayed on the second area 2511*b* (part (e) of FIG. 25C).

Figure 26A:
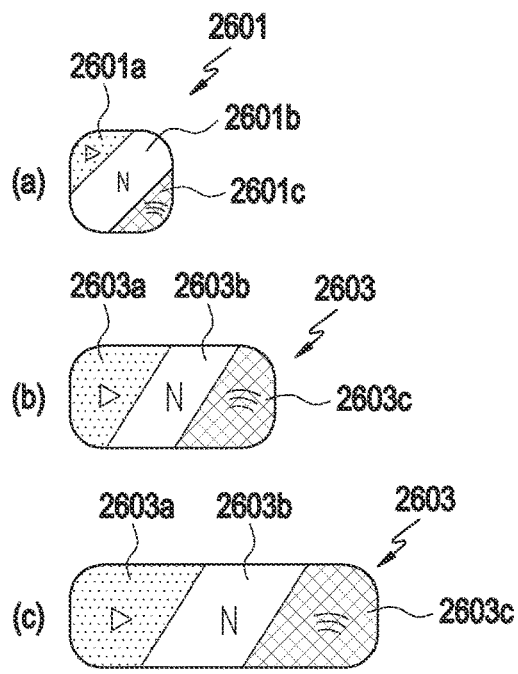
FIG. 26A illustrates a method of displaying an extended shortcut icon of a shortcut icon providing an app pair function according to an embodiment of the disclosure.

FIG. 26A illustrates a method of displaying an extended shortcut icon of a shortcut icon providing an app pair function according to an embodiment of the disclosure.

Referring to part (a) of FIG. 26A, according to various embodiments, a shortcut icon 2601 may be a shortcut icon to provide an app pair function. For example, if the shortcut icon 2601 is selected (e.g., touched), the execution screens of the plurality of applications set corresponding to the shortcut icon 2601 may be displayed together in multi-window mode. According to various embodiments, e.g., three applications (e.g., first, second, and third applications) may be configured corresponding to the shortcut icon 2601. Referring to part (a) of FIG. 26A, the shortcut icon 2601 may include a first image 2601*a* corresponding to the first application, a second image 2601*b* corresponding to the second application, and a third image 2601*c* corresponding to the third application. According to various embodiments, the first, second, and third images 2601*a*, 2601*b*, and 2601*c* may correspond to the colors (e.g., background color) of the icons of the corresponding applications.

According to various embodiments, if the size of the shortcut icon 2601 exceeds the threshold size (e.g., second size), the shortcut icon 2601 may be displayed as the extended shortcut icon 2603 as shown in part (b) or (c) of FIG. 26A. According to various embodiments, like the shortcut icon 2601, the extended shortcut icon 2603 may provide the function of displaying the execution screens of the plurality of configured applications in the multi-window mode. According to various embodiments, like the shortcut icon 2601, the extended shortcut icon 2603 may include first, second, and third images 2603*a*, 2603*b*, and 2603*c* corresponding to the colors (e.g., background color) of the icons of corresponding applications. According to various embodiments, images (e.g., 2603*a*, 2603*b*, and 2603*c*) included in the extended shortcut icon 2603 may be selectable. For example, when any one of images included in the extended shortcut icon 2603 is selected, the execution screen of the application corresponding to the selected image may be displayed. According to various embodiments, each of the images (e.g., 2603*a*, 2603*b*, and 2603*c*) included in the extended shortcut icon 2603 may include an image (e.g., a preview image) corresponding to the execution screen to be displayed upon selection.

Figure 26B:
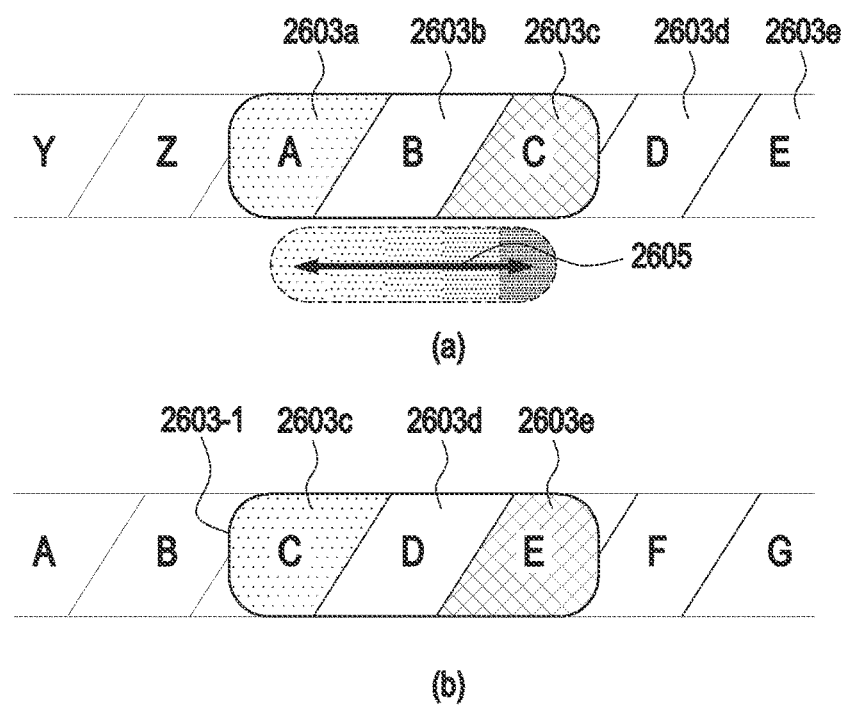
FIG. 26B illustrates a method of changing an app pair list on an extended shortcut icon of a shortcut icon providing an app pair function according to an embodiment of the disclosure.

FIG. 26B illustrates a method of changing an app pair list on an extended shortcut icon of a shortcut icon providing an app pair function according to an embodiment of the disclosure.

According to various embodiments, the extended shortcut icons 2603 and 2603-1 may be extended shortcut icons corresponding to the shortcut icons providing the app pair function.

Referring to part (a) of FIG. 26B, the extended shortcut icon 2603 may be in a state in which the first application ("A"), the second application ("B"), and the third application ("C") are configured. According to various embodiments, if the user input 2605 on the extended shortcut icon 2603 is identified in a state in which the extended shortcut icon 2603 is displayed on the home screen, a list of applications configured corresponding to the extended shortcut icon 2603 may be changed. For example, if a swipe gesture 2605 on the extended shortcut icon 2603 in one direction (e.g., left direction or right direction) is identified, the application list may be changed to include the application corresponding to the moving direction (e.g., left direction or right direction) of the swipe gesture 2605. For example, referring to parts (a) and (b) of FIG. 26B, upon identifying a swipe gesture 2605 to the right, the application list configured corresponding to the extended shortcut icon 2603 may be changed into the third application ("C"), the fourth application ("D"), and the fifth application ("E"). According to various embodiments, the order of display of the applications to add or exclude an application according to the above-described swipe gesture may be preset by the user. According to various embodiments, the extended shortcut icon 2603-1 corresponding to the changed application list may be displayed. According to various embodiments, the extended shortcut icon 2603-1 may provide an app pair function for the third application ("C"), the fourth application ("D"), and the fifth application ("E") included in the changed application list.

Figure 26C:
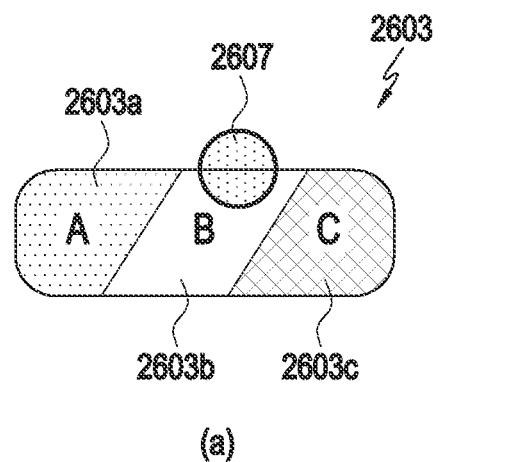
FIG. 26C illustrates a method of changing an app pair list in a state of displaying application execution screens according to an app pair function according to an embodiment of the disclosure.
Figure 26C:
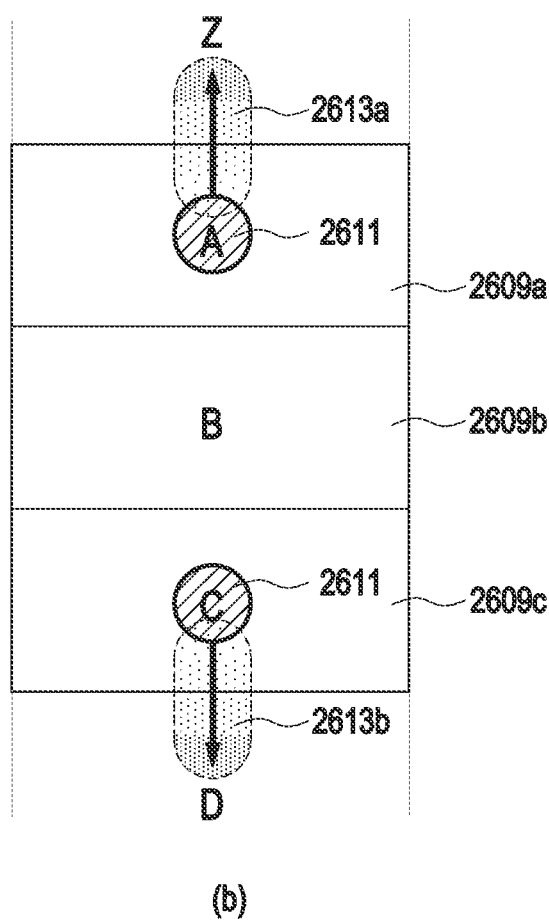

FIG. 26C illustrates a method of changing an app pair list in a state of displaying application execution screens according to an app pair function according to an embodiment of the disclosure.

According to various embodiments, the extended shortcut icon 2603 may be a shortcut icon providing an app pair function.

Referring to part (a) of FIG. 26C, the extended shortcut icon 2603 may be in a state in which the first application ("A"), the second application ("B"), and the third application ("C") are configured. According to various embodiments, for example, the extended shortcut icon 2603 may include first, second, and third images 2603a, 2603b, and 2603c corresponding to the colors (e.g., background color) of the icons of corresponding applications. According to various embodiments, if the extended shortcut icon 2603 is selected (e.g., tapped), the first application ("A"), second application ("B") and third application ("C"), set corresponding thereto, may be executed together.

Referring to part (b) of FIG. 26C, the first execution screen 2609a of the first application ("A"), the second execution screen 2609b of the second application ("B"), and the third execution screen 2609c of the third application ("C") may be displayed together in a multi-window mode on the flexible display (e.g., the flexible display 112 of FIG. 1A). According to various embodiments, the order in which the first, second, and third execution screens 2609a, 2609b, and 2609c are displayed in the multi-window mode (e.g., array in the vertical direction) may correspond to the order (e.g., array in the horizontal direction) of the first, second, and third images 2603a, 2603b, and 2603c displayed in the extended shortcut icon 2603. According to various embodiments, if a user input is identified on any one execution screen (e.g., the first execution screen 2609a or third execution screen 2609c) in a state in which the first, second, and third execution screens 2609a, 2609b, and 2609c are displayed together, the list of applications configured corresponding to the extended shortcut icon 2603 may be changed. For example, when a long tap 2611 and an upward swipe gesture 2613a are identified on the first execution screen 2609a, the list of applications configured corresponding to the extended shortcut icon 2603 may be changed into the fourth application ("Z"), the first application ("A"), and the second application ("B"). For example, if a long tap 2611 and a downward swipe gesture 2613b are identified on the third execution screen 2609c, the list of applications configured corresponding to the extended shortcut icon 2603 may be changed into the second application ("B"), the third application ("C"), and the fifth application ("D"). According to various embodiments, the order of display of the applications to add or exclude an application according to the above-described swipe gesture may be preset by the user. According to various embodiments, the extended shortcut icon (e.g., 2603-1 of FIG. 26B) corresponding to the changed application list may be displayed. According to various embodiments, if the extended shortcut icon (e.g., 2603-1 of FIG. 26B) is selected (e.g., tapped), applications included in the changed application list may be executed together.

Figure 27A:
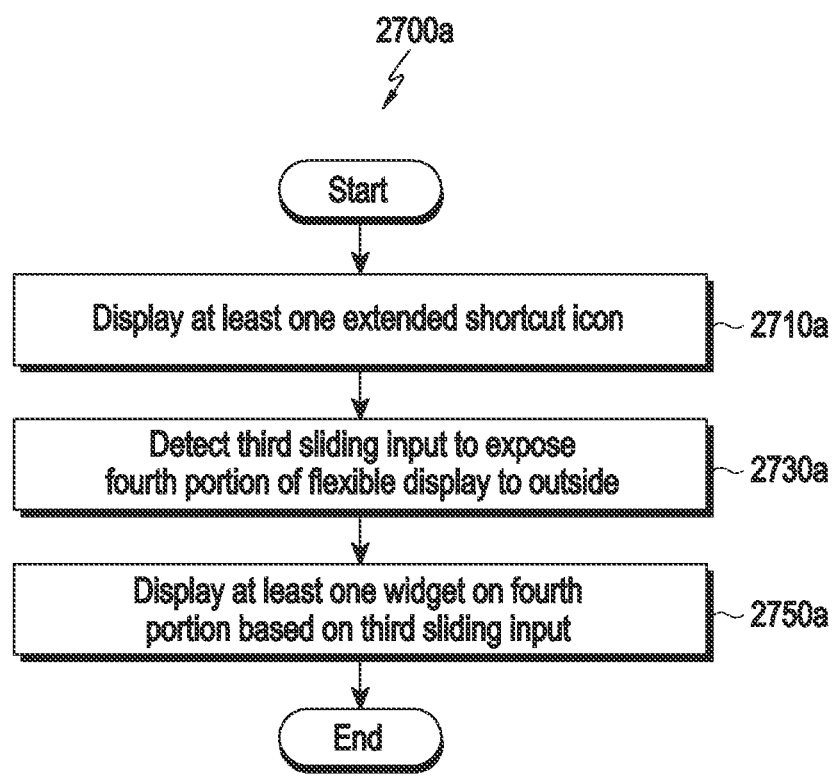
FIG. 27A is a flowchart illustrating an operation of displaying a widget by an electronic device according to an embodiment of the disclosure.

FIG. 27A is a flowchart 2700a illustrating an operation for displaying a widget by an electronic device according to an embodiment of the disclosure.

Referring to FIG. 27A, according to various embodiments, in operation 2710a, the electronic device (e.g., the electronic device 101 of FIG. 1A) may display at least one extended shortcut icon (e.g., the extended shortcut icon 1503 of FIG. 15A). According to various embodiments, the flexible display (e.g., the flexible display 112 of FIG. 1A) may be in a state (e.g., open state) in which the second portion or third portion is exposed to the outside.

According to various embodiments, in operation 2730a, the electronic device (e.g., the electronic device 101 of FIG. 1A) may detect a third sliding input to expose the fourth portion of the flexible display (e.g., the flexible display 112 of FIG. 1A) to the outside. For example, the state in which the fourth portion is exposed to the outside may mean a state in which a relatively wide portion including the second portion or the third portion is exposed to the outside. For example, the state in which the fourth portion is exposed to the outside may be 1201d of FIG. 12A, 1207d of FIG. 12B, or 1209d of FIG. 12C.

According to various embodiments, in operation 2750a, the electronic device (e.g., the electronic device 101 of FIG. 1A) may display at least one widget (e.g., the widget 1321 of FIG. 13C) on the fourth portion, based on the third sliding input.

Figure 27B:
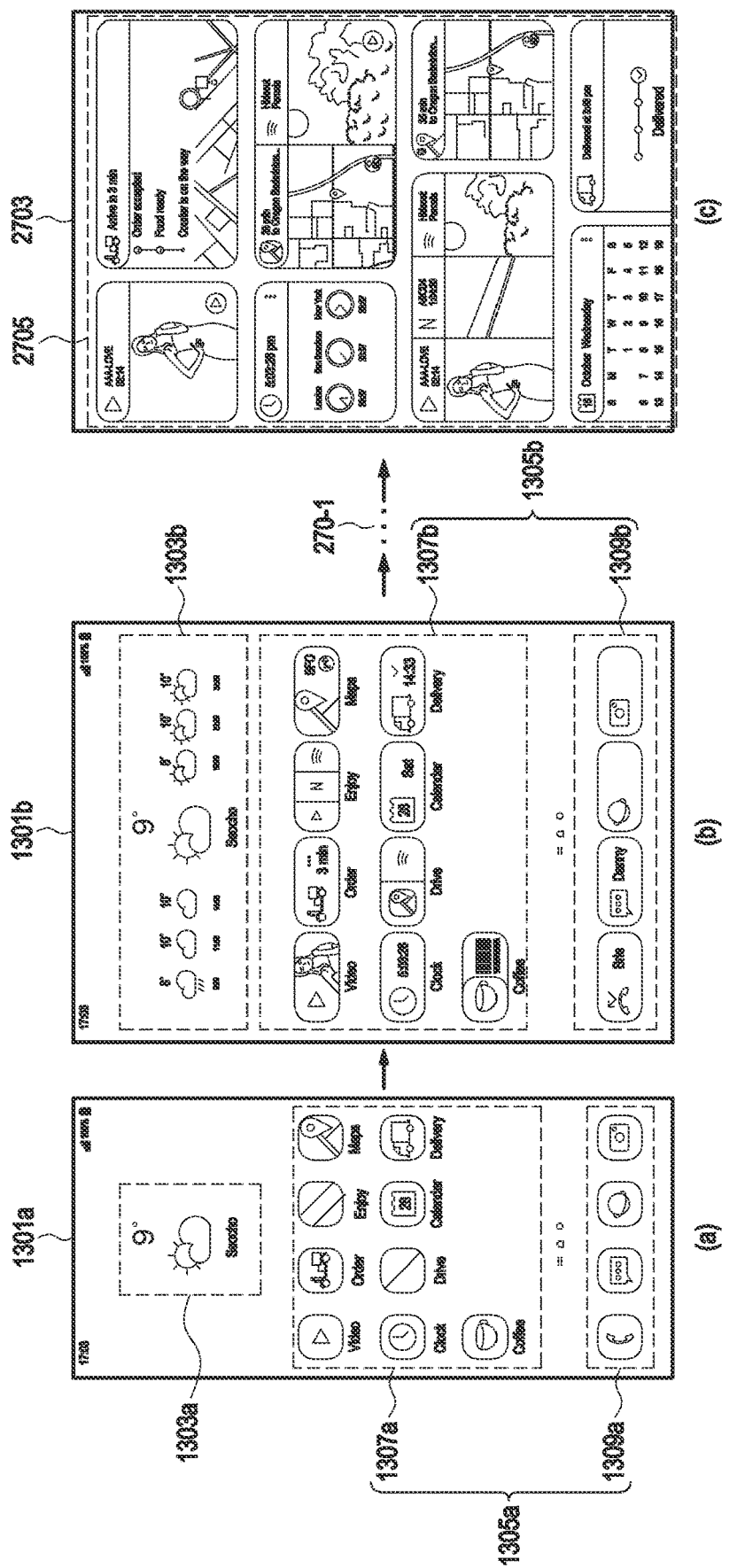
FIG. 27B illustrates a method of changing a display state according to a size of a portion exposed to the outside according to an embodiment of the disclosure.

FIG. 27B illustrates a method of changing a display state according to a size of a portion exposed to the outside, according to an embodiment of the disclosure. The parts overlapping the description of part (a) or (b) of FIG. 13B described above are omitted.

Referring to Part (a) of FIG. 27B, it illustrates a home screen displayed in the display area 1301a of the flexible display (e.g., the flexible display 112 of FIG. 1A) in the exposed state (e.g., closed state) of the first portion of the flexible display (e.g., the flexible display 112 of FIG. 1A). According to various embodiments, at least one widget 1303a and/or at least one shortcut icon 1305a may be displayed on the display area 1301a. According to various embodiments, at least one shortcut icon 1305a may include at least one shortcut icon 1307a displayed in the home screen area and at least one shortcut icon 1309a displayed in the dock area.

Part (b) of FIG. 27B illustrates a home screen displayed in the display area 1301b of the flexible display (e.g., the flexible display 112 of FIG. 1A) in the exposed state (e.g., first open state) of the second portion of the flexible display (e.g., the flexible display 112 of FIG. 1A). According to various embodiments, the state in which the second portion is exposed may be a state in which a portion wider than the first portion is exposed to the outside. According to various embodiments, at least one widget 1303b and/or at least one extended shortcut icon 1305b may be displayed on the display area 1301b. According to various embodiments, at least one extended shortcut icon 1305b may include at least one extended shortcut icon 1307b displayed in the home screen area and at least one extended shortcut icon 1309b displayed in the dock area. According to various embodiments, in a case where the exposed portion of the flexible display (e.g., the flexible display 112 of FIG. 1A) is wider than the second portion (e.g., when the third portion including the second portion is exposed), the size of at least one extended widget 1303b and/or at least one extended shortcut icon 1305b may stepwise be increased corresponding to the increased size of the exposed portion of the flexible display (e.g., the flexible display 112 of FIG. 1A) (2701). According to various embodiments, when the size of the at least one extended shortcut icon 1305b is increased, the number of displayable menus of the at least one extended shortcut icon 1305b may increase.

Part (c) of FIG. 27B illustrates a home screen displayed in the display area 2703 of the flexible display (e.g., the flexible display 112 of FIG. 1A) in the exposed state of the fourth portion of the flexible display (e.g., the flexible display 112 of FIG. 1A). According to various embodiments, the state in which the fourth portion is exposed may be a state in which a portion wider than the second portion or third portion is exposed to the outside. According to various embodiments, when the fourth portion of the flexible display (e.g., the flexible display 112 of FIG. 1A) is exposed, at least one widget 2705 corresponding to the at least one extended shortcut icon 1305b may be displayed. According to various embodiments, an array (e.g., a layout) in which at least one widget 2705 is displayed may be identical to or different from the array of at least one extended shortcut icon 1305b. According to various embodiments, the at least one widget 2705 displayed may correspond to part of at least one extended shortcut icon 1305b depending on whether the size of the display area 2703 and/or whether the corresponding application supports the widget function.

Figure 28A:
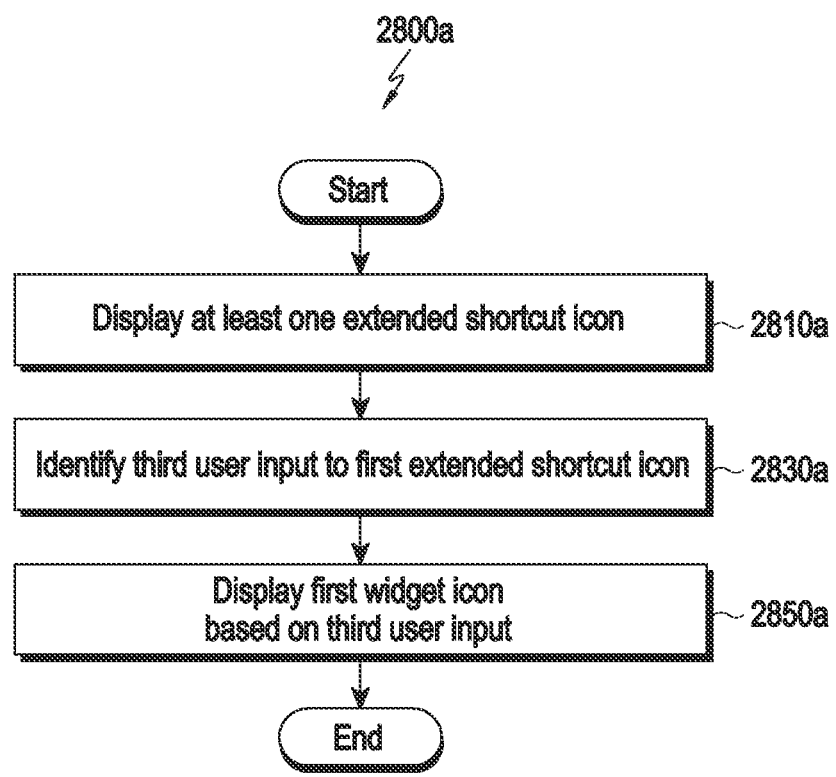
FIG. 28A is a flowchart illustrating an operation of displaying a widget by an electronic device according to an embodiment of the disclosure.

FIG. 28A is a flowchart 2800a illustrating an operation for displaying a widget by an electronic device according to an embodiment of the disclosure.

Referring to FIG. 28A, according to various embodiments, in operation 2810a, the electronic device (e.g., the electronic device 101 of FIG. 1A) may display at least one extended shortcut icon (e.g., the extended shortcut icon 1503 of FIG. 15A). According to various embodiments, the flexible display (e.g., the flexible display 112 of FIG. 1A) may be in a state (e.g., open state) in which the second portion or third portion is exposed to the outside.

According to various embodiments, in operation 2830a, the electronic device (e.g., the electronic device 101 of FIG. 1A) may identify a third user input on the first extended shortcut icon. For example, the third user input may be a pinch-zoom-in gesture on the first extended shortcut icon.

According to various embodiments, in operation 2850a, the electronic device (e.g., the electronic device 101 of FIG. 1A) may display the first widget based on the third user input. For example, as the moving distance of the pinch-zoom-in gesture on the first extended shortcut icon increases, the first widget may be displayed larger.

Figure 28B:
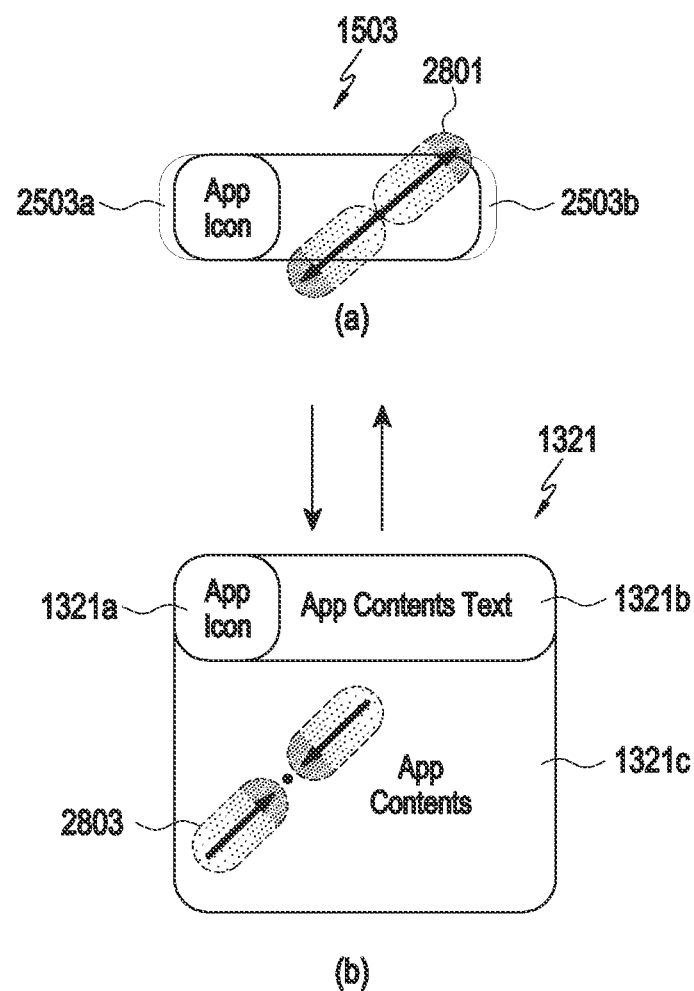
FIG. 28B illustrates a method of displaying a widget by an electronic device according to an embodiment of the disclosure.

FIG. 28B illustrates a method of displaying a widget by an electronic device according to an embodiment of the disclosure. A portion overlapping the description of FIG. 13C or FIG. 25B described above is omitted.

Referring to part (a) of FIG. 28B, according to various embodiments, the extended shortcut icon 1503 may be displayed on the flexible display (e.g., the flexible display 112 of FIG. 1A). According to various embodiments, the flexible display (e.g., the flexible display 112 of FIG. 1A) may be in a state (e.g., open state) in which the second portion or third portion is exposed to the outside. According to various embodiments, a pinch-zoom-in gesture 2801 on the extended shortcut icon 1503 may be identified. According to various embodiments, visual effects 2503a and 2503b indicating that the size of the extended shortcut icon 1503 may increase may be displayed.

Referring to part (b) of FIG. 28B, if a pinch zoom-in gesture 2801 on the extended shortcut icon 1503 is identified, the extended shortcut icon 1503 may be changed to a widget 1321. According to various embodiments, the widget 1321 may include an icon image 1321a indicating a corresponding application, a menu 1321b, and/or a widget screen 1321c. According to various embodiments, text representing the widget screen 1321c, instead of the menu 1321b, may be displayed in the area where the menu 1321b is displayed. According to various embodiments, if a pinch-zoom-out gesture 2805 on an area (e.g., the widget screen 1321c) of the widget 1321 is identified, the widget 1321 may be changed into the extended shortcut icon 1503.

Figure 29A:
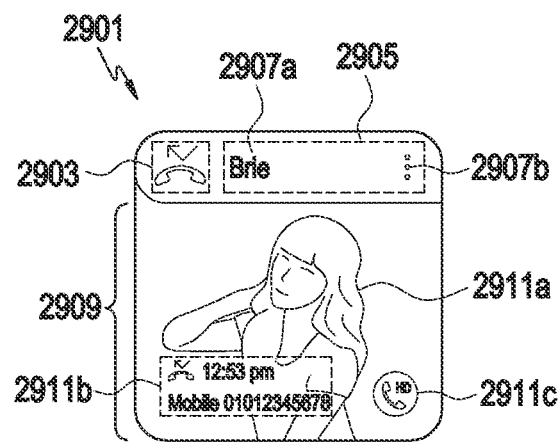
FIG. 29A illustrates a widget of a call application according to an embodiment of the disclosure.

FIG. 29A illustrates a widget of a call application according to an embodiment of the disclosure.

Referring to FIG. 29A, according to various embodiments, the widget 2901 may be a widget corresponding to a call application.

According to various embodiments, the widget 2901 may include an image 2903 (e.g., the icon image 1321a of FIG. 13C) representing the application, a menu 2905 (e.g., the menu 1319b of FIG. 13C) including additional information, and a widget screen 2909 (e.g., the widget screen 1321c of FIG. 13C).

According to various embodiments, the image 2903 representing the application may include an image representing a call application. For example, in relation to the call application, an image 2903 representing an occurring event (e.g., a missed call) may be displayed.

According to various embodiments, the menu 2905 including the additional information may include information related to the occurring event. For example, the menu 2905 including the additional information may display the name 2907a (e.g., "Brie") of the caller of the missed call. According to various embodiments, the menu 2905 including the additional information may include the object related to the function of the widget and/or corresponding application. For example, the area (e.g., the area where "Brie" is displayed) where the additional information of the menu 2905 is displayed may display the execution screen (e.g., an execution screen including the missed call list) corresponding to the occurring event when selected (e.g., touched). For example, the menu 2905 including the additional information may display the object 2907b providing the function of the widget (e.g., the function of hiding the display of the widget) when selected (e.g., touched).

According to various embodiments, the widget screen 2909 may include information related to the occurring event. For example, when a missed call occurs, the image 2911a of the caller of the missed call, the incoming time of the missed call (e.g., "12:53 pm") and/or the phone number (e.g., "01071908041") of the caller of the missed call may be displayed. According to various embodiments, the widget screen 2909 may include the object related to the function of the widget and/or corresponding application. For example, the widget screen 2909 may display an object 2911c providing the function of sending a call to the caller of the missed call when selected (e.g., touched).

Figure 29B:
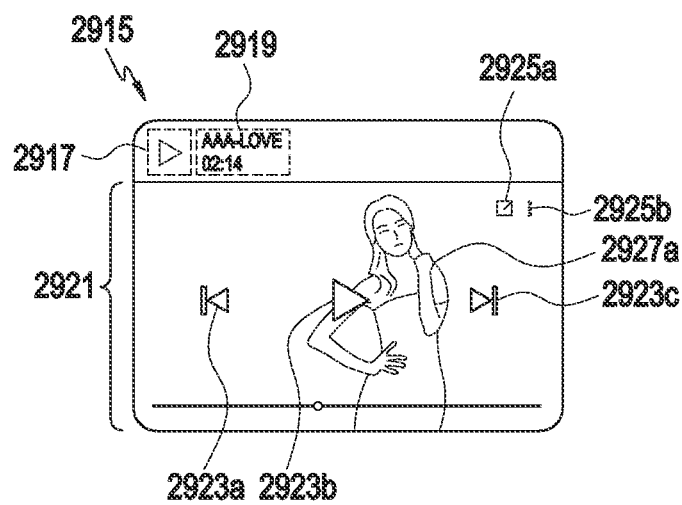
FIG. 29B illustrates a widget of a media playback application according to an embodiment of the disclosure.

FIG. 29B illustrates a widget of a media playback application according to an embodiment of the disclosure.

Referring to FIG. 29B, according to various embodiments, the widget 2915 may be a widget corresponding to a media playback application.

According to various embodiments, the widget 2915 may include an image 2917 (e.g., the icon image 1321*a* of FIG. 13C) representing the application, a menu 2919 (e.g., the menu 1319*b* of FIG. 13C) including additional information, and a widget screen 2921 (e.g., the widget screen 1321*c* of FIG. 13C).

According to various embodiments, the image 2917 representing the application may include an image representing a call application. For example, when media is being played in relation to the call application, an image 2917 representing that the media is being played may be displayed.

According to various embodiments, the menu 2919 including the additional information may display information (e.g., "AAA-LOVE, 02:14") about the media being played. According to various embodiments, when the menu 2919 is selected (e.g., touched), the execution screen (e.g., media playback execution screen) corresponding to the media may be displayed.

According to various embodiments, the widget screen 2921 may include information related to the media being played. For example, the widget screen 2921 may display an image 2927*a* related to the media being played and/or time section information 2927*b* of the media being played. According to various embodiments, the widget screen 2921 may include an object related to the media application. For example, the widget screen 2921 may display an object 2923*a* for playing previous media, an object 2923*b* for pausing the playback of the media being played, and/or an object 2923*c* for playing the next media. According to various embodiments, the widget screen 2921 may include an object related to the widget 2915 and/or corresponding application. For example, the widget screen 2921 may display an object 2925*a* providing the function of sharing the media being played when selected (e.g., touched). For example, the widget screen 2921 may display an object 2925*b* providing the function (e.g., function of hiding the display of the widget) of the widget when selected (e.g., touched).

Figure 30A:
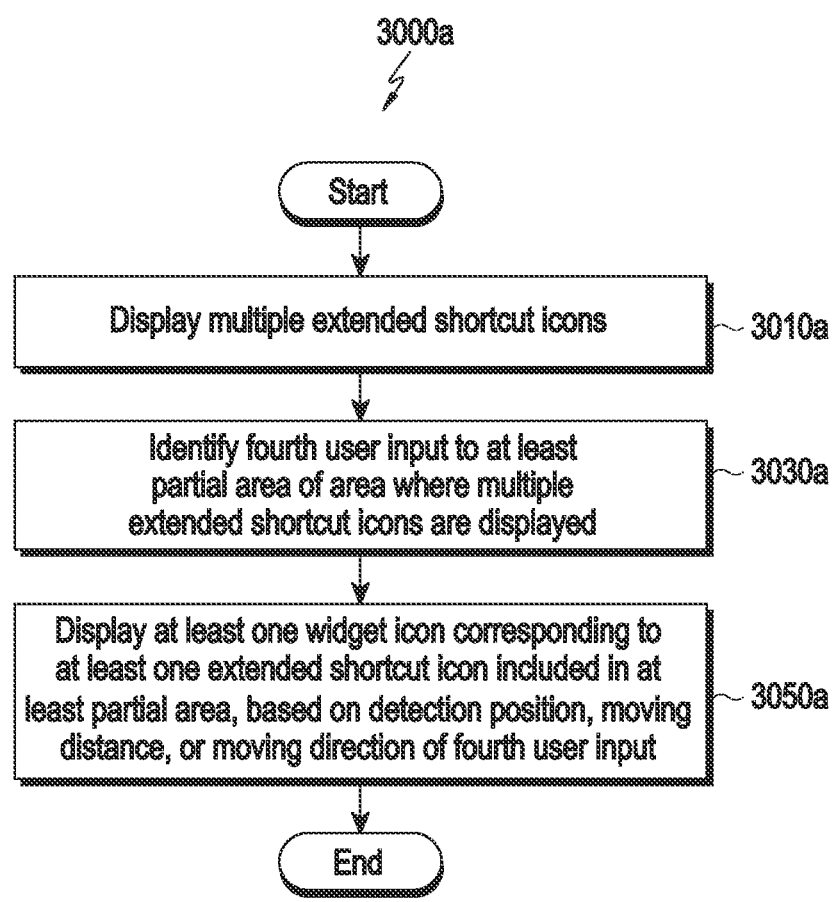
FIG. 30A is a flowchart illustrating an operation of displaying a widget by an electronic device according to an embodiment of the disclosure.

FIG. 30A is a flowchart 3000*a* illustrating an operation for displaying a widget by an electronic device according to an embodiment of the disclosure.

Referring to FIG. 30A, according to various embodiments, in operation 3010*a*, the electronic device (e.g., the electronic device 101 of FIG. 1A) may display a plurality of extended shortcut icons (e.g., the extended shortcut icon 1503 of FIG. 15A). According to various embodiments, the flexible display (e.g., the flexible display 112 of FIG. 1A) may be in a state (e.g., open state) in which the second portion or third portion is exposed to the outside.

According to various embodiments, in operation 3030*a*, the electronic device (e.g., the electronic device 101 of FIG. 1A) may identify a fourth user input on at least a partial area of the area where the plurality of extended shortcut icons (e.g., the extended shortcut icon 1503 of FIG. 15A) are displayed. For example, the fourth user input may be a pinch-zoom-in gesture on a partial area of the area where the plurality of extended shortcut icons (e.g., the extended shortcut icon 1503 of FIG. 15A) are displayed.

According to various embodiments, in operation 3050*a*, the electronic device (e.g., the electronic device 101 of FIG. 1A) may display at least one widget corresponding to at least one extended shortcut icon included in at least a partial area based on the detection position, moving distance, or moving direction of the fourth user input. According to various embodiments, the electronic device (e.g., the electronic device 101 of FIG. 1A) may identify at least a partial area of the area where the plurality of extended shortcut icons (e.g., the extended shortcut icon 1503 of FIG. 15A) are displayed, based on the detection position, moving distance, or moving direction of the fourth user input. According to various embodiments, the electronic device (e.g., the electronic device 101 of FIG. 1A) may identify at least one extended shortcut icon included in the at least partial area identified. According to various embodiments, the electronic device (e.g., the electronic device 101 of FIG. 1A) may determine the display position and/or array based on the detection position, moving distance, or moving direction of the fourth user input and display at least one extended shortcut icon in the determined display position and/or array.

Figure 30B:
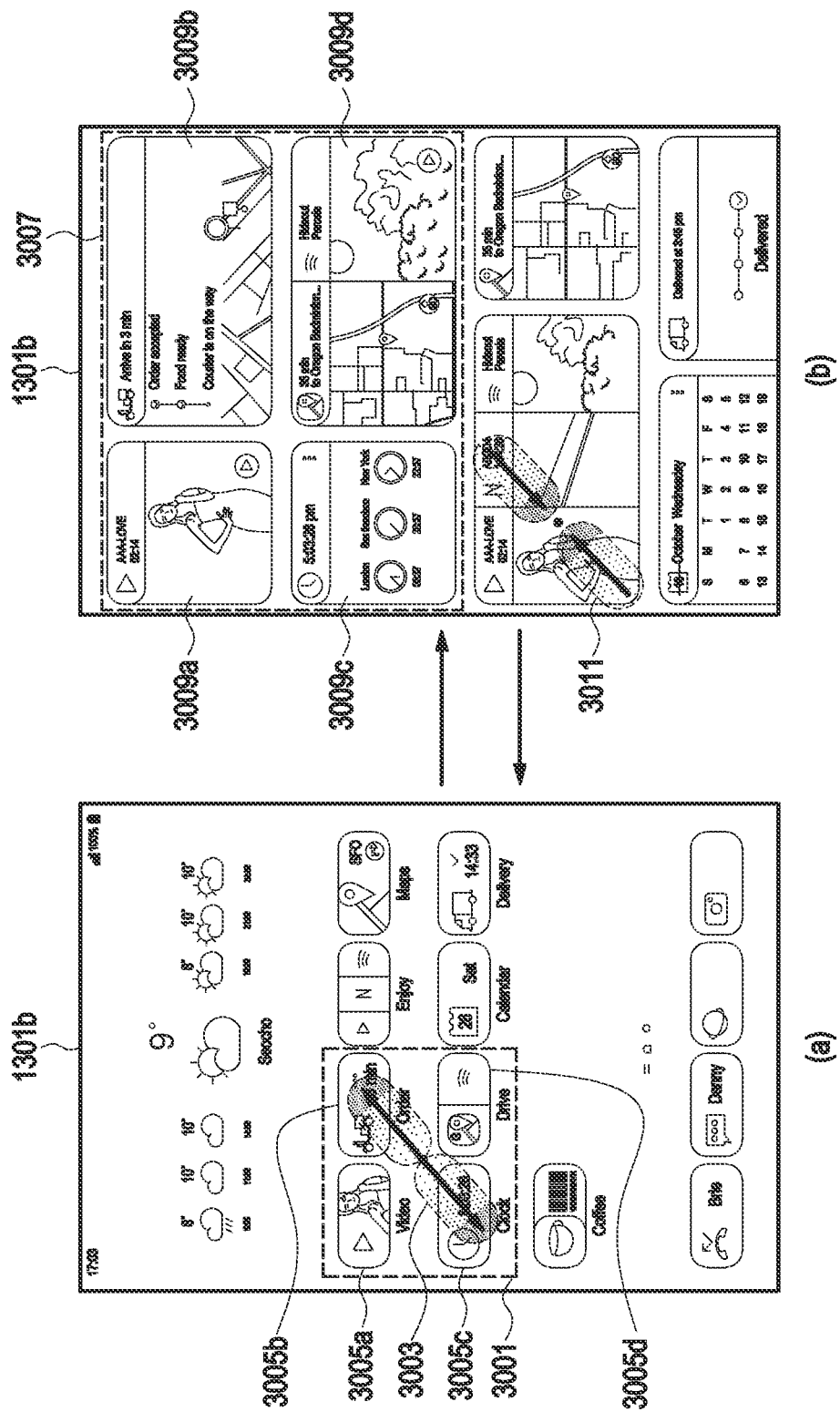
FIG. 30B illustrates a method of displaying a widget by an electronic device according to an embodiment of the disclosure.

FIG. 30B illustrates a method of displaying a widget by an electronic device according to an embodiment of the disclosure. The parts overlapping the description of part (b) of FIG. 13B or part (b) of FIG. 27B described above are omitted.

Referring to part (a) of FIG. 30B, it illustrates a home screen displayed in the display area 1301*b* of the flexible display (e.g., the flexible display 112 of FIG. 1A) in the exposed state (e.g., first open state) of the second portion of the flexible display (e.g., the flexible display 112 of FIG. 1A). According to various embodiments, at least one widget 1303*b* and/or at least one extended shortcut icon 1305*b* may be displayed on the display area 1301*b*. According to various embodiments, if a fourth user input (e.g., the pinch-zoom-in gesture 3003) on at least a partial area 3001 of the area where at least one extended shortcut icon 1305*b* is displayed is identified, at least one extended shortcut icon 3005*a*, 3005*b*, 3005*c*, and 3005*d* included in the at least a partial area 3001 may be identified.

Referring to part (b) of FIG. 30B, at least one widget 3009*a*, 3009*b*, 3009*c*, and 3009*d* corresponding to the identified at least one extended shortcut icon 3005*a*, 3005*b*, 3005*c*, and 3005*d* may be displayed. According to various embodiments, the at least one widget 3009*a*, 3009*b*, 3009*c*, and 3009*d* may be displayed to correspond to the array and/or positions of at least one extended shortcut icon 3005*a*, 3005*b*, 3005*c*, and 3005*d* included in at least a partial area 3001. For example, the widgets 3009*a*, 3009*b*, 3009*c*, and 3009*d* may be displayed in a 2×2 layout, corresponding to the 2×2 layout of the extended shortcut icons 3005*a*, 3005*b*, 3005*c*, and 3005*d* displayed in at least a partial area 3001. For example, since the extended shortcut icons 3005*a*, 3005*b*, 3005*c*, and 3005*d* displayed in at least a partial area 3001 are displayed on the highest side among the extended shortcut icons 1305*b* displayed on the home screen, the widgets 3009*a*, 3009*b*, 3009*c*, and 3009*d* may accordingly be displayed on an upper side of the display area 1301*b*.

Figure 31A:
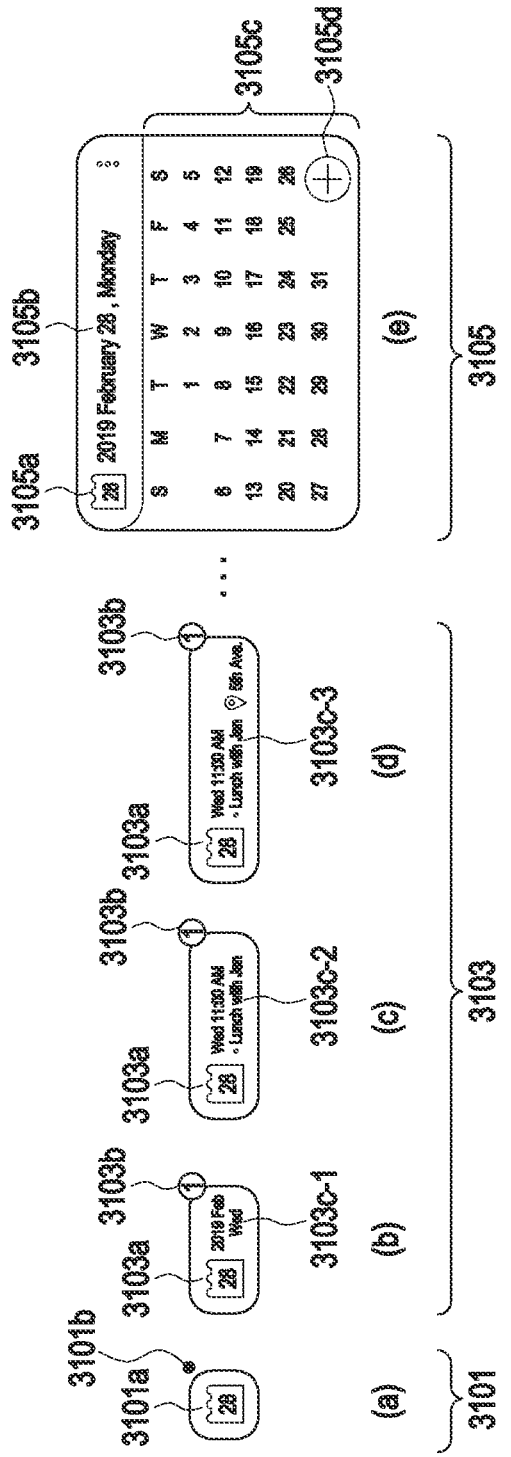
FIG. 31A illustrates a shortcut icon, an extended shortcut icon, and a widget of a calendar application according to an embodiment of the disclosure.

FIG. 31A illustrates a shortcut icon, an extended shortcut icon, and a widget of a calendar application according to an embodiment of the disclosure.

Referring to part (a) of FIG. 31A, it illustrates a shortcut icon 3101 of a calendar application. According to various embodiments, the shortcut icon 3101 may include an image 3101*a* representing the calendar application and/or an indicator 3101*b*. According to various embodiments, the image 3101*a* may display information about the current date. According to various embodiments, the indicator 3101*b* may indicate that there is a registered schedule corresponding to the current date. According to various embodiments, if the shortcut icon 3101 is selected, the calendar application may be executed.

Referring to part s (b), (c) and (d) of FIG. 31A show an extended shortcut icon 3103 of the calendar application. According to various embodiments, the extended shortcut icon 3103 may include an image 3103a representing the calendar application and/or an indicator 3103b. According to various embodiments, the image 3103a may correspond to the image 3103a of the shortcut icon 3101. According to various embodiments, the indicator 3103b may indicate that there is a registered schedule for today. According to various embodiments, the indicator 3103b may provide more detailed information than the indicator 3101b of the shortcut icon 3101. For example, the indicator 3103b may indicate the number of schedules (e.g., "1") registered for today. According to various embodiments, the extended shortcut icon 3103 may further include menus 3103c-1, 3103c-2, and 3103c-3. According to various embodiments, the size of the area where the menus 3103c-1, 3103c-2, and 3103c-3 are displayed may correspond to the size of the extended shortcut icon. According to various embodiments, the menus 3103c-1, 3103c-2, and 3103c-3 may provide different information corresponding to the size of the extended shortcut icon. For example, referring to part (b) of FIG. 31A, the menu 3103c-1 may provide information about the schedule registered for today (or regarding today), year (e.g., "2019"), month (e.g., "Feb") and/or day (e.g., "Mon"). For example, referring to (c) of FIG. 31A, the menu 3103c-2 may include information about the day (e.g., "Mon"), time (e.g., "11:00 AM") and/or note (e.g., "Lunch with Jen"), regarding the schedule registered for today. For example, referring to (d) of FIG. 31A, the menu 3103c-3 may include information about the day (e.g., "Mon"), time (e.g., "11:00 AM"), note (e.g., "Lunch with Jen"), and/or place (e.g., 5th Ave.) regarding the schedule registered for today. According to various embodiments, the above-described menus 3103c-1, 3103c-2, and 3103c-3 may be selectable by the user. For example, if the menus 3103c-1, 3103c-2, and 3103c-3 are selected (e.g., touched) by the user, the execution screen of the calendar application corresponding to the registered schedule displayed through the menus 3103c-1, 3103c-2, and 3103c-3 may be displayed.

Referring to part (e) of FIG. 31A illustrates a widget 3105 of the calendar application. According to various embodiments, the widget 3105 may include an image 3105a representing the calendar application, a menu 3105b, and a widget screen 3105c. According to various embodiments, the image 3105a may correspond to the image 3101a of the shortcut icon 3101 and/or the image 3103a of the extended shortcut icon 3103. According to various embodiments, the menu 3105b may include information about the year (e.g., "2019"), month (e.g., "February"), date (e.g., "28"), and/or day (e.g., "Monday"), regarding the schedule registered for today (or regarding today). According to various embodiments, the widget screen 3105c may include detailed information (e.g., a calendar) about the month (e.g., "February") including the current date. According to various embodiments, the widget screen 3105c may further include an object 3105d for registering a schedule. According to various embodiments, the menu 3015b and/or widget screen 3105c may be selectable by the user. For example, if the menu 3015b and/or widget screen 3105c is selected (e.g., touched) by the user, a specific execution screen of the calendar application may be displayed.

Figure 31B:
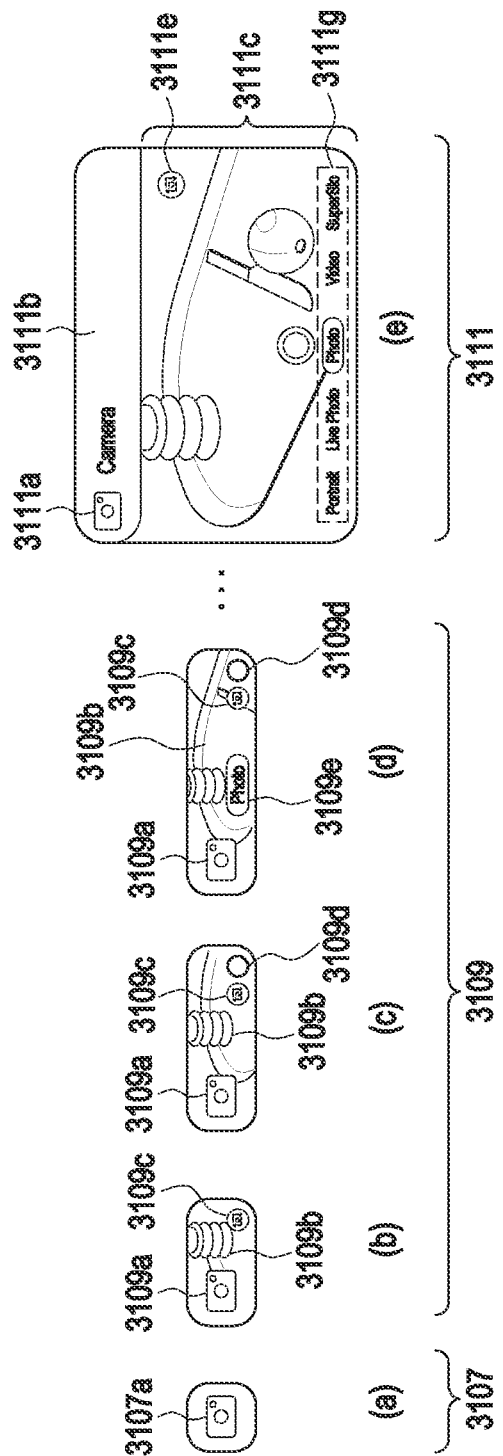
FIG. 31B illustrates a shortcut icon, an extended shortcut icon, and a widget of a camera application according to an embodiment of the disclosure.

FIG. 31B illustrates a shortcut icon, an extended shortcut icon, and a widget of a camera application according to an embodiment of the disclosure.

Referring to part (a) of FIG. 31B, it illustrates a shortcut icon 3107 of a camera application. According to various embodiments, the shortcut icon 3107 may include an image 3107a representing the camera application. According to various embodiments, if the shortcut icon 3107 is selected, the camera application may be executed.

Referring to parts (b), (c) and (d) of FIG. 31B show an extended shortcut icon 3109 of the camera application. According to various embodiments, the extended shortcut icon 3109 may include an image 3109a representing the camera application, a preview image 3109b, and/or an object 3109c related to the function of the camera application. According to various embodiments, the image 3109a may correspond to the image 3107a of the shortcut icon 3101. According to various embodiments, the preview image 3109b may be a preview image corresponding to the image being captured through the camera application. According to various embodiments, if the shortcut icon 3107 of the camera application is changed into an extended shortcut icon 3109 and displayed, the camera module (e.g., the camera module 115 or 135 of FIG. 1A) may be activated to execute the capturing function. According to various embodiments, the extended shortcut icon 3109 may provide different information and/or functions corresponding to the size of the extended shortcut icon 3109. According to various embodiments, the image obtained through the camera module (e.g., the camera module 115 or 135 of FIG. 1A) may be displayed, as the preview image 3109b, through the extended shortcut icon 3109. According to various embodiments, the object 3109c related to the function of the camera application may provide the function of switching the capture mode of the camera application. For example, if the object 3109c is selected (e.g., touched) by the user, a switch may be performed between the capture mode through the front camera of the electronic device (e.g., the electronic device 101 of FIG. 1A) and the capture mode through the rear camera of the electronic device (e.g., the electronic device 101 of FIG. 1A). Referring to parts (c) and (d) of FIG. 31B, the extended shortcut icon 3109 may further include an object 3109d related to another function of the camera application. According to various embodiments, the object 3109d may provide a capture function of the camera application. For example, if the object 3109d is selected (e.g., touched) by the user, the captured image corresponding to the preview image 3109b may be captured. Referring to parts (c) and (d) of FIG. 31B, the extended shortcut icon 3109 may further include an object 3109e related to another function of the camera application. According to various embodiments, the object 3109e may provide, e.g., a function of changing the capture mode of the camera application. For example, if the object 3109e is selected (e.g., touched) by the user, a switch may be performed between photo capture mode and video capture mode.

Referring to part (e) of FIG. 31B illustrates a widget 3111 of the camera application. According to various embodiments, the widget 3111 may include an image 3111a representing the camera application, a menu 3111b, and/or a widget screen 3111c. According to various embodiments, the image 3111a may correspond to the image 3107a of the shortcut icon 3107 and/or the image 3109a of the extended shortcut icon 3109. According to various embodiments, the menu 3111b may include the name (e.g., "Camera") of the corresponding application. According to various embodiments, the widget screen 3111c may include a preview image 3111*d* and/or at least one object 3111*e*, 3111*f*, and 3111*g* related to the camera application. According to various embodiments, the preview image 3111*d* may correspond to the preview image 3109*b* of the extended shortcut icon 3109. According to various embodiments, the object 3111*e* may correspond to the object 3109*c* of the extended shortcut icon 3109. According to various embodiments, the at least one object 3111*g* may correspond to the object 3109*e* of the extended shortcut icon 3109. For example, if any one (e.g., "Video") among at least one object 3111*g* is selected (e.g., touched), a switch to the corresponding capture mode (e.g., video capture mode) may occur.

Figure 31C:
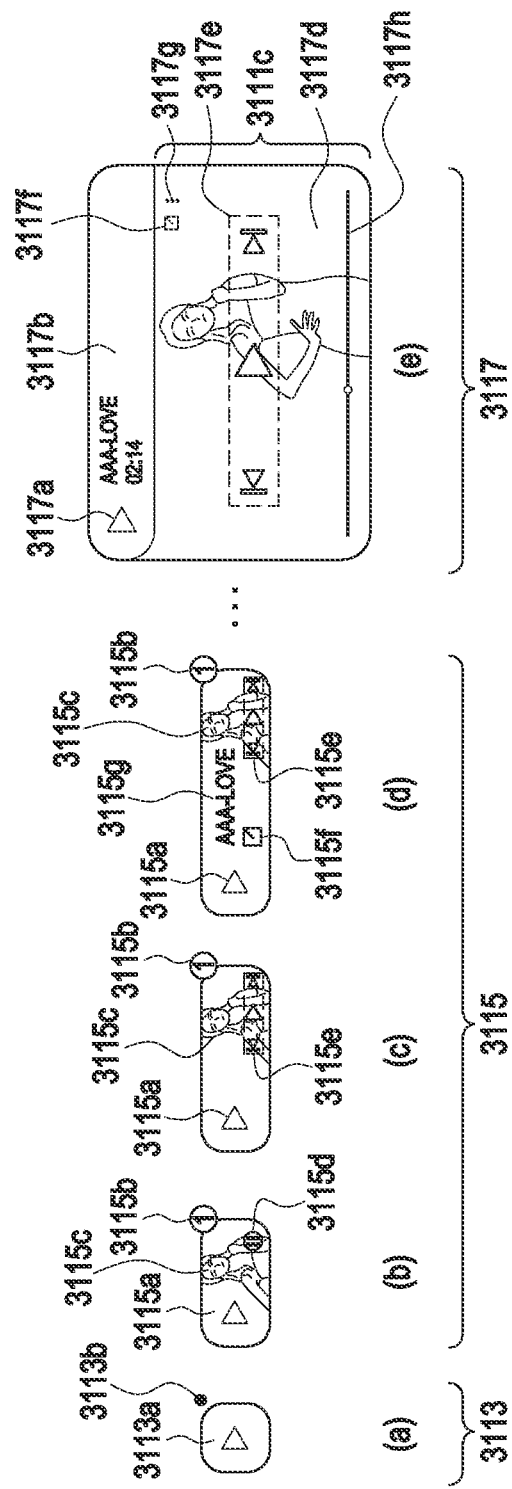
FIG. 31C illustrates a shortcut icon, an extended shortcut icon, and a widget of a media playback application according to an embodiment of the disclosure.

FIG. 31C illustrates a shortcut icon, an extended shortcut icon, and a widget of a media playback application according to an embodiment of the disclosure.

Referring to part (a) of FIG. 31C illustrates a shortcut icon 3113 of the media application. According to various embodiments, the shortcut icon 3113 may include an image 3113*a* representing the media playback application and/or an indicator 3113*b*. According to various embodiments, the indicator 3113*b* may indicate that media (e.g., music or video) is being played through the media playback application. According to various embodiments, if the shortcut icon 3113 is selected, the media playback application may be executed.

Referring to parts (b), (c) and (d) of FIG. 31C show an extended shortcut icon 3115 of the media playback application. According to various embodiments, the extended shortcut icon 3115 may include an image 3115*a* representing the media playback application and/or an indicator 3115*b*. According to various embodiments, the image 3115*a* may correspond to the image 3113*a* of the shortcut icon 3113. According to various embodiments, the indicator 3115*b* may indicate that media (e.g., music or video) is being played through the media playback application. According to various embodiments, the indicator 3115*b* may indicate the number (e.g., "1") of at least one media (e.g., at least one media included in the playlist) being played. According to various embodiments, the extended shortcut icon 3115 may provide different information and/or functions corresponding to the size of the extended shortcut icon 3115. According to various embodiments, the extended shortcut icon 3115 may include an image 3115*c* (e.g., thumbnail image) representing the media being played. According to various embodiments, the extended shortcut icon 3115 may include at least one menu 3115*d* and 3115*e* providing the function of the media playback application. According to various embodiments, if the menu 3115*d* or 3115*e* is selected (e.g., touched), the corresponding function of the media playback application may be executed. According to various embodiments, the menu 3115*d* may provide a media playback start function and/or a pause function through the media application. According to various embodiments, the menu 3115*d* may indicate the current state (e.g., playing the media or not playing the media) of the media playback application. According to various embodiments, the at least one menu 3115*e* may provide the previous media playback function, playback start function, or pause function, and/or next media playback function. Referring to part (d) of FIG. 31C, according to various embodiments, the extended shortcut icon 3115 may include a menu 3115*f* providing the function of the extended shortcut icon 3115. According to various embodiments, the menu 3115*f* may provide the function of sharing the selected (e.g., played) media to the external electronic device.

Referring to part (e) of FIG. 31C illustrates the widget 3117 of the media playback application. According to various embodiments, the widget 3117 may include an image 3117*a* representing the media playback application, a menu 3117*b*, and/or a widget screen 3117*c*. According to various embodiments, the image 3117*a* may correspond to the image 3113*a* of the shortcut icon 3113 and/or the image 3115*a* of the extended shortcut icon 3115. According to various embodiments, the menu 3117*b* may include information (e.g., "Odesza-Loyal (Official M/V)") about the media being played through the media playback application. According to various embodiments, the widget screen 3117*c* may include an image 3117*d* (e.g., thumbnail image) representing media being played, information about the media playback application and/or at least one menu 3117*e* and 3117*h* providing the information and/or function of the media playback application, and/or at least one menu 3117*f* and 3117*g* providing the function of the widget 3117. According to various embodiments, the at least one menu 3117*e* may correspond to at least one menu 3115*e*. For example, the at least one menu 3117*e* may provide the previous media playback function, playback start function, or pause function, and/or next media playback function. For example, at least one menu 3117*e* may indicate the current state (e.g., playing the media or not playing the media) of the media playback application. According to various embodiments, the menu 3117*h* may provide the function of adjusting the playback section of the media being played. According to various embodiments, the menu 3117*h* may indicate the playback time of the media being played. According to various embodiments, the menu 3117*f* may provide the function of sharing the selected (e.g., played) media to the external electronic device. According to various embodiments, the menu 3117*g* may provide the function of hiding the display of the widget.

Figure 31D:
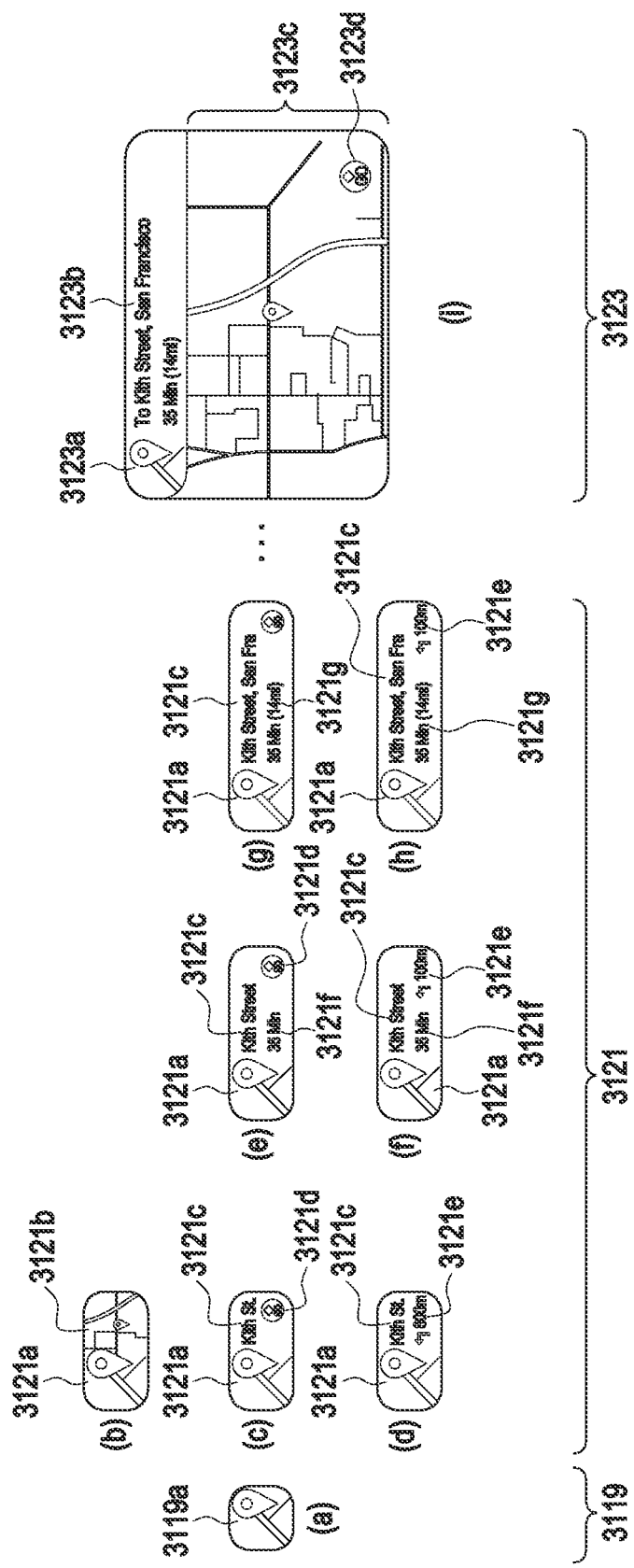
FIG. 31D illustrates a shortcut icon, an extended shortcut icon, and a widget of a map application according to an embodiment of the disclosure.

FIG. 31D illustrates a shortcut icon, an extended shortcut icon, and a widget of a map application according to an embodiment of the disclosure.

Referring to part (a) of FIG. 31D illustrates a shortcut icon 3119 of the map application. According to various embodiments, the shortcut icon 3119 may include an image 3119*a* representing the map application. According to various embodiments, if the shortcut icon 3119 is selected, the map application may be executed.

Referring to parts (b) to (h) of FIG. 31D show an extended shortcut icon 3121 of the map application. According to various embodiments, the extended shortcut icon 3121 may include an image 3121*a* representing the map application. According to various embodiments, the image 3121*a* may correspond to the image 3119*a* of the shortcut icon 3119. The extended shortcut icon 3121 may provide different information and/or functions corresponding to the size of the extended shortcut icon 3121. According to various embodiments, the extended shortcut icon 3121 may provide information about the destination. For example, referring to part (b) of FIG. 31D, the extended shortcut icon 3121 may provide an image (e.g., map image around the destination) regarding the destination. For example, referring to parts (c) to (h) of FIG. 31D, the extended shortcut icon 3121 may provide text 3121*c* (e.g., the name of the destination) regarding the destination. According to various embodiments, the extended shortcut icon 3121 may provide route information regarding the destination from the current location. For example, referring to parts (d) to (h) of FIG. 31D, the extended shortcut icon 3121 may provide information 3121*e* regarding the direction and/or distance of the route and/or estimated required time and/or distance information 3121*f* and 3121*g*. According to various embodiments, the extended shortcut icon 3121 may include a menu 3121*d* providing the function of executing the map application.

Referring to part (i) of FIG. 31D illustrates the widget 3123 of the map application. According to various embodiments, the widget 3123 may include an image 3123a representing the map application, a menu 3123b, and/or a widget screen 3123c. According to various embodiments, the image 3123a may correspond to the image 3119a of the shortcut icon 3119 and/or the image 3121a of the extended shortcut icon 3121. According to various embodiments, the menu 3123b may provide information about the destination (e.g., "Kith Street, San Francisco") and/or route information about the destination (e.g., "35 Min (14 mi)"). According to various embodiments, the widget screen 3123c may provide information regarding the destination and/or route information regarding the destination in the form of an image and/or text. According to various embodiments, the widget screen 3123c may display the menu 3123d of providing the function of the map application. According to various embodiments, if the menu 3123d is selected, the execution screen of the map application may be displayed based on the information regarding the destination and/or the route information regarding the destination.

Figure 31E:
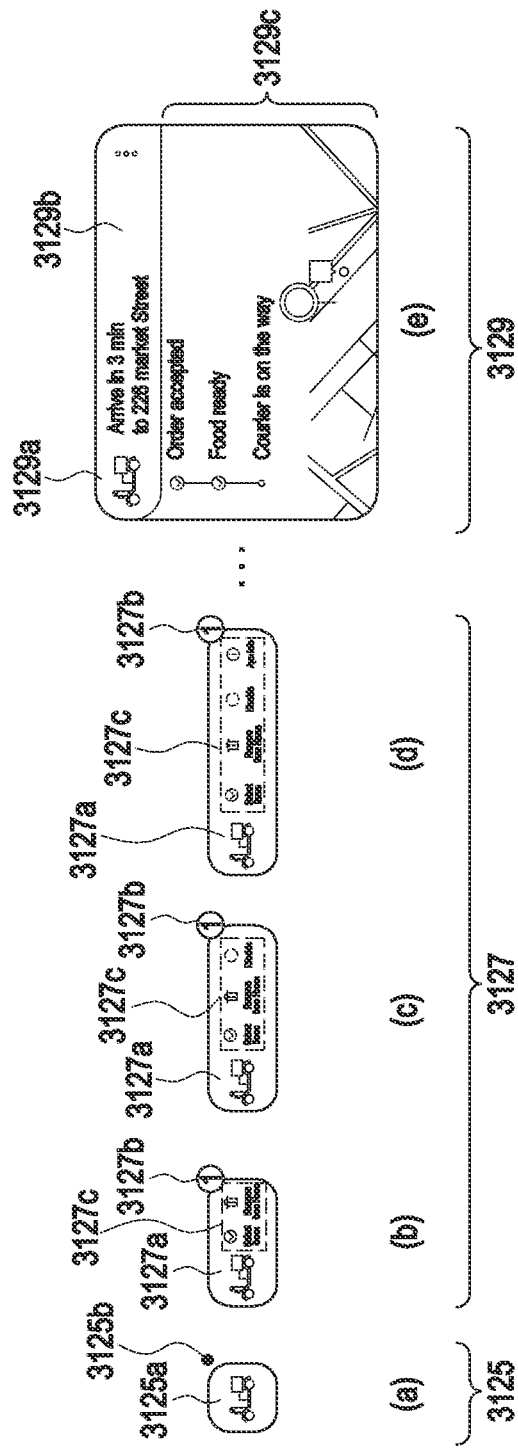
FIG. 31E illustrates a shortcut icon, an extended shortcut icon, and a widget of an order application according to an embodiment of the disclosure.

FIG. 31E illustrates a shortcut icon, an extended shortcut icon, and a widget of an order application according to an embodiment of the disclosure.

Referring to part (a) of FIG. 31E illustrates a shortcut icon 3125 of the order application. According to various embodiments, the shortcut icon 3125 may include an image 3125a representing the order application and/or an indicator 3125b. According to various embodiments, the indicator 3125b may indicate that an event related to the order application occurs. For example, the indicator 3125b may indicate that a change is made to the status of the order (e.g., start of delivery) in relation to the order application. According to various embodiments, if the shortcut icon 3125 is selected, the order application may be executed.

Referring to parts (b) to (d) of FIG. 31E show an extended shortcut icon 3127 of the order application. According to various embodiments, an image 3127a representing the order application and/or an indicator 3127b may be included. According to various embodiments, the image 3127a may correspond to the image 3125a of the shortcut icon 3125. According to various embodiments, the indicator 3127b may indicate that an event related to the order application occurs. For example, the indicator 3125b may indicate that a change is made to the status of the order (e.g., start of delivery) in relation to the order application. According to various embodiments, the indicator 3127b may indicate the number (e.g., "1") of occurring events in relation to the order application. According to various embodiments, with reference to FIG. 25C together, the order application may be an application not supporting the function of displaying the menu of providing the function of the application. According to various embodiments, the extended shortcut icon 3127 may include at least one object 3127c providing the function related to the extended shortcut icon 3127. For example, the extended shortcut icon 3127 may include an object (e.g., "Select items") to provide the function of selecting the extended shortcut icon 3127, an object (e.g., "Remove from Home") to provide the function of removing the extended shortcut icon 3127 from the home screen, an object (e.g., "Disable") to provide the function of deactivating selection of the extended shortcut icon 3127, and/or an object (e.g., "App info") to provide the function of displaying detailed information about the application corresponding to the extended shortcut icon 3127. According to various embodiments, the number of objects 3127c included in the extended shortcut icon 3127 may correspond (e.g., proportional to) the size of the extended shortcut icon 3127.

Referring to part (e) of FIG. 31E illustrates a widget 3129 of the order application. According to various embodiments, the widget 3129 may include an image 3129a representing the order application, a menu 3129b, and/or a widget screen 3129c. According to various embodiments, the image 3129a may correspond to the image 3125a of the shortcut icon 3125 and/or the image 3127a of the extended shortcut icon 3127. According to various embodiments, the menu 3129b may provide real-time information regarding the event occurring in relation to the order application. For example, the menu 3129b may include information (e.g., "276 Market Street") regarding the destination of delivery and/or information (e.g., "3 Min") regarding the remaining estimated time to the destination, in relation to the started delivery. According to various embodiments, the widget screen 3129c may provide detailed information regarding the occurring event in real-time. For example, the widget screen 3129c may include information about the current status of the order or delivery (e.g., "Your Order is accepted", "Food is ready", and/or "Delivering right now"). For example, the widget screen 3129c may include information (e.g., "3 Min") about the estimated time remaining until the delivery arrives at the destination.

Figure 32A:
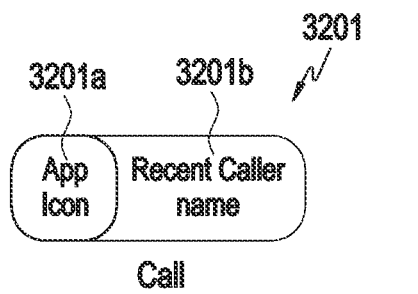
FIG. 32A illustrates an extended shortcut icon of a call application according to an embodiment of the disclosure.

FIG. 32A illustrates an extended shortcut icon of a call application according to an embodiment of the disclosure.

Referring to FIG. 32A, according to various embodiments, the extended shortcut icon 3201 of the call application may include an image 3201a representing the call application and/or at least one menu 3201b providing the information and/or function related to the call application. According to various embodiments, the menu 3201b may include, e.g., the name of the caller of the recent call. The menu 3201b may be a menu providing additional information and/or function based on the user's setting (e.g., when the user sets to expose specific information). According to various embodiments, if the image 3201a or menu 3201b is selected (e.g., touched), the execution screen of the call application may be displayed. For example, if the image 3201a is selected, the execution screen corresponding to the initial state of the call application may be displayed. For example, if the menu 3201b is selected, the execution screen corresponding to the specific state of the call application corresponding to the menu 3201b may be displayed. For example, in a case where the name of the caller of the recent call is being displayed through the menu 3201b, if the menu 3201b is selected, the execution screen of the call application including the details of the recent call corresponding to the name of the caller of the recent call may be displayed. For example, in a case where the name of the caller of the recent call is being displayed through the menu 3201b, if the menu 3201b is selected, a call may be made at the contact corresponding to the name of the caller of the recent call.

Figure 32B:
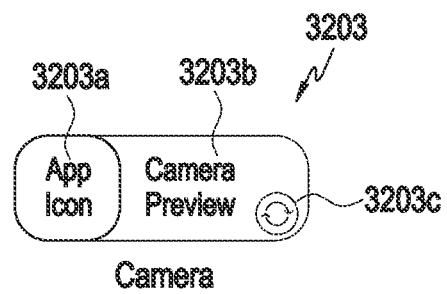
FIG. 32B illustrates an extended shortcut icon of a camera application according to an embodiment of the disclosure.

FIG. 32B illustrates an extended shortcut icon of a camera application according to an embodiment of the disclosure.

Referring to FIG. 32B, according to various embodiments, the extended shortcut icon 3203 of the camera application may include an image 3203a representing the camera application and/or at least one menu 3203b and 3203c providing the information and/or function related to the camera application. According to various embodiments, the menu 3203b may include, e.g., a preview image corresponding to the image being captured through the camera application. The menu 3203b may be a menu providing additional information and/or functions based on an application setting (e.g., when the application is set to provide specific information). According to various embodiments, if the image 3203a or menu 3203b is selected (e.g., touched), the execution screen of the camera application may be displayed. According to various embodiments, if the menu 3203b is selected (e.g., touched), a captured image corresponding to the preview image may be captured. According to various embodiments, the menu 3203c may provide, e.g., a function of switching the capture mode (e.g., the capture mode through the front camera or the capture mode through the rear camera) of the camera application.

Figure 32C:
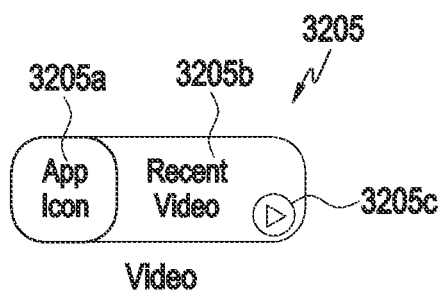
FIG. 32C illustrates an extended shortcut icon of a video playback application according to an embodiment of the disclosure.

FIG. 32C illustrates an extended shortcut icon of a video playback application according to an embodiment of the disclosure.

Referring to FIG. 32C, according to various embodiments, the extended shortcut icon 3205 of the video playback application may include an image 3205a representing the video playback application and/or at least one menu 3205b and 3205c providing the information and/or function related to the video playback application. According to various embodiments, if the image 3205a is selected (e.g., touched), the execution screen corresponding to the initial state of the video playback application may be displayed. According to various embodiments, the menu 3205b may include, e.g., an image (e.g., a thumbnail image) of the video recently played (or video being played) through the video playback application. The menu 3205b may be a menu providing additional information and/or functions based on an application setting (e.g., when the application is set to provide specific information). According to various embodiments, if the menu 3205b is selected (e.g., touched), the execution screen for playing the recently played video (or currently playing video) of the video playback application may be displayed. According to various embodiments, the menu 3205c may provide the video playback start function and/or pause function through the video playback application. According to various embodiments, the menu 3205c may indicate the current state of the video playback application (e.g., playing video or not playing video).

Figure 32D:
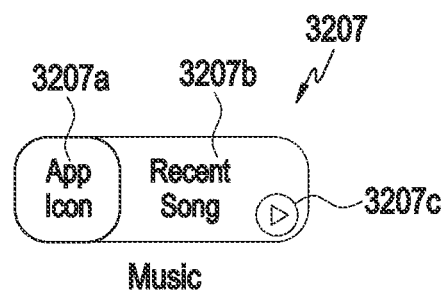
FIG. 32D illustrates an extended shortcut icon of a music playback application according to an embodiment of the disclosure.

FIG. 32D illustrates an extended shortcut icon of a music playback application according to an embodiment of the disclosure.

Referring to FIG. 32D, according to various embodiments, the extended shortcut icon 3207 of the music playback application may include an image 3207a representing the music playback application and/or at least one menu 3207b and 3207c providing the information and/or function related to the music playback application. According to various embodiments, if the image 3207a is selected (e.g., touched), the execution screen corresponding to the initial state of the music playback application may be displayed. According to various embodiments, the menu 3207b may include, e.g., an image (e.g., a thumbnail image) of the music recently played (or music being played) through the music playback application. The menu 3207b may be a menu providing additional information and/or functions based on an application setting (e.g., when the application is set to provide specific information). According to various embodiments, if the menu 3207b is selected (e.g., touched), the execution screen for playing the recently played music (or currently playing music) of the music playback application may be displayed. According to various embodiments, the menu 3207c may provide the music playback start function and/or pause function through the music playback application. According to various embodiments, the menu 3207c may indicate the current state of the music playback application (e.g., playing music or not playing music).

Figure 32E:
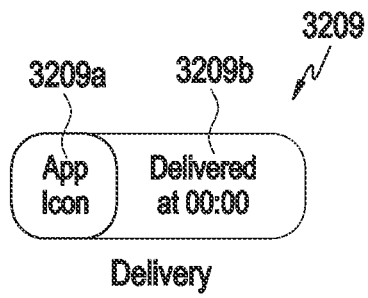
FIG. 32E illustrates an extended shortcut icon of a delivery application according to an embodiment of the disclosure.

FIG. 32E illustrates an extended shortcut icon of a delivery application according to an embodiment of the disclosure.

Referring to FIG. 32E, according to various embodiments, the extended shortcut icon 3209 of the delivery application may include an image 3209a representing the delivery application and/or at least one menu 3209b providing the information and/or function related to the delivery application. According to various embodiments, if the image 3209a is selected (e.g., touched), the execution screen corresponding to the initial state of the delivery application may be displayed. According to various embodiments, the menu 3209b may include information regarding the event related to the delivery application. For example, the menu 3209b may include information regarding the estimated arrival time of the started delivery, in relation to the delivery application. The menu 3209b may be a menu providing additional information and/or functions based on an application setting (e.g., when the application is set to provide specific information). According to various embodiments, if the menu 3209b is selected, the execution screen of the delivery application including detailed information about delivery corresponding to information about the estimated arrival time may be displayed.

Figure 32F:
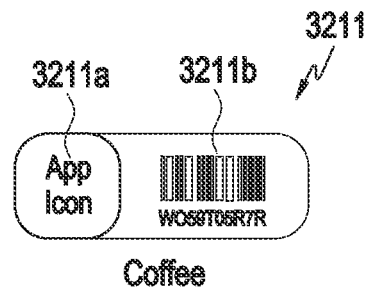
FIG. 32F illustrates an extended shortcut icon of a payment application according to an embodiment of the disclosure.

FIG. 32F illustrates an extended shortcut icon of a payment application according to an embodiment of the disclosure.

Referring to FIG. 32F, according to various embodiments, the extended shortcut icon 3211 of the payment application may include an image 3211a representing the payment application and/or at least one menu 3211b providing the information and/or function related to the payment application. According to various embodiments, if the image 3211a is selected (e.g., touched), the execution screen corresponding to the initial state of the payment application may be displayed. According to various embodiments, the menu 3211b may display, e.g., a barcode registered in the payment application for payment by the payment application. The barcode may be additional information based on the setting of the application (e.g., when the application is set to provide specific information). According to various embodiments, if the menu 3211b is selected (e.g., touched), e.g., the execution screen of the payment application including the barcode may be displayed. For example, the barcode included on the execution screen may be larger than the barcode displayed through the menu 3211b. According to various embodiments, if a user gesture (e.g., a swipe gesture to the right) on the menu 3211b is identified, the barcode displayed through the menu 3211b may be changed to another barcode registered in the payment application. According to various embodiments, an image (e.g., barcode) displayed on the menu 3211b may be changed. For example, the electronic device (e.g., the electronic device 101 of FIG. 1A) may identify the location of the electronic device in a state in which the barcode is displayed through the menu 3211b and, when the identified location is related to a place (e.g., a store) set to display specific information (e.g., coupon information about the surrounding stores) (e.g., when located around), the electronic device 101 may display the specific information (e.g., coupon information about the surrounding stores) through the menu 3211b instead of the barcode. For example, the specific information (e.g., the coupon information about the surrounding stores) may be additional information based on use-related information (e.g., the user's current location, current time, and/or manner in which the user uses the application). Or, the electronic device (e.g., the electronic device 101 of FIG. 1A) may identify the location of the electronic device in a state in which the menu 3211b is not displayed (e.g., in a state in which a shortcut icon, not extended shortcut icon, of the payment application is displayed) and, when the identified location is related to a place (e.g., a store) set to display specific information (e.g., coupon information about the surrounding stores) (e.g., when located around), the electronic device 101 may display the menu 3211b (e.g., change the shortcut icon of the payment application into an extended shortcut icon) and display the specific information (e.g., the coupon information about the surrounding stores) through the menu 3211b.

Figure 33:
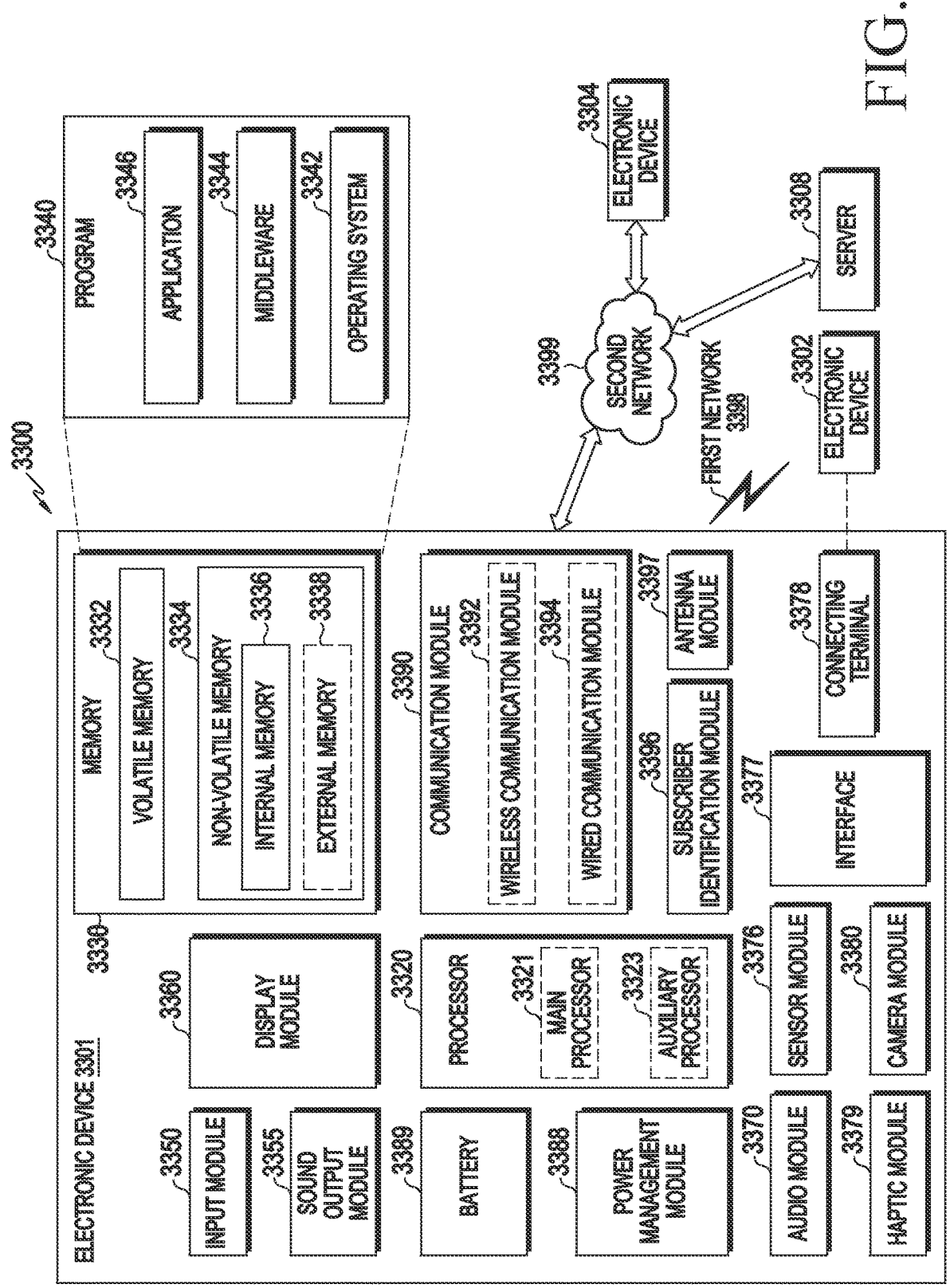
FIG. 33 is a view illustrating an electronic device in a network environment according to an embodiment of the disclosure.

FIG. 33 is a block diagram illustrating an electronic device in a network environment according to an embodiment of the disclosure.

Referring to FIG. 33, an electronic device in a network environment 3300 may communicate with an external electronic device 3302 via a first network 3398 (e.g., a short-range wireless communication network), or an external electronic device 3304 or a server 3308 via a second network 3399 (e.g., a long-range wireless communication network). According to an embodiment of the disclosure, the electronic device 3301 may communicate with the external electronic device 3304 via the server 3308. According to an embodiment of the disclosure, the electronic device 3301 may include a processor 3320, a memory 3330, an input module 3350, a sound output module 3355, a display module 3360, an audio module 3370, a sensor module 3376, an interface 3377, a connecting terminal 3378, a haptic module 3379, a camera module 3380, a power management module 3388, a battery 3389, a communication module 3390, a subscriber identification module (SIM) 3396, or an antenna module 3397. In some embodiments, at least one (e.g., the connecting terminal 3378) of the components may be omitted from the electronic device 3301, or one or more other components may be added in the electronic device 101. According to an embodiment of the disclosure, some (e.g., the sensor module 3376, the camera module 3380, or the antenna module 3397) of the components may be integrated into a single component (e.g., the display module 3360).

The processor 3320 may execute, for example, software (e.g., a program 3340) to control at least one other component (e.g., a hardware or software component) of the electronic device 3301 coupled with the processor 3320, and may perform various data processing or computation. According to one embodiment of the disclosure, as at least part of the data processing or computation, the processor 3320 may store a command or data received from another component (e.g., the sensor module 3376 or the communication module 3390) in volatile memory 3332, process the command or the data stored in the volatile memory 3332, and store resulting data in non-volatile memory 3334. According to an embodiment of the disclosure, the processor 3320 may include a main processor 3321 (e.g., a central processing unit (CPU) or an application processor (AP)), or an auxiliary processor 3323 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 3301 includes the main processor 3321 and the auxiliary processor 3323, the auxiliary processor 3323 may be configured to use lower power than the main processor 3321 or to be specified for a designated function. The auxiliary processor 3323 may be implemented as separate from, or as part of the main processor 3321.

The auxiliary processor 3323 may control at least some of functions or states related to at least one component (e.g., the display module 3360, the sensor module 3376, or the communication module 3390) among the components of the electronic device 3301, instead of the main processor 3321 while the main processor 3321 is in an inactive (e.g., sleep) state, or together with the main processor 3321 while the main processor 3321 is in an active state (e.g., executing an application). According to an embodiment of the disclosure, the auxiliary processor 3323 (e.g., an image signal processor or a communication processor) may be implemented as part of another component (e.g., the camera module 3380 or the communication module 3390) functionally related to the auxiliary processor 3323. According to an embodiment of the disclosure, the auxiliary processor 3323 (e.g., the neural processing unit) may include a hardware structure specified for artificial intelligence model processing. The artificial intelligence model may be generated via machine learning. Such learning may be performed, e.g., by the electronic device 3301 where the artificial intelligence is performed or via a separate server (e.g., the server 3308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 3330 may store various data used by at least one component (e.g., the processor 3320 or the sensor module 3376) of the electronic device 3301. The various data may include, for example, software (e.g., the program 3340) and input data or output data for a command related thereto. The memory 3330 may include the volatile memory 3332 or the non-volatile memory 3334.

The program 3340 may be stored in the memory 3330 as software, and may include, for example, an operating system (OS) 3342, middleware 3344, or an application 3346.

The input module 3350 may receive a command or data to be used by other component (e.g., the processor 3320) of the electronic device 3301, from the outside (e.g., a user) of the electronic device 3301. The input module 3350 may include, for example, a microphone, a mouse, a keyboard, keys (e.g., buttons), or a digital pen (e.g., a stylus pen).

The sound output module 3355 may output sound signals to the outside of the electronic device 3301. The sound output module 3355 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 3360 may visually provide information to the outside (e.g., a user) of the electronic device 3301. The display 3360 may include, for example, a display, a hologram device, or a projector and control circuitry to control a corresponding one of the display, hologram device, and projector. According to an embodiment of the disclosure, the display 3360 may include a touch sensor configured to detect a touch, or a pressure sensor configured to measure the intensity of a force generated by the touch.

The audio module 3370 may convert a sound into an electrical signal and vice versa. According to an embodiment of the disclosure, the audio module 3370 may obtain the sound via the input module 3350, or output the sound via the sound output module 3355 or a headphone of an external electronic device (e.g., the external electronic device 3302) directly (e.g., wiredly) or wirelessly coupled with the electronic device 3301.

The sensor module 3376 may detect an operational state (e.g., power or temperature) of the electronic device 3301 or an environmental state (e.g., a state of a user) external to the electronic device 3301, and then generate an electrical signal or data value corresponding to the detected state. According to an embodiment of the disclosure, the sensor module 3376 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 3377 may support one or more specified protocols to be used for the electronic device 3301 to be coupled with the external electronic device (e.g., the external electronic device 3302) directly (e.g., wiredly) or wirelessly. According to an embodiment of the disclosure, the interface 3377 may include, for example, a high definition multimedia interface (HDMI), a universal serial bus (USB) interface, a secure digital (SD) card interface, or an audio interface.

A connecting terminal 3378 may include a connector via which the electronic device 3301 may be physically connected with the external electronic device (e.g., the external electronic device 3302). According to an embodiment of the disclosure, the connecting terminal 3378 may include, for example, a HDMI connector, a USB connector, a SD card connector, or an audio connector (e.g., a headphone connector).

The haptic module 3379 may convert an electrical signal into a mechanical stimulus (e.g., a vibration or motion) or electrical stimulus which may be recognized by a user via his tactile sensation or kinesthetic sensation. According to an embodiment of the disclosure, the haptic module 3379 may include, for example, a motor, a piezoelectric element, or an electric stimulator.

The camera module 3380 may capture a still image or moving images. According to an embodiment of the disclosure, the camera module 3380 may include one or more lenses, image sensors, image signal processors, or flashes.

The power management module 3388 may manage power supplied to the electronic device 3301. According to one embodiment of the disclosure, the power management module 3388 may be implemented as at least part of, for example, a power management integrated circuit (PMIC).

The battery 3389 may supply power to at least one component of the electronic device 3301. According to an embodiment of the disclosure, the battery 3389 may include, for example, a primary cell which is not rechargeable, a secondary cell which is rechargeable, or a fuel cell.

The communication module 3390 may support establishing a direct (e.g., wired) communication channel or a wireless communication channel between the electronic device 3301 and the external electronic device (e.g., the external electronic device 3302, the external electronic device 3304, or the server 3308) and performing communication via the established communication channel. The communication module 3390 may include one or more communication processors that are operable independently from the processor 3320 (e.g., the application processor (AP)) and supports a direct (e.g., wired) communication or a wireless communication. According to an embodiment of the disclosure, the communication module 3390 may include a wireless communication module 3392 (e.g., a cellular communication module, a short-range wireless communication module, or a global navigation satellite system (GNSS) communication module) or a wired communication module 3394 (e.g., a local area network (LAN) communication module or a power line communication (PLC) module). A corresponding one of these communication modules may communicate with the external electronic device 3304 via a first network 3398 (e.g., a short-range communication network, such as Bluetooth™ wireless-fidelity (Wi-Fi) direct, or infrared data association (IrDA)) or a second network 3399 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 3392 may identify or authenticate the electronic device 3301 in a communication network, such as the first network 3398 or the second network 3399, using subscriber information (e.g., international mobile subscriber identity (IMSI)) stored in the subscriber identification module 3396.

The wireless communication module 3392 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 3392 may support a high-frequency band (e.g., the millimeter wave (mmWave) band) to achieve, e.g., a high data transmission rate. The wireless communication module 3392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 3392 may support various requirements specified in the electronic device 3301, an external electronic device (e.g., the external electronic device 3304), or a network system (e.g., the second network 3399). According to an embodiment of the disclosure, the wireless communication module 3392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 3397 may transmit or receive a signal or power to or from the outside (e.g., the external electronic device). According to an embodiment of the disclosure, the antenna module 3397 may include one antenna including a radiator formed of a conductor or conductive pattern formed on a substrate (e.g., a printed circuit board (PCB)). According to an embodiment of the disclosure, the antenna module 3397 may include a plurality of antennas (e.g., an antenna array). In this case, at least one antenna appropriate for a communication scheme used in a communication network, such as the first network 3398 or the second network 3399, may be selected from the plurality of antennas by, e.g., the communication module 3390. The signal or the power may then be transmitted or received between the communication module 3390 and the external electronic device via the selected at least one antenna. According to an embodiment of the disclosure, other parts (e.g., radio frequency integrated circuit (RFIC)) than the radiator may be further formed as part of the antenna module 3397.

According to various embodiments of the disclosure, the antenna module 3397 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 3301 and the external electronic device 3304 via the server 3308 coupled with the second network 3399. The external electronic devices 3302 or 3304 each may be a device of the same or a different type from the electronic device 3301. According to an embodiment of the disclosure, all or some of operations to be executed at the electronic device 3301 may be executed at one or more of the external electronic devices 3302, 3304, or 3308. For example, if the electronic device 3301 should perform a function or a service automatically, or in response to a request from a user or another device, the electronic device 3301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 3301. The electronic device 3301 may provide the outcome, with or without further processing of the outcome, as at least part of a reply to the request. To that end, a cloud computing, distributed computing, mobile edge computing (MEC), or client-server computing technology may be used, for example. The electronic device 3301 may provide ultra low-latency services using, e.g., distributed computing or mobile edge computing. In another embodiment of the disclosure, the external electronic device 3304 may include an Internet-of-things (IoT) device. The server 3308 may be an intelligent server using machine learning and/or a neural network. According to an embodiment of the disclosure, the external electronic device 3304 or the server 3308 may be included in the second network 3399. The electronic device 3301 may be applied to intelligent services (e.g., smart home, smart city, smart car, or healthcare) based on 5G communication technology or IoT-related technology.

According to various embodiments, an electronic device may comprise a flexible display; and at least one processor. The flexible display may be at least partially exposed to an outside through a housing of the electronic device and slidable through the housing. The at least one processor may be disposed in the housing. The at least one processor may be configured to display a first shortcut icon for executing a first application on the flexible display in a state in which a first portion of the flexible display of the electronic device is exposed to the outside, detect a first input to expose a second portion including the first portion of the flexible display to the outside, and display the first shortcut icon, as a first extended shortcut icon, on the second portion when a size of the second portion is a first threshold size or more, based on the first input. The first extended shortcut icon may include at least one menu for executing at least one designated function of the first application. The first input may be referred to a first sliding input.

According to various embodiments, the first extended shortcut icon may be configured to display a predesignated number of menus based on a size of the first extended shortcut icon.

According to various embodiments, the at least one processor may be configured to identify priorities for a plurality of menus for executing a plurality of designated functions of the first application, identify the at least one menu smaller than, or equal to, in number, the predesignated number among the plurality of menus, based on the priorities, and display the first extended shortcut icon including the at least one menu.

According to various embodiments, the at least one processor may be configured to, when the number of the plurality of menus exceeds the predesignated number, alternatively display the plurality of menus every predetermined time by the predesignated number, based on the priorities.

According to various embodiments, the at least one processor may be further configured to identify an occurrence of a first event related to a first menu among the plurality of menus and display the at least one menu including the first menu.

According to various embodiments, the at least one processor may be further configured to display information regarding the first event through the first menu.

According to various embodiments, the at least one processor may be further configured to, after the first event occurs, identify an occurrence of a second event related to the first menu and display information regarding the second event through the first menu, based on identifying the occurrence of the second event. The information regarding the second event may be displayed in place of the information regarding the first event, together with the information regarding the first event, or alternatively with the information regarding the first event every predetermined time.

According to various embodiments, the at least one processor may be configured to display an indicator representing that a plurality of events related to the first menu occur, based on identifying the occurrence of the second event, identify a first user input to at least one of the first menu or the indicator, and display the information regarding the second event through the first menu based on the first user input.

According to various embodiments, the first shortcut icon may be configured to be displayed as the first extended shortcut icon of the first application corresponding to at least one of a moving distance or moving direction of a second user input in response to the second user input to the first shortcut icon.

According to various embodiments, the at least one processor may be further configured to detect a second input to expose a third portion including the second portion of the flexible display to the outside and display the first extended shortcut icon, further including another menu for executing another function of the first application along with the at least one menu, on the third portion, based on the second input. The second input may be referred to a second sliding input.

According to various embodiments, the at least one processor may be further configured to detect a third input to expose a fourth portion including the second portion of the flexible display to the outside and display a widget of the first application on the fourth portion, based on the third input. The third input may be referred to a third sliding input.

According to various embodiments, the first extended shortcut icon may be configured to be displayed as a widget of the first application based on a detection position, moving distance, or moving direction of a third user input in response to the third user input to the first extended shortcut icon.

According to various embodiments, the at least one processor may be further configured to display a plurality of extended shortcut icons respectively corresponding to a plurality of applications, identify a fourth user input to at least a partial area of an area where the plurality of extended shortcut icons are displayed, and display at least one extended shortcut icon included in the at least partial area among the plurality of extended shortcut icons, as at least one widget, respectively, based on identifying the fourth user input.

According to various embodiments, the at least one processor may be further configured to display a second shortcut icon of a second application to execute the second application and display a third extended shortcut icon corresponding to a size of the second portion based on the first input. The third shortcut icon may include at least one object related to the second shortcut icon.

According to various embodiments, the at least one processor may be further configured to display a plurality of shortcut icons respectively corresponding to a plurality of applications in a state in which the first portion is exposed to the outside, identify at least one application designated by a user among the plurality of applications, based on the first input, and display at least one extended shortcut icon respectively corresponding to the at least one identified application.

According to various embodiments, the at least one processor may be further configured to identify a fifth user input selecting any one of at least one menu, execute a function corresponding to a selected menu of a first application or display an execution screen corresponding to the selected menu of the first application, based on identifying the fifth user input.

According to various embodiments, a method for controlling an electronic device may comprise displaying a first shortcut icon for executing a first application on a flexible display of the electronic device in a state in which a first portion of the flexible display of the electronic device is exposed to an outside; detecting a first input to expose a second portion including the first portion of the flexible display to the outside; and displaying the first shortcut icon, as a first extended shortcut icon, on the second portion when a size of the second portion is a first threshold size or more, based on the first input. The first extended shortcut icon may include at least one menu for executing at least one designated function of the first application.

According to various embodiments, the first extended shortcut icon may be configured to display a predesignated number of menus based on a size of the first extended shortcut icon.

According to various embodiments, a method for controlling an electronic device may comprise identifying priorities for a plurality of menus for executing a plurality of designated functions of a first application; identifying at least one menu smaller than, or equal to, in number, a predesignated number among the plurality of menus, based on the priorities; and displaying a first extended shortcut icon including at least one menu.

According to various embodiments, a computer-readable nonvolatile recording medium may store instructions that, when executed by at least one processor of an electronic device, enable the at least one processor to display a first shortcut icon for executing a first application on a flexible display of the electronic device in a state in which a first portion of the flexible display of the electronic device is exposed to an outside, detect a first input to expose a second portion including the first portion of the flexible display to the outside, and display the first shortcut icon, as a first extended shortcut icon, on the second portion when a size of the second portion is a first threshold size or more, based on the first input. The first extended shortcut icon may include at least one menu for executing at least one designated function of the first application.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 3340) including one or more instructions that are stored in a storage medium (e.g., an internal memory 3336 or an external memory 3338) that is readable by a machine (e.g., the electronic device 3301). For example, a processor (e.g., the processor 3320) of the machine (e.g., the electronic device 3301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a first housing and a second housing configured to movably engage with the first housing between a retracted position and an extended position;
   a flexible display coupled to the first housing and the second housing such that a size of a portion of the flexible display that is visible from a front side of the housing changes as the second housing is moved between the retracted position and the extended position;
   memory, comprising one or more storage media, storing instructions; and
   at least one processor communicatively coupled to the flexible display and the memory,
   wherein the instructions, when executed by at least one processor individually or collectively, cause the electronic device to:
      display a first shortcut icon for executing a first application on a first portion of the flexible display in a state in which the second housing is at the retracted position,
      detect an input on the flexible display to cause the second housing to be moved to one of a plurality of positions between the retracted position and the extended position, wherein the one of plurality of positions corresponds to one of a plurality of portions of the flexible display, each portion having a different size and including the first portion,
      determine a size of the one of the plurality of portions based on a plurality of predefined threshold sizes,
      identify the one of the plurality of portions as a second portion and the input as a first input in case that the size of the one of the plurality of portions corresponds to a first threshold size of the plurality of predefined threshold sizes, and
      change the first shortcut icon into a second shortcut icon of the first application on the second portion in case that the size of the second portion meets the first threshold size, and
   wherein the second shortcut icon includes at least one menu for executing at least one designated function of the first application.

2. The electronic device of claim 1, wherein the second shortcut icon is configured to display a predesignated number of menus based on a size of the second shortcut icon.

3. The electronic device of claim 1, wherein the instructions, when executed by the at least one processor individually or collectively, further cause the electronic device to:
   identify priorities for a plurality of menus for executing a plurality of designated functions of the first application,
   identify the at least one menu smaller than, or equal to, in number, a predesignated number among the plurality of menus, based on the priorities, and
   display the second shortcut icon including the at least one menu.

4. The electronic device of claim 3, wherein the instructions, when executed by the at least one processor individually or collectively, further cause the electronic device to, when a number of the plurality of menus exceeds the predesignated number, alternatively display the plurality of menus every predetermined time by the predesignated number, based on the priorities.

5. The electronic device of claim 1, wherein the instructions, when executed by the at least one processor individually or collectively, further cause the electronic device to:
   identify an occurrence of a first event related to a first menu among a plurality of menus, and
   display the at least one menu including the first menu.

6. The electronic device of claim 5, wherein the at least one processor is further configured to display information regarding the first event through the first menu.

7. The electronic device of claim 5,
wherein the instructions, when executed by the at least one processor individually or collectively, further cause the electronic device to:
after the first event occurs, identify an occurrence of a second event related to the first menu, and
display information regarding the second event through the first menu, based on identifying the occurrence of the second event, and
wherein the information regarding the second event is displayed in place of the information regarding the first event, together with the information regarding the first event, or alternatively with the information regarding the first event every predetermined time.

8. The electronic device of claim 5, wherein the instructions, when executed by the at least one processor individually or collectively, further cause the electronic device to:
display an indicator representing that a plurality of events related to the first menu occur, based on identifying an occurrence of a second event,
identify a first user input to at least one of the first menu or the indicator, and
display information regarding the second event through the first menu based on the first user input.

9. The electronic device of claim 1, wherein the first shortcut icon is configured to be displayed as the second shortcut icon of the first application corresponding to at least one of a moving distance or moving direction of a second user input in response to the second user input to the first shortcut icon.

10. The electronic device of claim 1, wherein the instructions, when executed by the at least one processor individually or collectively, further cause the electronic device to:
detect a second input on the flexible display to cause the second housing to be moved to a first position among the plurality of positions, wherein the first position corresponds to a third portion among the plurality of portions including the second portion of the flexible display, and
display the second shortcut icon, further including another menu for executing another function of the first application along with the at least one menu, on the third portion, based on the second input.

11. The electronic device of claim 1, wherein the instructions, when executed by the at least one processor individually or collectively, further cause the electronic device to:
detect a third input on the flexible display to cause the second housing to be moved to a second position among the plurality of positions, wherein the second position corresponds to a fourth portion among the plurality of portions including the second portion of the flexible display, and
display a widget of the first application on the fourth portion, based on the third input.

12. The electronic device of claim 1, wherein the instructions, when executed by the at least one processor individually or collectively, further cause the electronic device to:
display a third shortcut icon of a second application to execute the second application, and
display a fourth shortcut icon corresponding to a size of the second portion based on the first input, and
wherein the fourth shortcut icon includes at least one object related to the third shortcut icon.

13. A method performed by an electronic device including a housing including a first housing and a second housing configured to movably engage with the first housing between a retracted position and an extended position, and a flexible display coupled to the first housing and the second housing such that a size of a portion of the flexible display that is visible from a front side of the housing changes as the second housing is moved between the retracted position and the extended position, the method comprising:
displaying a first shortcut icon for executing a first application on a first portion of the flexible display of the electronic device in a state in which the second housing is at the retracted position;
detecting an input on the flexible display to cause the second housing to be moved to one of a plurality of positions between the retracted position and the extended position, wherein the one of plurality of positions corresponds to one of a plurality of portions of the flexible display, each portion having a different size and including the first portion,
determining a size of the one of the plurality of portions based on a plurality of predefined threshold sizes;
identifying the one of the plurality of portions as a second portion and the input as a first input in case that the size of the one of the plurality of portions corresponds to a first threshold size of the plurality of predefined threshold sizes; and
changing the first shortcut icon, into a second shortcut icon of the first application, on the second portion in case that the size of the second portion meets the first threshold size,
wherein the second shortcut icon includes at least one menu for executing at least one designated function of the first application.

14. The method of claim 13, further comprising:
displaying, by the second shortcut icon, a predesignated number of menus based on a size of the second shortcut icon.

15. The method of claim 13, further comprising:
identifying priorities for a plurality of menus for executing a plurality of designated functions of the first application;
identifying the at least one menu smaller than, or equal to, in number, a predesignated number among the plurality of menus, based on the priorities; and
displaying the second shortcut icon including the at least one menu.

16. The method of claim 15, further comprising:
when a number of the plurality of menus exceeds the predesignated number, alternatively displaying the plurality of menus every predetermined time by the predesignated number, based on the priorities.

17. The method of claim 13, further comprising:
detecting a second input on the flexible display to cause the second housing to be moved to a first position among the plurality of positions, wherein the first position corresponds to a third portion among the plurality of portions including the second portion of the flexible display, and
displaying the second shortcut icon, further including another menu for executing another function of the first application along with the at least one menu, on the third portion, based on the second input.

18. The method of claim 13, further comprising:
detecting a third input on the flexible display to cause the second housing to be moved to a second position among the plurality of positions, wherein the second position corresponds to a fourth portion among the plurality of portions including the second portion of the flexible display, and displaying a widget of the first application on the fourth portion, based on the third input.

19. A non-transitory computer-readable storage medium storing instructions for an electronic device including a housing including a first housing and a second housing configured to movably engage with the first housing between a retracted position and an extended position, and a flexible display coupled to the first housing and the second housing such that a size of a portion of the flexible display that is visible from a front side of the housing changes as the second housing is moved between the retracted position and the extended position, wherein the instructions, when executed by at least one processor of the electronic device, cause the electronic device to:

display a first shortcut icon for executing a first application on a first portion of the flexible display in a state in which the second housing is at the retracted position, detect an input on the flexible display to cause the second housing to be moved to one of a plurality of positions between the retracted position and the extended position, wherein the one of plurality of positions corresponds to one of a plurality of portions of the flexible display, each portion having a different size and including the first portion, determine a size of the one of the plurality of portions based on a plurality of predefined threshold sizes, identify the one of the plurality of portions as a second portion and the input as a first input in case that the size of the one of the plurality of portions corresponds to a first threshold size of the plurality of predefined threshold sizes, and change the first shortcut icon into a second shortcut icon of the first application on the second portion in case that the size of the second portion meets the first threshold size, and wherein the second shortcut icon includes at least one menu for executing at least one designated function of the first application.

\* \* \* \* \*